US011233239B2

(12) United States Patent
Manthiram et al.

(10) Patent No.: US 11,233,239 B2
(45) Date of Patent: Jan. 25, 2022

(54) LOW-COBALT AND COBALT-FREE, HIGH-ENERGY CATHODE MATERIALS FOR LITHIUM BATTERIES

(71) Applicant: Board of Regents, The University of Texas System, Austin, TX (US)

(72) Inventors: Arumugam Manthiram, Austin, TX (US); Wangda Li, Austin, TX (US); Steven Lee, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 17/213,975

(22) Filed: Mar. 26, 2021

(65) Prior Publication Data
US 2021/0305564 A1    Sep. 30, 2021

Related U.S. Application Data

(60) Provisional application No. 63/000,805, filed on Mar. 27, 2020.

(51) Int. Cl.
*H01M 4/525* (2010.01)
*H01M 4/505* (2010.01)
*H01M 4/583* (2010.01)
*H01M 4/38* (2006.01)

(52) U.S. Cl.
CPC .......... *H01M 4/525* (2013.01); *H01M 4/382* (2013.01); *H01M 4/386* (2013.01); *H01M 4/505* (2013.01); *H01M 4/583* (2013.01)

(58) Field of Classification Search
CPC ...... H01M 4/525; H01M 4/505; H01M 4/382; H01M 4/583; H01M 4/386
See application file for complete search history.

(56) References Cited

U.S. PATENT DOCUMENTS

| 5,264,201 | A  | 11/1993 | Dahn et al. |
| 6,007,588 | A  | 12/1999 | Mitchell |
| 6,677,082 | B2 | 1/2004  | Thackeray et al. |
| 6,680,143 | B2 | 1/2004  | Thackeray et al. |
| 6,964,828 | B2 | 11/2005 | Lu et al. |

(Continued)

FOREIGN PATENT DOCUMENTS

| CN | 101139108 A | 3/2008 |
| CN | 102437323 B | 5/2012 |

(Continued)

OTHER PUBLICATIONS

Li, et.al. Impact of the synthesis conditions on the performance of LiNixCoyAlzO2 with high ni and low co content, Journal of the electrochemical society, 165 (14) A3544-A3557 (2018).*

(Continued)

*Primary Examiner* — Cynthia K Walls
(74) *Attorney, Agent, or Firm* — Kilpatrick Townsend & Stockton LLP

(57) ABSTRACT

Described herein are low or no-cobalt materials useful as electrode active materials in a cathode for lithium or lithium-ion batteries. For example, compositions of matter are described herein, such as electrode active materials that can be incorporated into an electrode, such as a cathode. The disclosed electrode active materials exhibit high specific energy and voltage, and can also exhibit high rate capability and/or long operational lifetime.

29 Claims, 29 Drawing Sheets

(56) References Cited

U.S. PATENT DOCUMENTS

| | | |
|---|---|---|
| 7,078,128 B2 | 7/2006 | Lu et al. |
| 7,556,655 B2 | 7/2009 | Dahn et al. |
| 7,585,435 B2 | 9/2009 | Ito et al. |
| 7,648,693 B2 | 1/2010 | Paulsen et al. |
| 7,718,319 B2 | 5/2010 | Manthiram et al. |
| 7,985,503 B2 | 7/2011 | Li et al. |
| 8,241,791 B2 | 8/2012 | Lu et al. |
| 8,377,412 B2 | 2/2013 | Malcus et al. |
| 8,426,066 B2 | 4/2013 | Park et al. |
| 8,535,832 B2 | 9/2013 | Karthikeyan et al. |
| 8,685,565 B2 | 4/2014 | Lu et al. |
| 8,784,770 B2 | 7/2014 | Park et al. |
| 9,225,005 B2 | 12/2015 | Kim et al. |
| 9,412,996 B2 | 8/2016 | Park et al. |
| 9,577,287 B2 | 2/2017 | Ward et al. |
| 2001/0010807 A1 | 8/2001 | Matsubara |
| 2003/0027048 A1 | 2/2003 | Lu et al. |
| 2004/0106047 A1 | 6/2004 | Mie et al. |
| 2005/0244321 A1 | 11/2005 | Armand et al. |
| 2006/0105239 A1 | 5/2006 | Paulsen et al. |
| 2006/0147798 A1 | 7/2006 | Lu et al. |
| 2009/0207246 A1 | 8/2009 | Inami et al. |
| 2009/0224212 A1 | 9/2009 | Manthiram et al. |
| 2009/0224215 A1 | 9/2009 | Paulsen et al. |
| 2011/0111294 A1 | 5/2011 | Lopez et al. |
| 2011/0260099 A1 | 10/2011 | Paulsen et al. |
| 2012/0258357 A1 | 10/2012 | Kim et al. |
| 2012/0301786 A1 | 11/2012 | Takamuku et al. |
| 2014/0134501 A1 | 5/2014 | Li et al. |
| 2014/0272605 A1 | 9/2014 | Lim et al. |
| 2014/0342241 A1 | 11/2014 | Lim et al. |
| 2015/0050522 A1 | 2/2015 | Manithiram et al. |
| 2015/0132651 A1 | 5/2015 | Lee et al. |
| 2015/0188136 A1 | 7/2015 | Mori et al. |
| 2015/0333373 A1 | 11/2015 | Ho et al. |
| 2016/0099484 A1 | 4/2016 | Abraham et al. |
| 2016/0164094 A1* | 6/2016 | Takei .................. H01M 4/525 429/223 |
| 2016/0301104 A1 | 10/2016 | Shi et al. |
| 2016/0336615 A1 | 11/2016 | Thillaiyan et al. |
| 2016/0372748 A1 | 12/2016 | Nakayama et al. |
| 2017/0054147 A1 | 2/2017 | Yokoyama et al. |
| 2017/0338471 A1 | 11/2017 | Zheng et al. |
| 2017/0358796 A1 | 12/2017 | Kim et al. |
| 2018/0019464 A1 | 1/2018 | Xia et al. |
| 2019/0140276 A1 | 5/2019 | Pullen et al. |
| 2019/0207246 A1 | 7/2019 | Dahn et al. |
| 2019/0221843 A1 | 7/2019 | Kosaka et al. |
| 2020/0203765 A1 | 6/2020 | Manthiram et al. |

FOREIGN PATENT DOCUMENTS

| | | |
|---|---|---|
| CN | 103456946 B | 12/2013 |
| CN | 103715409 B | 4/2014 |
| CN | 103943844 A | 7/2014 |
| CN | 104319391 A | 1/2015 |
| CN | 106257718 B | 12/2016 |
| CN | 108199027 A | 6/2018 |
| CN | 109686970 A | 4/2019 |
| CN | 109904447 A | 6/2019 |
| CN | 109962223 A | 7/2019 |
| CN | 109970106 A | 7/2019 |
| KR | 101702572 B1 | 2/2017 |
| KR | 102021151 B1 | 9/2019 |
| WO | 2018/200631 A1 | 11/2018 |

OTHER PUBLICATIONS

Kim, J., Lee, H., Cha, H., Yoon, M., Park, M. & Cho, J. "Prospect and Reality of NiRich Cathode for Commercialization"., Advanced Energy Materials, 8, 1702028 (2018).

Bianchini, M., Roca-Ayats, M., Hartmann, P., Brezesinski, T. & Janek, J. There and Back Again—"The Journey of $LiNiO_2$ as A Cathode Active Material". Angewandte Chemie—International Edition, 58, 2-27 (2019).

Weigel, T., Schipper, F., Erickson, E. M., Susai, F. A, Markovsky, B. & Aurbach, D. "Structural and Electrochemical Aspects of $LiNi_{0.8}Co_{0.1}Mn_{0.1}O_2$ Cathode Materials Doped by Various Cations". ACS Energy Letters, 4, 508-516 (2019).

Li, H., Cormier, M., Zhang, N., Inglis, J., Li, J. & Dahn, J. R., "Is Cobalt Needed in NiRich Positive Electrode Materials for Lithium Ion Batteries?", Journal of the Electrochemical Society, 166, A429-A439 (2019).

Ryu, H. H., Park, K. J., Yoon, D.R., Aishova, A, Yoon, C. S. & Sun, Y. K., $Li[Ni_{0.9}Co_{0.09}W_{0.01}]O_2$: "A New Type of Layered Oxide Cathode with High Cycling Stability". Advanced Energy Materials, 9, 1902698 (2019).

Aishova, et. al., 2019, "Cobalt-Free High-Capacity Ni-Rich Layered $Li[Ni_{0.9}Mn_{0.1}]O_2$ Cathode," Advanced Energy Materials, 1903179.

Zhang, et. al., 2019, "Cobalt-Free Nickel-Rich Positive Electrode Materials with a CoreShell Structure," Chem. Mater, 31, 10150-10160.

Mu, et al., 2019, "Dopant Distribution in Co-Free High-Energy Layered Cathode Materials," Chem. Mater., 31, 9769-9776.

Sun, et al., "Control of Electrochemical Properties of Nickel-Rich Layered Cathode Materials for Lithium Ion Batteries by Variation of the Manganese to Cobalt Ratio", Journal of Power Sources 275 (2015) 877-883.

International Search Report and Written Opinion dated Jul. 8, 2021 in related application No. PCT/US2021/024405, all pgs.

* cited by examiner

US 11,233,239 B2

LOW-COBALT AND COBALT-FREE, HIGH-ENERGY CATHODE MATERIALS FOR LITHIUM BATTERIES

CROSS REFERENCE TO RELATED APPLICATIONS

This application claims the benefit of and priority to U.S. Provisional Application No. 63/000,805, filed on Mar. 27, 2020, which is hereby incorporated by reference in its entirety.

STATEMENT REGARDING FEDERALLY SPONSORED RESEARCH OR DEVELOPMENT

This invention was made with government support under Grant no. DE-EE0008845 and Grant no. DE-EE0007762 awarded by the Department of Energy. The government has certain rights in the invention.

FIELD

This invention is in the field of lithium batteries. This invention relates generally to cathodes containing low or no cobalt.

BACKGROUND

To date, all commercial high-energy-density lithium-ion battery cathode materials contain cobalt, i.e., $LiCoO_2$ (LCO), $Li[Ni_aMn_bCo_c]O_2$ (a+b+c=1; NMC-abc), and $Li[Ni_{1-x-y}Co_xAl_y]O_2$ (NCA). The use of cobalt in commercial lithium-ion battery cathodes involves a series of challenges. To begin with, cobalt is scarce and can only be found in a few places on Earth. Nearly two thirds of global cobalt mining comes from the Democratic Republic of Congo (DRC), a Central African country with unstable political regimes. In addition, cobalt mining in DRC sometimes skimps on environmental protections and exploits child labor. Even without disruptions of the global cobalt supply chain, demand for cobalt can outstrip production in the coming decade, with a projected ten-fold production increase of electric cars in 2025 compared to 2018. The price of cobalt has seen wild swings (for example $20,000-$95,000 per metric ton in just one year). With rapid expansion of global electric mobility, there is a growing consensus to reduce cobalt usage in lithium-based battery cathode materials. Though cobalt-free commercial cathodes exist, i.e., lithium iron phosphate and lithium manganese oxide, they offer much lower energy content as compared to cobalt-containing cathodes and cannot meet the stringent requirements of next-generation automotive batteries for passenger electric vehicles. Emerging cobalt-free cathode technologies such as 5 V spinel oxides, layered lithium-excess oxides, sulfur, and metal fluorides all necessitate a fundamental change of current lithium battery chemistry, which likely will take a decade or more development time.

Lithium transition-metal layered oxides are expected to continue to be the cathode material of choice for portable electronics and passenger electric cars at least through the next decade. However, these materials, despite varying formulations, universally contain cobalt. Cobalt is generally deemed essential for performance and stability.

SUMMARY

Described herein are low or no-cobalt materials useful as electrode active materials in a cathode for lithium or lithium ion batteries. For example, compositions of matter are described herein, such as electrode active materials. The electrode active materials can be incorporated into an electrode, such as a cathode. The electrode active material can be in the form of a powder, which can be assembled as a cathode active material over a current collector, such as using slurry-based deposition or assembly techniques.

The disclosed electrode active materials can also be incorporated into or used in an electrochemical cell. For example, the electrode active materials can be incorporated into a cathode, and/or in an electrochemical cell with an anode and an electrolyte positioned between the cathode and the anode. Other components may also be used in an electrochemical cell, such as a separator, current collectors, packaging, or the like. In some cases, one or multiple electrochemical cells may be incorporated into or used in a battery. The cathode or the anode or both may independently comprise one or more of an active material, a current collector, a binder, or a conductive additive.

Example materials useful for the anode of an electrochemical cell incorporating the electrode active materials described herein as an anode active material include, but are not limited to, graphite, carbon, silicon, lithium titanate ($Li_4Ti_5O_{12}$), tin, antimony, zinc, phosphorous, lithium, or a combination thereof. In some examples, useful electrolytes include liquid electrolytes and solid electrolytes. Non-aqueous electrolytes, such as ethylene carbonate or propylene carbonate, may be used.

An electrode active material may comprise $Li_aNi_{1-b-c}Co_bM_cO_d$, where a may be from 0.9 to 1.1, b may be from 0 to 0.05, c may be from 0 to 0.67, d may be from 1.9 to 2.1, and M may be Mn, Al, Mg, Fe, Cr, B, Ti, Zr, Ga, Zn, V, Cu, Yb, Li, Na, K, F, Ba, Ca, Lu, Y, Nb, Mo, Ru, Rh, Ta, Pr, W, Ir, In, Tl, Sn, Sr, S, P, Cl, Ge, Sb, Er, Te, La, Ce, Nd, Dy, Eu, Sc, Se, Si, Tc, Pd, Pm, Sm, Gd, Tb, Ho, Tm, or any combination of these.

Advantageously, the electrode active materials described herein may exhibit exceptional specific energy, which may indicate an amount of energy stored by the electrode active material per unit mass. For example, the electrode active materials exhibit or are characterized by a specific energy for a single discharge of from 600 Wh·kg$^{-1}$ to 1000 Wh·kg$^{-1}$. In some examples, the specific energy for a single discharge may be from 650 Wh·kg$^{-1}$ to 1000 Wh·kg$^{-1}$, from 700 Wh·kg$^{-1}$ to 1000 Wh·kg$^{-1}$, from 750 Wh·kg$^{-1}$ to 1000 Wh·kg$^{-1}$, from 800 Wh·kg$^{-1}$ to 1000 Wh·kg$^{-1}$, from 850 Wh·kg$^{-1}$ to 1000 Wh·kg$^{-1}$, from 900 Wh·kg$^{-1}$ to 1000 Wh·kg$^{-1}$, or from 950 Wh·kg$^{-1}$ to 1000 Wh·kg$^{-1}$. The specific energy for a single discharge cycle may correspond to a discharge within 5 V to 3 V vs. Li$^+$/Li, such as from 4.4 V to 3 V vs. Li$^+$/Li. In some examples, the specific energy for a single discharge may correspond to a discharge from 5 V to 3.1 V vs. Li$^+$/Li. In some examples, the specific energy for a single discharge may correspond to a discharge from 5 V to 3.2 V vs. Li$^+$/Li. In some examples, the specific energy for a single discharge may correspond to a discharge from 5 V to 3.3 V vs. Li$^+$/Li. In some examples, the specific energy for a single discharge may correspond to a discharge from 5 V to 3.4 V vs. Li$^+$/Li. In some examples, the specific energy for a single discharge may correspond to a discharge from 5 V to 3.5 V vs. Li$^+$/Li. In some examples, the specific energy for a single discharge may correspond to a discharge from 4.9 V to 3 V vs. Li$^+$/Li. In some examples, the specific energy for a single discharge may correspond to a discharge from 4.8 V to 3 V vs. Li$^+$/Li. In some examples, the specific energy for a single discharge may correspond to a discharge from 4.7 V to 3 V vs. Li$^+$/Li. In some examples, the specific energy for a single discharge may correspond to a discharge from 4.6 V to 3 V vs. Li$^+$/Li. In some examples, the specific energy for a single discharge may correspond to a discharge from 4.5 V to 3 V vs. Li$^+$/Li. In some examples, the single discharge may correspond to a discharge at a rate of 1C. In some examples, the single discharge may correspond to a discharge at a rate of C/10. In some examples, the single discharge may correspond to a discharge at a temperature of 25° C. In some examples, the single discharge may correspond to a discharge of an electrode comprising an electrode active material content of at least 90% by weight and an electrode active material areal capacity loading of at least 2.0 mAh·cm$^{-2}$. In some examples, the single discharge may correspond to a discharge in a coin-format half battery cell paired with lithium metal as the counter electrode in a commercial non-aqueous electrolyte.

Advantageously, the electrode active materials described herein may exhibit exceptionally high voltage during discharge, which are characterized by a dQ·dV$^{-1}$ curve exhibiting a minimum of exceptionally high voltage during discharge. To determine dQ·dV$^{-1}$, lithium metal coin cells can be cycled at a specific rate, such as at a C/10 rate, over a voltage range, such as from 2.8 V to 4.4 V vs. Li$^+$/Li. The cycling data used for calculating dQ/dV can be determined using even voltage steps, such as steps separated by 0.02 V steps, for example. The dQ/dV value at each voltage can be calculated by the formula in Eq. 1. The charge, $Q_2$, in Eq. 1 is the total charge at the voltage of interest, $V_2$, with the proceeding data point at voltage $V_1$ and total charge for that charge or discharge cycle at $Q_1$. When the data used for dQ/dV calculation is acquired at an even voltage step, such as every 0.02 V, ΔV may be the same value, such as 0.02 V, with the unit mAh·g$^{-1}$V$^{-1}$. Use of voltage steps of about 0.02 V between acquired data points can be useful for preventing noise from impacting the magnitude of the mAh·g$^{-1}$V$^{-1}$, which can increase to very large values when ΔV is set to small values.

$$dQ/dV=Q_2-Q_1/V_2-V_1=\Delta Q/\Delta V \quad \text{Eq. 1}$$

Then data points (x, y) can be plotted with x=½($V_1$+$V_2$) and y=$Q_2$–$Q_1$/$V_2$–$V_1$, and a minimum value (e.g., lowest negative peak or nadir) can be determined.

For example, the electrode active materials exhibit or are characterized by a dQ·dV$^{-1}$ curve which has a minimum of –300 mAh·g$^{-1}$V$^{-1}$ or lower, such as at a voltage of from 4.15 V to 4.30 V vs. Li$^+$/Li, during a single discharge. As used herein, a minimum may refer to a lowest magnitude, such as in a particular range, and may refer to a negative peak or nadir, representing a local minimum value, which may, in some cases, be an absolute minimum value. In some examples, the minimum may have a magnitude of from about –300 mAh·g$^{-1}$V$^{-1}$ to about –3000 mAh·g$^{-1}$V$^{-1}$. In some examples, the dQ·dV$^{-1}$ curve has a minimum during a single discharge at a voltage from 4.16 V to 4.30 V vs. Li$^+$/Li, from 4.17 V to 4.30 V vs. Li$^+$/Li, from 4.18 V to 4.30 V vs. Li$^+$/Li, from 4.19 V to 4.30 V vs. Li$^+$/Li, from 4.20 V to 4.30 V vs. Li$^+$/Li, from 4.21 V to 4.30 V vs. Li$^+$/Li, or from 4.22 V to 4.30 V vs. Li$^+$/Li. In some examples, the dQ·dV$^{-1}$ curve has a minimum during a single discharge of at least –400 mAh·g$^{-1}$V$^{-1}$, at least –500 mAh·g$^{-1}$V$^{-1}$, at least –600 mAh·g$^{-1}$V$^{-1}$, at least –700 mAh·g$^{-1}$V$^{-1}$, at least –800 mAh·g$^{-1}$V$^{-1}$, at least –900 mAh·g$^{-1}$V$^{-1}$, at least –1000 mAh·g$^{-1}$V$^{-1}$, at least –1200 mAh·g$^{-1}$V$^{-1}$, at least –1400 mAh·g$^{-1}$V$^{-1}$, at least –1600 mAh·g$^{-1}$V$^{-1}$, at least –1800 mAh·g$^{-1}$V$^{-1}$, or at least –2000 mAh·g$^{-1}$V$^{-1}$. In some examples, the single discharge may correspond to a discharge at a rate of C/10. In some examples, the single discharge may correspond to a discharge at a temperature of 25° C. In some examples, the single discharge may correspond to a discharge of an electrode comprising an electrode active material content of at least 90% by weight and an electrode active material areal capacity loading of at least 2.0 mAh·cm$^{-1}$. In some examples, the single discharge may correspond to a discharge in a coin-format half battery cell paired with lithium metal as the counter electrode infused with a commercial non-aqueous electrolyte. In some examples, a cobalt-free electrode active material (LiNi$_{1-c}$M$_c$O$_d$), such as comprising LiNi$_{1-c1-c2}$Mn$_{c1}$Al$_{c2}$O$_d$ (NMA), may exhibit or be characterized by a dQ·dV$^{-1}$ curve having a minimum at a voltage of 4.20 V vs. Li$^+$/Li or above, such as from 4.20 V to 4.30 V vs. Li$^+$/Li, during a single discharge at C/10 rate and 25° C. Here, c1 and c2 total to c and may be from 0 to 0.67, for example.

Advantageously, a high specific energy of the disclosed electrode active materials may be retained after a large number of charge-discharge cycles. In some cases, the specific energy may decrease as a function of the number of charge-discharge cycles. For example, the electrode active material may exhibit or be characterized by an original specific energy for a first discharge and a specific energy for another discharge after about 500 charge-discharge cycles that is at least 80% of the original specific energy of from 600 Wh·kg$^{-1}$ to 1000 Wh·kg$^{-1}$. Optionally, the specific energy for a discharge after about 1000 charge-discharge cycles may be at least 80% of the original specific energy of from 600 Wh·kg$^{-1}$ to 1000 Wh·kg$^{-1}$. Optionally, the specific energy for a discharge after about 500 charge-discharge cycles may be at least 85% of the original specific energy, at least 90% of the original specific energy, or at least 95% of the original specific energy of from 600 Wh·kg$^{-1}$ to 1000 Wh·kg$^{-1}$. Optionally, the specific energy for a discharge after about 100 charge-discharge cycles may be at least 95% of the original specific energy of from 600 Wh·kg$^{-1}$ to 1000 Wh·kg$^{-1}$. In a specific example, the electrode active material may exhibit or be characterized by an original specific energy for a first discharge from 600 Wh·kg$^{-1}$ to 1000 Wh·kg$^{-1}$ and a specific energy for another discharge after about 500 charge-discharge cycles from 480 Wh·kg$^{-1}$ to 1000 Wh·kg$^{-1}$. In one example, the electrode active material may exhibit or be characterized by an original specific energy for a first discharge from 600 Wh·kg$^{-1}$ to 1000 Wh·kg$^{-1}$ and a specific energy for another discharge after 1000 charge-discharge cycles from 480 Wh·kg$^{-1}$ to 1000 Wh·kg$^{-1}$. In another example, the electrode active material may exhibit or be characterized by an original specific energy for a first discharge cycle from 600 Wh·kg$^{-1}$ to 1000 Wh·kg$^{-1}$ and a specific energy for another discharge between after 500 charge-discharge cycles from 540 Wh·kg$^{-1}$ to 1000 Wh·kg$^{-1}$. In another example, the electrode active material may exhibit or be characterized by an original specific energy for a first discharge cycle from 600 Wh·kg$^{-1}$ to 1000 Wh·kg$^{-1}$ and a specific energy for another discharge between after 100 charge-discharge cycles from 570 Wh·kg$^{-1}$ to 1000 Wh·kg$^{-1}$. These discharges for measuring a specific energy may be from 5 V to 3 V vs. Li$^+$/Li, or from 5 V to a voltage greater than 3 V vs. Li$^+$/Li, such as 3.1 V, 3.2 V, 3.3 V, 3.4 V, or 3.5 V vs. Li$^+$/Li, or from a voltage lower than 5 V, such as 4.9 V, 4.8 V, 4.7 V, 4.6 V, or 4.5 V, to 3 V vs. Li$^+$/Li. In some examples, the discharge may correspond to a discharge of an electrode comprising an electrode active material content of at least 90% by weight and an electrode active material areal capacity loading of at least 2.0 mAh·cm$^{-2}$. In some examples, the discharge may correspond to a discharge in a pouch-format full battery cell paired with graphite as the counter electrode, infused with a commercial non-aqueous electrolyte.

An electrode active material may comprise $Li_aNi_{1-b-c}Co_bM_cO_d$, where a may be from 0.9 to 1.1, b may be from 0 to 0.1, c may be from 0 to 0.67, d may be from 1.9 to 2.1, and M may be Mn, Al, Mg, Fe, Cr, B, Ti, Zr, Ga, Zn, V, Cu, Yb, Li, Na, K, F, Ba, Ca, Lu, Y, Nb, Mo, Ru, Rh, Ta, Pr, W, Ir, In, Tl, Sn, Sr, S, P, Cl, Ge, Sb, Er, Te, La, Ce, Nd, Dy, Eu, Sc, Se, Si, Tc, Pd, Pm, Sm, Gd, Tb, Ho, Tm, or any combination of these; and where the electrode active material may exhibit or be characterized by a specific energy for a 1C discharge between 5 V and 3 V vs. $Li^+/Li$ at 25° C. that is from 80% to 100% of a specific energy for a C/10 discharge between 5 V and 3 V vs. $Li^+/Li$ at 25° C. As used herein, the recitation of a discharge between a range of two voltages can optionally include a discharge between a range of two intermediate voltages. For example, a discharge between 5 V and 3 V vs. $Li^+/Li$ can include a discharge from 5 V to 3 V vs. $Li^+/Li$, from 4 V to 3 V vs. $Li^+/Li$, from 5 V to 4 V vs. $Li^+/Li$, from 4.5 V to 3 V vs. $Li^+/Li$, etc. In some examples, the specific energy for the 1C discharge between 5 V and 3 V vs. $Li^+/Li$ at 25° C. may be from 85% to 100% of the specific energy for a C/10 discharge between 5 V and 3 V vs. $Li^+/Li$ at 25° C. In some examples, the specific energy for the 1C discharge between 5 V and 3 V vs. $Li^+/Li$ at 25° C. may be from 90% to 100% of the specific energy for a C/10 discharge between 5 V and 3 V vs. $Li^+/Li$ at 25° C. In some examples, the specific energy for the 1C discharge between 5 V and 3 V vs. $Li^+/Li$ at 25° C. may be from 600 $Wh·kg^{-1}$ to 1000 $Wh·kg^{-1}$. In some examples, the specific energy for the 1C discharge between 5 V and 3 V vs. $Li^+/Li$ at 25° C. may be from 750 $Wh·kg^{-1}$ to 1000 $Wh·kg^{-1}$. In some examples, the discharge may correspond to a discharge of an electrode comprising an electrode active material content of at least 90% by weight and an electrode active material areal capacity loading of at least 2.0 $mAh·cm^{-2}$. In some examples, the discharge may correspond to a discharge in a coin-format half battery cell paired with lithium metal as the counter electrode infused with a commercial non-aqueous electrolyte.

For the electrode active materials described herein, M can optionally be one or a subset of the metals and non-metals identified above. For example, M may be a combination of Mn and Al. M may be a combination of Mn, Mg, and Al. M may be a combination of Mn and Mg. M may be a combination of Al and Mg. M may be a combination of Ti, Mg, and Al. M may be or comprise Fe. M may be or comprise Zn. M may be or comprise both Fe and Zn. The disclosed electrode active materials may be free or substantially free of Co. For example, b may be 0 or b may be less than 0.01. The disclosed electrode active materials may have Li present in an excess or may be Li deficient. Optionally, a may be from 0.9 to 1. Optionally, a may be from 1 to 1.1. In some cases b may be from 0 to 0.01 and c may be from 0 to 0.1. Optionally, c may be from 0.1 to 0.5, from 0.1 to 0.2, or from 0.2 to 0.4. Optionally, d may be from 1.95 to 2.05.

The electrode active materials may have various different physical or other properties, which may be different from those of other conventional materials. In some examples, the electrode active material may exhibit or be characterized by a tapped density of from 2.0 $g·cm^{-3}$ to 3.5 $g·cm^{-3}$. In some examples, the electrode active material may exhibit or be characterized by a tapped density of from 2.3 $g·cm^{-3}$ to 3.0 $g·cm^{-3}$. The crystal structure of the electrode active materials may also be distinct from other conventional materials. For example, in some cases, only a portion of the electrode active material may comprise or be characterized by a rhombohedral crystal structure or a rhombohedral $R\bar{3}m$ crystal structure. In some cases, the rhombohedral crystal structure or the rhombohedral $R\bar{3}m$ crystal structure may be or comprise a majority (e.g., 50% or more by volume) of the electrode active material. The rhombohedral crystal structure or a rhombohedral $R\bar{3}m$ crystal structure may be 50% or more by volume, 55% or more by volume, 60% or more by volume, 65% or more by volume, 70% or more by volume, 75% or more by volume, 80% or more by volume, 85% or more by volume, 90% or more by volume, 95% or more by volume, or 99% or more by volume.

The electrode active material may be in the form of particles, which may have differences between the surface of the particles and an interior or bulk of the particles. In some examples, the particles may have cross-sectional dimensions of from 500 nm to 30 µm. Optionally, the electrode active material may have or be characterized by a surface region and a bulk region, such as where the surface region corresponds to a first portion of the active material or particles thereof within 20% of a cross-sectional dimension from a surface of the active material or particles thereof, and where the bulk region corresponds to a second portion of the active material or particles thereof deeper than the surface region. As examples of characteristics of the bulk region, the bulk region may be free or substantially free of or otherwise not exhibit a spinel (for example, $P4_332$ and $Fd\bar{3}m$) crystal structure, a lithium-excess (for example, C2/m) crystal structure or a rock-salt (for example, $Fm\bar{3}n$) crystal structure. In some cases, at least a portion of the surface region may comprise or be characterized by a spinel (for example, $P4_332$ and $Fd\bar{3}m$) crystal structure, a lithium-excess (for example, C2/m) crystal structure, a rock-salt (for example, $Fm\bar{3}n$) crystal structure, or a combination thereof. In another example, the bulk region may be free or substantially free of or otherwise not exhibit a polyanionic structure, such as $LiFePO_4$ (Pmnb/Pnma). In another example, at least a portion of the surface region may comprise or be characterized by a polyanionic structure, such as $LiFePO_4$ (Pmnb/Pnma).

Control over the morphology of particles comprising the electrode active material may be useful for achieving desirable properties, such as the tapped densities disclosed herein, the specific energies disclosed herein, the rate capabilities disclosed herein, and/or the operational lifetimes disclosed herein. Advantageously, the particles of the electrode active material may comprise secondary particles. For example, the secondary particles may each comprise a plurality of primary particles of smaller size. For example, each secondary particle may comprise from 1 to 100,000,000 or more primary particles. The secondary particles may have cross-sectional dimensions of from 500 nm to 30 µm, such as from 500 nm to 2.5 µm, from 2.5 µm to 7.5 µm, from 7.5 µm to 15 µm, or from 15 µm to 30 µm. Optionally, the secondary particles are substantially monodisperse, such as where a cross-sectional distribution of the plurality of the secondary particles exhibits a single size distribution. In some examples the secondary particles are polydisperse, such as where a first portion of the secondary particles have a first cross-sectional dimension distribution and a second portion have a second cross-sectional dimension distribution that is at least a factor of 10 larger than the first cross-sectional dimension distribution. In some examples, the plurality of secondary particles are substantially spherical in shape. The primary particles, which may make up the secondary particles, may have cross-sectional dimensions of from 10 nm to 10 µm, such as from 10 nm to 100 nm, 100 nm to 1000 nm, or from 1 µm to 10 µm. The primary particles may be substantially monodisperse or exhibit a monodisperse size distribution. In some cases, a secondary particle may comprise a single primary particle, and may be referred to as single-crystalline or single-crystal.

As described above, the electrode active material may exhibit a long operational lifetime. For example, the electrode active material may be characterized by a specific energy after 500 charge-discharge cycles of more than 80% of an original specific energy of from 600 Wh·kg$^{-1}$ to 1000 Wh·kg$^{-1}$. Optionally, the electrode active material may exhibit or be characterized by a specific energy after 1000 charge-discharge cycles of more than 80% of an original specific energy of from 600 Wh·kg$^{-1}$ to 1000 Wh·kg$^{-1}$. Optionally, the electrode active material may exhibit or be characterized by a specific energy after 500 charge-discharge cycles of more than 90% of an original specific energy of from 600 Wh·kg$^{-1}$ to 1000 Wh·kg$^{-1}$. Optionally, the electrode active material may exhibit or be characterized by a specific energy after 100 charge-discharge cycles of more than 95% of an original specific energy of from 600 Wh·kg$^{-1}$ to 1000 Wh·kg$^{-1}$.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

DETAILED DESCRIPTION

Figure 1:
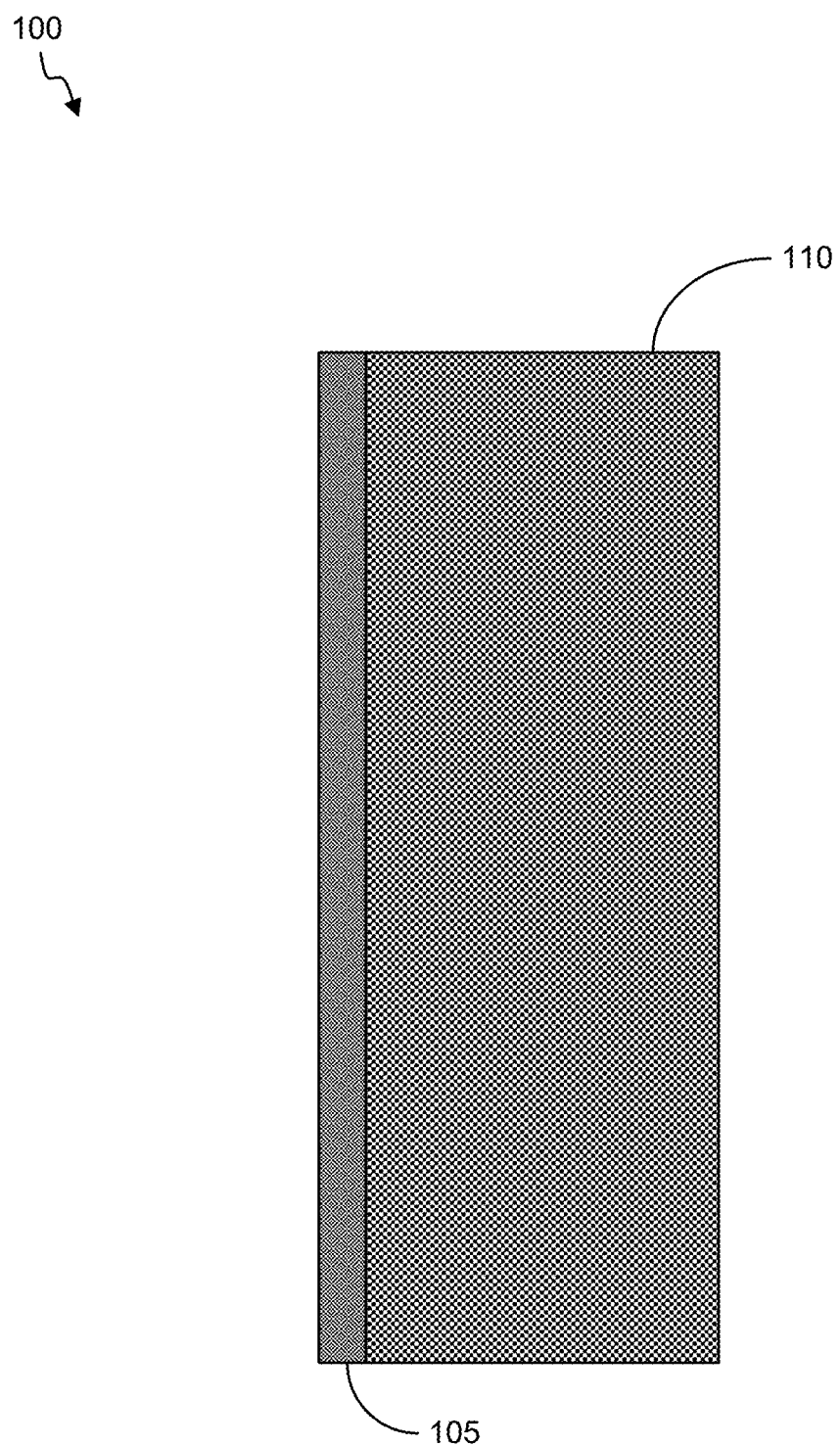
FIG. 1 provides a schematic illustration of an example electrode comprising an electrode active material and a current collector according to at least some aspects of the present disclosure.

This disclosure provides a novel class of low-cobalt or cobalt-free lithium transition-metal layered oxides, useful as positive electrode (cathode) active materials for rechargeable lithium-based batteries. The described active materials include those excluding cobalt, currently universally present in layered oxide cathodes in commercial lithium-ion batteries. Instead, the described class of cathodes uses raw materials of higher earth abundance and lower cost, more secure supply chains, and less adverse impacts on the environment.

The described active materials can be easily tuned in chemical compositions to provide high specific energy, high voltage, high rate capability, and/or long operational lifetime over a wide temperature range (from subzero to elevated temperatures), as well as desirable safety features under abuse (e.g., short circuit, overcharge, rupture). These active materials are readily compatible with existing components in commercial lithium-ion batteries, such as graphite/silicon anodes, polymeric separators, and nonaqueous aprotic carbonate-based electrolytes.

Cathodes of the described active materials have been evaluated and validated in pouch-format full battery cells. The active materials can be synthesized via established industrial manufacturing processes, i.e., metal co-precipitation, lithiation calcination, and optionally subsequent surface treatments. A series of metals and/or non-metals are incorporated to enable desirable specific energy and rate capability, operational lifetime, and safety in the absence of cobalt or in very low concentrations of cobalt. The described cathodes demonstrate promise for future low-cobalt or cobalt-free, high-energy-density lithium-based batteries, including both lithium-ion and lithium-metal chemistries in either liquid, semi-solid, or all-solid-state electrolyte systems.

With rapid expansion of global electric mobility, there is a growing consensus to reduce cobalt usage in lithium-based battery cathode materials. Though cobalt-free commercial cathodes exist (e.g., lithium iron phosphate and lithium manganese oxide), they offer much lower energy contents and cannot meet the stringent requirements of next-generation automotive batteries for passenger electric vehicles. Emerging cobalt-free cathode technologies such as 5 V spinel oxides, layered lithium-excess oxides, sulfur, and metal fluorides all necessitate a fundamental change of current lithium battery chemistry, which likely will take a decade or more development time.

Lithium transition-metal layered oxides have been and are expected to continue to be the cathode material of choice for portable electronics and passenger electric cars at least through the next decade. However, these materials, despite varying formulations, universally contain cobalt in significant amounts. Cobalt is deemed essential for performance and stability, but is a scarce metal with a vulnerable supply chain and has a high cost as a result. Plus, owing to high toxicity and questionable mining practices in Central Africa, cobalt causes unfavorable impacts on the environment. Different from all commercial layered oxide cathodes, this disclosure relates to a new class of cathode materials of high energy content with low or zero cobalt usage.

The use of cobalt in commercial lithium-ion battery cathodes involves a series of challenges. To begin with, cobalt is scarce and can only be found in a few places on earth. Nearly two thirds of global cobalt mining comes from the Democratic Republic of Congo (DRC), a Central African country with unstable political regimes. In addition, cobalt mining in DRC sometimes skimps on environmental protections and exploits child labor. Even without disruptions of the global cobalt supply chain, demand for cobalt can outstrip production in the coming decade, with a projected ten-fold production increase of electric cars in 2025 compared to 2018. In comparison, nickel, manganese, aluminum, iron, zinc, and many other metals and non-metals, are far more earth-abundant and available. These metals and non-metals are also much less geographically concentrated than cobalt.

The active materials described herein reduce the dependence on cobalt of commercial layered oxide cathodes for lithium-based batteries, thus leading to more secure supply chains, lower cost, and less adverse environmental impacts. In addition, through a tuning in chemical composition and synthesis, the described cathode materials can offer high specific energy, high voltage, high rate capability, and/or long operational lifetime over a wide temperature range, as well as desirable safety features under abuse conditions, in comparison to commercial layered oxide cathode materials.

Since cobalt suppresses nickel and lithium anti-site defects (i.e., cation disorder) in layered oxides, cobalt elimination can adversely affect specific capacity, voltage, rate capability, and operational lifetime of the cathode material. Advantageously, the active materials described herein mitigate these issues by incorporating a series of alternative metals and/or non-metals, besides nickel, which compensate for the lack of cobalt. Advantageously, these alternative metals and non-metals can be incorporated easily through co-precipitation, lithiation calcination, and/or subsequent surface treatments. Advantageously, the synthesis comprising co-precipitation, lithiation calcination, and/or subsequent surface treatments is useful, or in some cases critical, to mitigate the issues of specific capacity, voltage, rate capability, and operational lifetime of the cathode material without cobalt.

Besides portable electronics and electric vehicles, the described cathode active materials can be useful in unmanned aerial systems, robots, military batteries, and large-scale energy storage systems. The flexibility in compositional designs can enable cathode materials with either very high specific energy and rate capability or very long operational lifetime, geared towards a variety of market needs.

Electrode Active Materials

The electrode active materials described herein include those exhibiting high specific energy measured on a cathode level, such as from about 600 $Wh \cdot kg^{-1}$ to about 1000 $Wh \cdot kg^{-1}$. Example specific energies may be from 625 $Wh \cdot kg^{-1}$ to 1000 $Wh \cdot kg^{-1}$, from 650 $Wh \cdot kg^{-1}$ to 1000 $Wh \cdot kg^{-1}$, from 675 $Wh \cdot kg^{-1}$ to 1000 $Wh \cdot kg^{-1}$, from 700

Wh·kg$^{-1}$ to 1000 Wh·kg$^{-1}$, from 725 Wh·kg$^{-1}$ to 1000 Wh·kg$^{-1}$, from 750 Wh·kg$^{-1}$ to 1000 Wh·kg$^{-1}$, from 775 Wh·kg$^{-1}$ to 1000 Wh·kg$^{-1}$, from 800 Wh·kg$^{-1}$ to 1000 Wh·kg$^{-1}$, from 825 Wh·kg$^{-1}$ to 1000 Wh·kg$^{-1}$, from 850 Wh·kg$^{-1}$ to 1000 Wh·kg$^{-1}$, from 875 Wh·kg$^{-1}$ to 1000 Wh·kg$^{-1}$, from 900 Wh·kg$^{-1}$ to 1000 Wh·kg$^{-1}$, from 925 Wh·kg$^{-1}$ to 1000 Wh·kg$^{-1}$, from 950 Wh·kg$^{-1}$ to 1000 Wh·kg$^{-1}$, or from 975 Wh·kg$^{-1}$ to 1000 Wh·kg$^{-1}$. The specific energy can correspond to a discharge from about 5 V to about 3 V vs. Li$^+$/Li, for example. It will be appreciated that some electrode active materials can discharge to lower voltages, such as about 2 V vs. Li$^+$/Li, which can allow some electrode active materials to exhibit specific energies significantly higher than if they are only discharged to about 3 V vs. Li$^+$/Li or greater. Additionally, some electrode active materials can be charged to voltages higher than about 5 V vs. Li$^+$/Li, providing some additional energy. For comparison purposes, discharging from a voltage higher than about 5 V vs. Li$^+$/Li or to a voltage lower than about 3 V vs Li$^+$/Li may not provide the same information as a discharge from about 5 V to about 3 V vs Li$^+$/Li. The specific energy can correspond to a discharge at a particular temperature, such as room temperature, 25° C. It will be appreciated that some electrode active materials may exhibit different specific energies and rate capabilities at different temperatures. The specific energy can correspond to a discharge at a particular discharge rate, such as 1C or C/10. It will be appreciated that some electrode active materials may exhibit different specific energies when discharged at different rates. The specific energy can correspond to a discharge of an electrode of a particular composition and thickness, such as those comprising an electrode active material content of at least 90% by weight and an electrode active material areal capacity loading of at least 2.0 mAh·cm$^{-2}$. It will be appreciated that some electrode active materials may exhibit different specific energies in electrodes of different compositions or thicknesses. The specific energy can correspond to a discharge of an electrode in a particular battery cell configuration, such as a coin-format half battery cell paired with lithium metal as the counter electrode infused with a commercial non-aqueous electrolyte. It will be appreciated that some electrode active materials may exhibit different specific energies in different battery cell configurations.

The electrode active materials described herein include those exhibiting a high voltage measured on a cathode level, such as from 4.15 V to 4.30 V vs. Li$^+$/Li, at a minimum of from −300 mAh·g$^{-1}$V$^{-1}$ to −3000 mAh·g$^{-1}$V$^{-1}$, in a dQ·dV$^{-1}$ curve during discharge. Example high voltages may be from 4.16 V to 4.30 V vs. Li$^+$/Li, from 4.17 V to 4.30 V vs. Li$^+$/Li, from 4.18 V to 4.30 V vs. Li$^+$/Li, from 4.19 V to 4.30 V vs. Li$^+$/Li, from 4.20 V to 4.30 V vs. Li$^+$/Li, from 4.21 V to 4.30 V vs. Li$^+$/Li, or from 4.22 V to 4.30 V vs. Li$^+$/Li. In some examples, the minimum in a dQ·dV$^{-1}$ curve during discharge may be −400 mAh·g$^{-1}$V$^{-1}$ or lower, may be −500 mAh·g$^{-1}$V$^{-1}$ or lower, −600 mAh·g$^{-1}$V$^{-1}$ or lower, −700 mAh·g$^{-1}$V$^{-1}$ or lower, −800 mAh·g$^{-1}$V$^{-1}$ or lower, −900 mAh·g$^{-1}$V$^{-1}$ or lower, −1000 mAh·g$^{-1}$V$^{-1}$ or lower, −1200 mAh·g$^{-1}$V$^{-1}$ or lower, −1400 mAh·g$^{-1}$V$^{-1}$ or lower, −1600 mAh·g$^{-1}$V$^{-1}$ or lower, −1800 mAh·g$^{-1}$V$^{-1}$ or lower, or −2000 mAh·g$^{-1}$V$^{-1}$ or lower. It will be appreciated that a dQ·dV$^{-1}$ curve may exhibit maximums during charge at voltages significantly higher than those of minimums during discharge. A maximum may refer to a highest magnitude, such as in a particular range, and may refer to a positive peak or zenith, representing a local maximum value, which may, in some cases, be an absolute maximum value. For comparison purposes, voltages of maximums during charge in a dQ·dV$^{-1}$ curve may not provide the same information as those of minimums during discharge in said dQ·dV$^{-1}$ curve. The voltage can correspond to a method for calculation of the dQ·dV$^{-1}$ curves, such as a voltage sampling step of 0.02 V. It will be appreciated that some calculation methods may exhibit different voltages and/or minimums of different values expressed by mAh·g$^{-1}$V$^{-1}$ in dQ·dV$^{-1}$ curves during discharge. The voltage can correspond to a discharge at a particular temperature, such as room temperature, 25° C. It will be appreciated that some electrode active materials may exhibit different voltages at different temperatures. The voltage can correspond to a discharge at a particular discharge rate, such as C/10. It will be appreciated that some electrode active materials may exhibit different voltages when discharged at different rates. The voltage can correspond to a discharge of an electrode of a particular composition and thickness, such as those comprising an electrode active material content of at least 90% by weight and an electrode active material areal capacity loading of at least 2.0 mAh·cm$^{-2}$. It will be appreciated that some electrode active materials may exhibit different voltages in electrodes of different compositions or thicknesses. The voltage can correspond to a discharge of an electrode in a particular battery cell configuration, such as a coin-format half battery cell paired with lithium metal as the counter electrode infused with a commercial non-aqueous electrolyte. It will be appreciated that some electrode active materials may exhibit different voltages in different battery cell configurations A wide variety of compositions for the electrode active materials are contemplated herein. In general, the electrode active materials comprise or are characterized by a chemical formula of Li$_a$Ni$_{1-b-c}$Co$_b$M$_c$O$_d$. Here, M represents one or more metals and/or non-metals, such as Mn, Al, Mg, Fe, Cr, B, Ti, Zr, Ga, Zn, V, Cu, Yb, Li, Na, K, F, Ba, Ca, Lu, Y, Nb, Mo, Ru, Rh, Ta, Pr, W, Ir, In, Tl, Sn, Sr, S, P, Cl, Ge, Sb, Er, Te, La, Ce, Nd, Dy, Eu, Sc, Se, Si, Tc, Pd, Pm, Sm, Gd, Tb, Ho, Tm, or any combination of these.

The subscript a in the chemical formula Li$_a$Ni$_{1-b-c}$Co$_b$M$_c$O$_d$ represents the relative amount of Li (lithium) in the electrode active materials. In general, the amount of Li can vary from Li-rich to Li-deficient. For example, a may be from about 0.9 to about 1.1 in general, or from 0.9 to 1.0 or from 1.0 to 1.1. In some cases, a may be or may be about 0.9, 0.905, 0.91, 0.915, 0.92, 0.925, 0.93, 0.935, 0.94, 0.945, 0.95, 0.955, 0.96, 0.965, 0.97, 0.975, 0.98, 0.985, 0.99, 0.995, 1, 1.005, 1.01, 1.015, 1.02, 1.025, 1.03, 1.035, 1.04, 1.045, 1.05, 1.055, 1.06, 1.065, 1.07, 1.075, 1.08, 1.085, 1.09, 1.095, or 1.1.

The subscript b in the chemical formula Li$_a$Ni$_{1-b-c}$Co$_b$M$_c$O$_d$ represents the relative amount of Co (cobalt) in the electrode active materials. In general, the amount of Co is very low—such as where b is from 0 to 0.1 or from 0 to 0.05. In some cases, b may be or may be about 0, 0.005, 0.010, 0.015, 0.020, 0.025, 0.030, 0.035, 0.040, 0.045, 0.050, 0.055, 0.060, 0.065, 0.070, 0.075, 0.080, 0.085, 0.090, 0.095, or 0.100.

The subscript c in the chemical formula Li$_a$Ni$_{1-b-c}$Co$_b$M$_c$O$_d$ represents the relative amount of metal(s) and/or non-metal(s) M in the electrode active materials. In general, c can vary from about 0 to about 0.67. In some cases, c may be from about 0 to about 0.5. Since M can correspond to one or multiple metals and/or non-metals, it will be appreciated that the stoichiometric coefficient for the individual metals and/or non-metals may total to c. Example values for c may be or may be about 0, 0.005, 0.010, 0.015, 0.020, 0.025, 0.030, 0.035, 0.040, 0.045, 0.050, 0.055, 0.060, 0.065, 0.070, 0.075, 0.080, 0.085, 0.090, 0.095, 0.100, 0.105, 0.110, 0.115, 0.120, 0.125, 0.130, 0.135, 0.140, 0.145, 0.150, 0.155, 0.160, 0.165, 0.170, 0.175, 0.180, 0.185, 0.190, 0.195, 0.200, 0.205, 0.210, 0.215, 0.220, 0.225, 0.230, 0.235, 0.240, 0.245, 0.250, 0.255, 0.260, 0.265, 0.270, 0.275, 0.280, 0.285, 0.290, 0.295, 0.300, 0.305, 0.310, 0.315, 0.320, 0.325, 0.330, 0.335, 0.340, 0.345, 0.350, 0.355, 0.360, 0.365, 0.370, 0.375, 0.380, 0.385, 0.390, 0.395, 0.400, 0.405, 0.410, 0.415, 0.420, 0.425, 0.430, 0.435, 0.440, 0.445, 0.450, 0.455, 0.460, 0.465, 0.470, 0.475, 0.480, 0.485, 0.490, 0.495, 0.500, 0.505, 0.510, 0.515, 0.520, 0.525, 0.530, 0.535, 0.540, 0.545, 0.550, 0.555, 0.560, 0.565, 0.570, 0.575, 0.580, 0.585, 0.590, 0.595, 0.600, 0.605, 0.610, 0.615, 0.620, 0.625, 0.630, 0.635, 0.640, 0.645, 0.650, 0.655, 0.660, 0.665, 0.666, 0.667, or 0.670.

The subscript d in the chemical formula $Li_aNi_{1-b-c}Co_bM_cO_d$ represents the relative amount of O (oxygen) in the electrode active materials. In general, the amount of O can vary from O-rich to O-deficient. For example, d may be from about 1.9 to about 2.1 in general, or from 1.95 to 2.05, from 1.9 to 2.0, from 1.95 to 2.05, from 2.0 to 2.05, or from 2.05 to 2.1. In some cases, d may be or may be about 1.9, 1.905, 1.91, 1.915, 1.92, 1.925, 1.93, 1.935, 1.94, 1.945, 1.95, 1.955, 1.96, 1.965, 1.97, 1.975, 1.98, 1.985, 1.99, 1.995, 2, 2.005, 2.01, 2.015, 2.02, 2.025, 2.03, 2.035, 2.04, 2.045, 2.05, 2.055, 2.06, 2.065, 2.07, 2.075, 2.08, 2.085, 2.09, 2.095, 2.1.

The subscript 1-b-c in the chemical formula $Li_aNi_{1-b-c}Co_bM_cO_d$ represents the relative amount of Ni (nickel) in the electrode active materials. In general, the amount of Ni can vary from relatively low to relatively high, though the relative amount of Ni may be dependent upon the amounts of Co and metals and/or non-metals M in the electrode active materials. For example, 1-b-c may be from about 1 to about 0.5 or from 1 to 0.33. In some cases, 1-b-c may be or may be about 0.330, 0.333, 0.334, 0.335, 0.340, 0.345, 0.350, 0.355, 0.360, 0.365, 0.370, 0.375, 0.380, 0.385, 0.390, 0.395, 0.400, 0.405, 0.410, 0.415, 0.420, 0.425, 0.430, 0.435, 0.440, 0.445, 0.450, 0.455, 0.460, 0.465, 0.470, 0.475, 0.480, 0.485, 0.490, 0.495, 0.500, 0.505, 0.510, 0.515, 0.520, 0.525, 0.530, 0.535, 0.540, 0.545, 0.550, 0.555, 0.560, 0.565, 0.570, 0.575, 0.580, 0.585, 0.590, 0.595, 0.600, 0.605, 0.610, 0.615, 0.620, 0.625, 0.630, 0.635, 0.640, 0.645, 0.650, 0.655, 0.660, 0.665, 0.670, 0.675, 0.680, 0.685, 0.690, 0.695, 0.700, 0.705, 0.710, 0.715, 0.720, 0.725, 0.730, 0.735, 0.740, 0.745, 0.750, 0.755, 0.760, 0.765, 0.770, 0.775, 0.780, 0.785, 0.790, 0.795, 0.800, 0.805, 0.810, 0.815, 0.820, 0.825, 0.830, 0.835, 0.840, 0.845, 0.850, 0.855, 0.860, 0.865, 0.870, 0.875, 0.880, 0.885, 0.890, 0.895, 0.900, 0.905, 0.910, 0.915, 0.920, 0.925, 0.930, 0.935, 0.940, 0.945, 0.950, 0.955, 0.960, 0.965, 0.970, 0.975, 0.980, 0.985, 0.990, 0.995, or 1.000.

The electrode active materials may be in or prepared in a powder form, such as comprising individual secondary particles having cross-sectional dimensions (e.g., diameters) of from about 500 nm to about 30 μm. For example, the cross-sectional dimensions may be from 500 nm to 1.0 μm, from 1.0 μm to 2.5 μm, from 2.5 μm to 5.0 μm, from 5.0 μm to 7.5 μm, from 7.5 μm to 10 μm, from 10 μm to 15 μm, from 15 μm to 20 μm, or from 20 μm to 30 μm. The electrode active material may exhibit a tapped density of from about 2.0 g·cm$^{-3}$ to about 3.5 g·cm$^{-3}$, such as from 2.0 g·cm$^{-3}$ to 2.1 g·cm$^{-3}$, from 2.1 g·cm$^{-3}$ to 2.2 g·cm$^{-3}$, from 2.2 g·cm$^{-3}$ to 2.3 g·cm$^{-3}$, from 2.3 g·cm$^{-3}$ to 2.4 g·cm$^{-3}$, from 2.4 g·cm$^{-3}$ to 2.5 g·cm$^{-3}$, from 2.5 g·cm$^{-3}$ to 2.6 g·cm$^{-3}$, from 2.6 g·cm$^{-3}$ to 2.7 g·cm$^{-3}$, from 2.7 g·cm$^{-3}$ to 2.8 g·cm$^{-3}$, from 2.8 g·cm$^{-3}$ to 2.9 g·cm$^{-3}$, from 2.9 g·cm$^{-3}$ to 3.0 g·cm$^{-3}$, from 3.0 g·cm$^{-3}$ to 3.1 g·cm$^{-3}$, from 3.1 g·cm$^{-3}$ to 3.2 g·cm$^{-3}$, from 3.2 g·cm$^{-3}$ to 3.3 g·cm$^{-3}$, from 3.3 g·cm$^{-3}$ to 3.4 g·cm$^{-3}$, or from 3.4 g·cm$^{-3}$ to 3.5 g·cm$^{-3}$.

The electrode active materials may exhibit good operational lifetime, such as where a specific energy degradation after 500 cycles is less than or about 20%, less than or about 15%, or less than or about 10%. In some cases, the specific energy degradation after 1000 cycles may be less than or about 20%, less than or about 15%, or less than or about 10%. In some cases, the specific energy degradation after 100 cycles may be less than or about 10%, less than or about 5%, or less than or about 2.5%.

Cathodes

The electrode active materials described herein can be cathode active materials and useful as cathodes (positive electrodes). FIG. 1 provides a schematic illustration of an example cathode 100, which comprises a cathode current collector 105 and a cathode active material 110. Cathode current collector 105 may be any suitable current collector, such as those used in the art. In some examples, the cathode current collector 105 may comprise aluminum (e.g., an aluminum foil). Cathode active material 110 may comprise any of the electrode active materials described herein, such as those having the general chemical formula $Li_aNi_{1-b-c}Co_bM_cO_d$ described above.

Depending on the cathode configuration, the cathode active material 110 may have any suitable dimensions or mass. The electrode active material of cathode active material 110 may optionally be mixed with binders or conductive additives, as known in the art.

Electrochemical Cells

Figure 2:
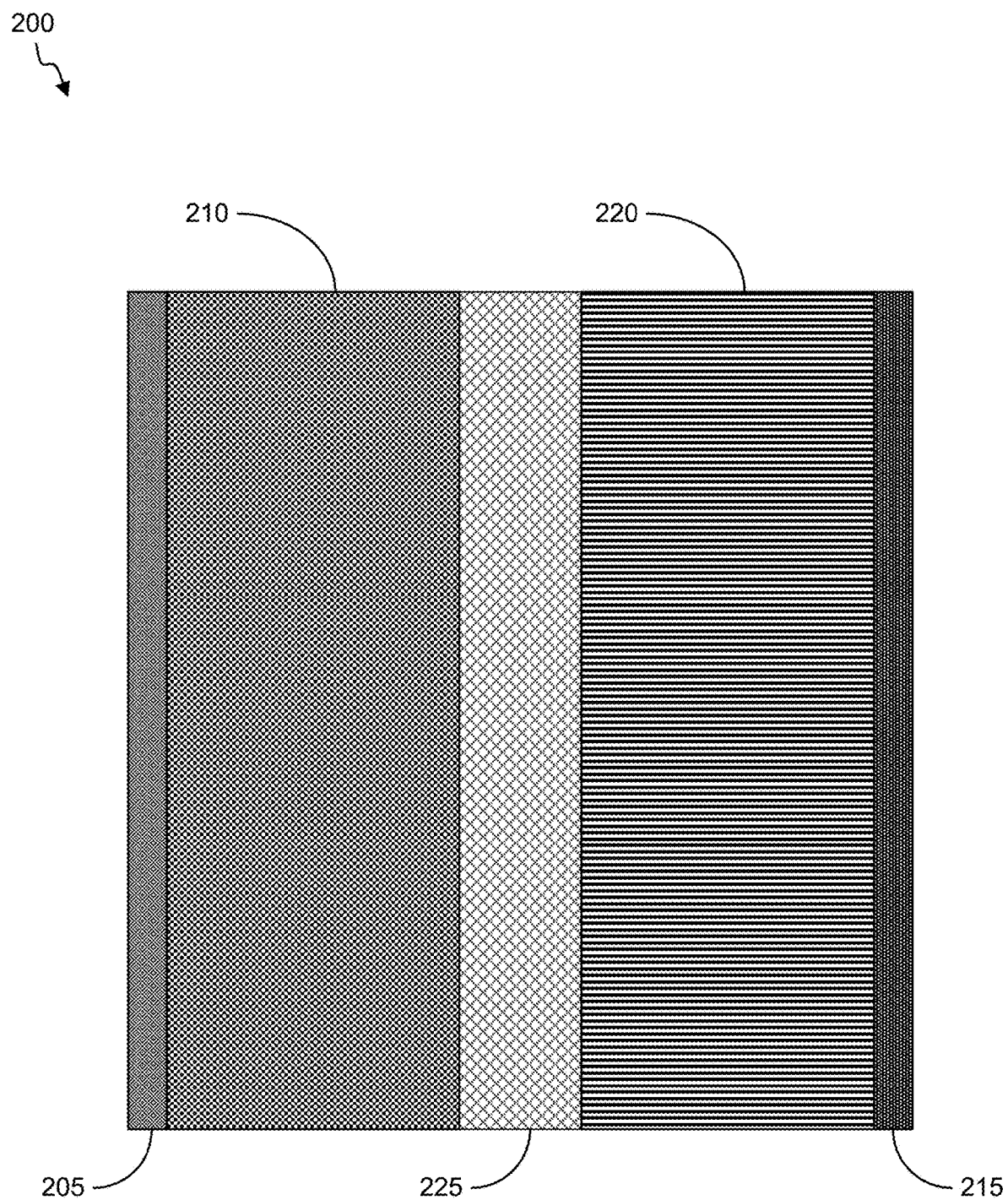
FIG. 2 provides a schematic illustration of an example electrochemical cell according to at least some aspects of the present disclosure.

The electrode active materials, cathode active materials, and cathodes described herein can be useful in electrochemical cells and batteries. FIG. 2 provides a schematic illustration of an example electrochemical cell 200, which comprises a cathode current collector 205, a cathode active material 210, an anode current collector 215, an anode active material 220, and a separator 225.

The cathode current collector 205 may comprise aluminum, for example. The cathode active material 210 may correspond to any of the electrode active materials described herein. The cathode active 210 material may be mixed with a binder, a conductive additive, a liquid or a solid electrolyte, etc.

The anode current collector 215 may comprise copper. In some cases, the anode current collector 215 may not be used. Example materials for the anode active material 220 may include, but is not limited to, graphite, carbon, silicon, lithium titanate ($Li_4Ti_5O_{12}$), tin, antimony, zinc, phosphorous, lithium, or a combination thereof. The anode active material 220 may be mixed with a binder, a conductive additive, a liquid or a solid electrolyte, etc.

The separator 225 may be any suitable non-reactive material. Example separators may be polymeric membranes like polypropylene, poly(methyl methacrylate), or polyacrylonitrile, or may be solid or ceramic electrolytes. The separator 225 may include (e.g., have pores filled with) an electrolyte or may function as an electrolyte itself, which may be used to conduct ions back and forth between the cathode active material 210 and the anode active material 220. Example electrolytes may be or include an organic solvent, such as ethylene carbonate, dimethyl carbonate, or diethyl carbonate, or solid or ceramic electrolytes. Electrolytes may include dissolved lithium salts, such as $LiPF_6$, $LiBF_4$, or $LiClO_4$, and other additives.

Methods

The $Li_aNi_{1-b-c}Co_bM_cO_d$ materials may be synthesized through metal co-precipitation and lithiation calcination. First, dissolvable salts of nickel, cobalt, and M, including but not limited to, nitrates, chlorides, acetates, sulfates, oxalates, and a combination thereof, are mixed to make an aqueous solution with appropriate metal molar ratios. The concentration of the mixed-metal ion aqueous solution may be from 0.1 mol·L$^{-1}$ to 3.0 mol·L$^{-1}$. The mixed-metal ion aqueous solution is pumped into a tank reactor at a controlled rate under a non-oxidizing gaseous atmosphere. An aqueous solution of sodium hydroxide, potassium hydroxide, sodium carbonate, potassium carbonate, and a combination thereof, at 0.2 mol·L$^{-1}$ to 10 mol·L$^{-1}$ is separately pumped into the tank reactor to maintain a pH of 8.0 to 12.5. A chelating agent, for example an aqueous solution of ammonium hydroxide, is also pumped into the tank reactor to maintain an appropriate concentration of the chelating agent inside the tank reactor. The co-precipitation reaction takes place at a controlled temperature of 30° C. to 80° C.

Subsequently, a precursor P is obtained through washing, filtering, and drying of the material from the tank reactor and mixed with a lithium salt and an additive material X at appropriate molar ratios. The lithium salt comprises a lithium carbonate, a lithium hydroxide, a lithium acetate, a lithium oxide, a lithium oxalate, and a combination thereof. The additive material X comprises salts of M, including but not limited to, oxides, carbonates, nitrates, acetates, oxalates, hydroxides, fluorides, isopropoxides, and a combination thereof. The mixed precursor P, lithium salt, and additive material X is calcined at 600° C. to 1000° C. under a flowing gaseous atmosphere of an oxygen content from 21% (air) to 100% (pure oxygen) to obtain the lithiated oxide L.

In some examples, the lithiated oxide L is the final product, $Li_aNi_{1-b-c}Co_bM_cO_d$. Optionally, the lithiated oxide L is further subject to a surface treatment. During the surface treatment, the lithiated oxide L is mixed with a liquid comprising deionized water, boric acid, phosphoric acid, ethanol, isopropanol, and a combination thereof.

After drying, the lithiated oxide L is mixed with a lithium salt and an additive material Y at appropriate molar ratios. The lithium salt comprises a lithium carbonate, a lithium hydroxide, a lithium acetate, a lithium oxide, a lithium oxalate, and a combination thereof. The additive material Y comprises salts of M, including but not limited to, oxides, carbonates, nitrates, acetates, oxalates, hydroxides, fluorides, isopropoxides, and a combination thereof.

The mixed lithiated oxide L, lithium salt, and additive material Y is subsequently calcined at elevated temperature, optionally under a flowing gaseous atmosphere of an oxygen content from 21% (air) to 100% (pure oxygen), to obtain the final product, $Li_aNi_{1-b-c}Co_bM_cO_d$.

The synthesis of $Li_aNi_{1-b-c}Co_bM_cO_d$ may be similar to the established production methods, but also provides a series of advantages: (i) a precise control of metal co-precipitation of nickel and other metals and/or non-metals at appropriate molar ratios that enables homogenous mixing at the atomic scale, (ii) a precise control of metal co-precipitation and lithiation calcination that enables fine tuning of the morphology and microstructure of the material secondary and primary particles, and (iii) an optional surface treatment that reduces residual lithium species and enhances surface stability of the material. It will be appreciated that the properties of lithium transition-metal layered oxides are extremely sensitive to their synthesis conditions. The synthesis described is useful for enabling the high specific energy, high voltage, high rate capability, long operational lifetime, and desirable safety of $Li_aNi_{1-b-c}Co_bM_cO_d$.

The invention may be further understood by the following non-limiting examples.

Example 1

Low-cobalt cathode active materials comprising $LiNi_{0.9}Co_{0.05}Mn_{0.05}O_2$, $LiNi_{0.9}Co_{0.05}Al_{0.05}O_2$, and $LiNi_{0.9}Co_{0.04}Mn_{0.04}Al_{0.01}Mg_{0.01}O_2$ were prepared according to the methods described herein. Dissolvable salts of nickel, cobalt, manganese, aluminum, and magnesium were used to make aqueous solutions of varying molar ratios at 2.0 mol·L$^{-1}$. The mixed-metal ion aqueous solution was pumped into a tank reactor at a controlled rate under nitrogen atmosphere. An aqueous solution of potassium hydroxide at 6.0 mol·L$^{-1}$ and ammonium hydroxide at 1.0 mol·L$^{-1}$ was separately pumped into the tank reactor to maintain a pH of 11.5±0.5. The co-precipitation reaction took place at 50±5° C. Subsequently, precursors comprising $Ni_{0.9}Co_{0.05}Mn_{0.05}(OH)_2$, $Ni_{0.9}Co_{0.05}Al_{0.05}(OH)_2$, and $Ni_{0.9}Co_{0.04}Mn_{0.04}Al_{0.01}Mg_{0.01}(OH)_2$ were obtained through washing, filtering, and drying and mixed with lithium hydroxide at a molar ratio of 1:1.03±0.02. The mixed precursor and lithium hydroxide was calcinated at 750±20° C. for 17.5±7.5 h under an oxygen atmosphere of a 2.75±2.25 liter per minute flow rate to obtain $LiNi_{0.9}Co_{0.05}Mn_{0.05}O_2$, $LiNi_{0.9}Co_{0.05}Al_{0.05}O_2$, and $LiNi_{0.9}Co_{0.04}Mn_{0.04}Al_{0.01}Mg_{0.01}O_2$. It will be appreciated that the lithium and oxygen contents in these chemical compositions are based on stoichiometry, but the lithium and oxygen contents may deviate from their stoichiometric values.

Figure 3:
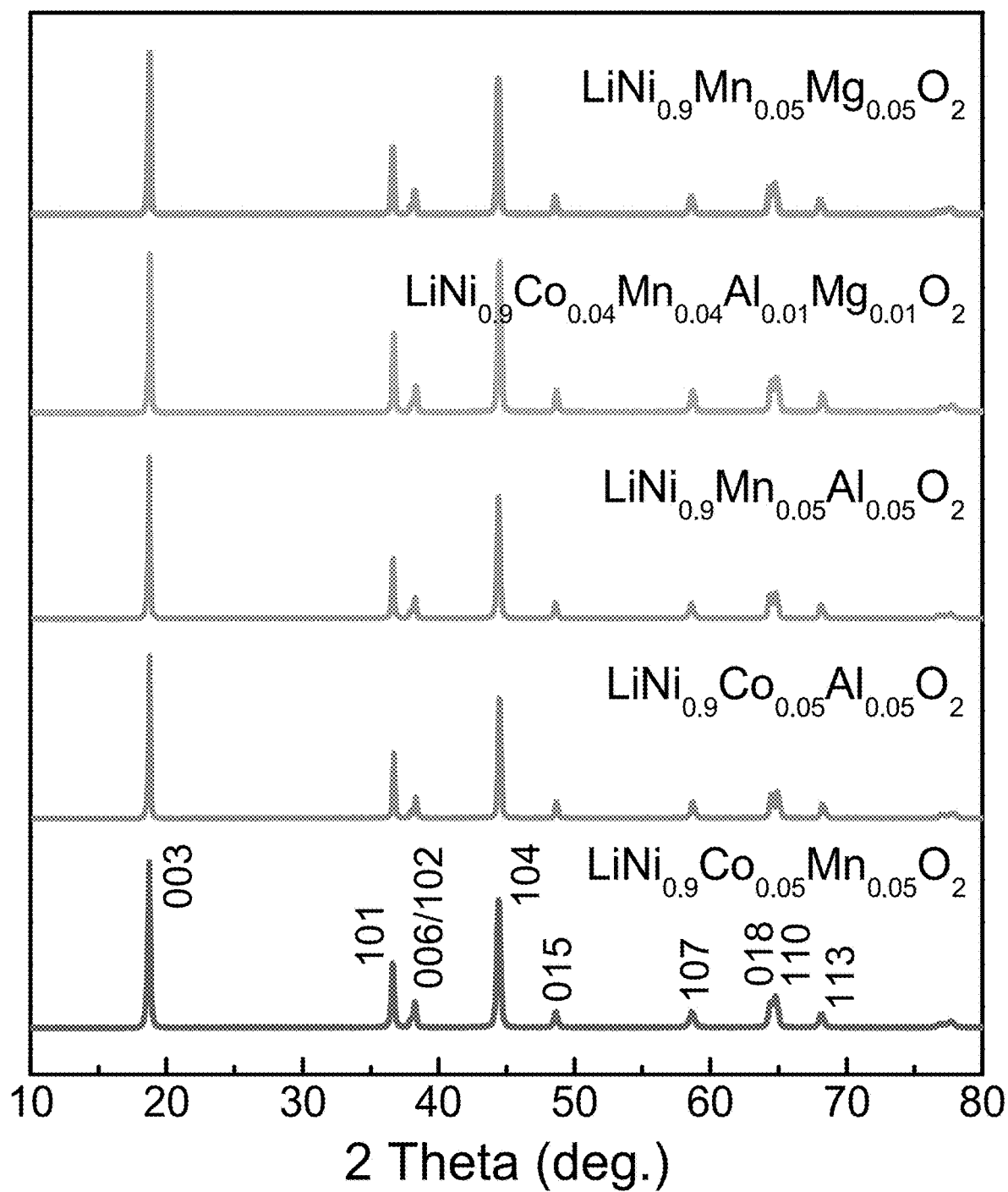
FIG. 3 provides X-ray diffraction (XRD) patterns of $LiNi_{0.9}Co_{0.05}Mn_{0.05}O_2$, $LiNi_{0.9}Co_{0.05}Al_{0.05}O_2$, $LiNi_{0.9}Mn_{0.05}Al_{0.05}O_2$, $LiNi_{0.9}Co_{0.04}Mn_{0.04}Al_{0.01}Mg_{0.01}O_2$, and $LiNi_{0.9}Mn_{0.05}Mg_{0.05}O_2$.

FIG. 3 shows the X-ray diffraction (XRD) patterns of $LiNi_{0.9}Co_{0.05}Mn_{0.05}O_2$, $LiNi_{0.9}Co_{0.05}Al_{0.05}O_2$, and $LiNi_{0.9}Co_{0.04}Mn_{0.04}Al_{0.01}Mg_{0.01}O_2$. At the bulk level, all materials exhibited an R$\overline{3}$m layered structure (rhombohedral structure) with a non-significant amount of secondary (impurity) structures. However, local secondary structures can be found in some examples within the surface region of a secondary particle. The local secondary phases are, in some examples, generated through lithiation calcination due to varying synthesis conditions and provide desirable material properties including, but not limited to, high specific energy, high voltage, high rate capability, long operational lifetime, and good safety. The local secondary structures are, in some examples, generated through a post-calcination surface treatment and reduce the amount of surface residual lithium species and increase cycle and thermal stability of the cathode material.

Figure 4:
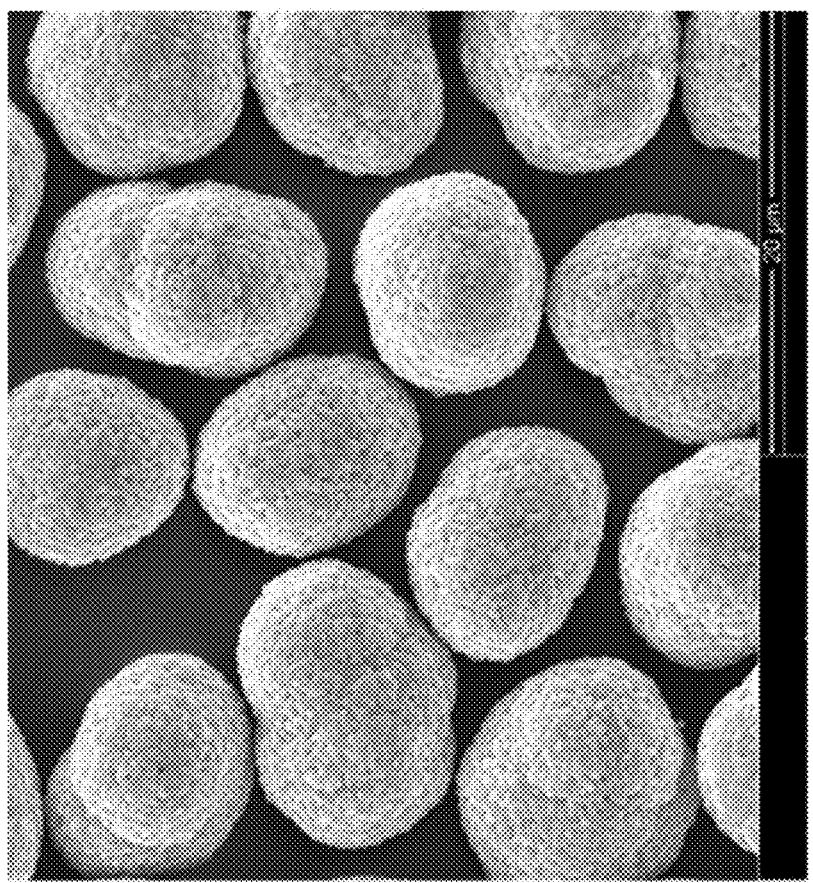
FIG. 4 provides scanning electron microscopy (SEM) images of $LiNi_{0.9}Co_{0.05}Mn_{0.05}O_2$.
Figure 4:
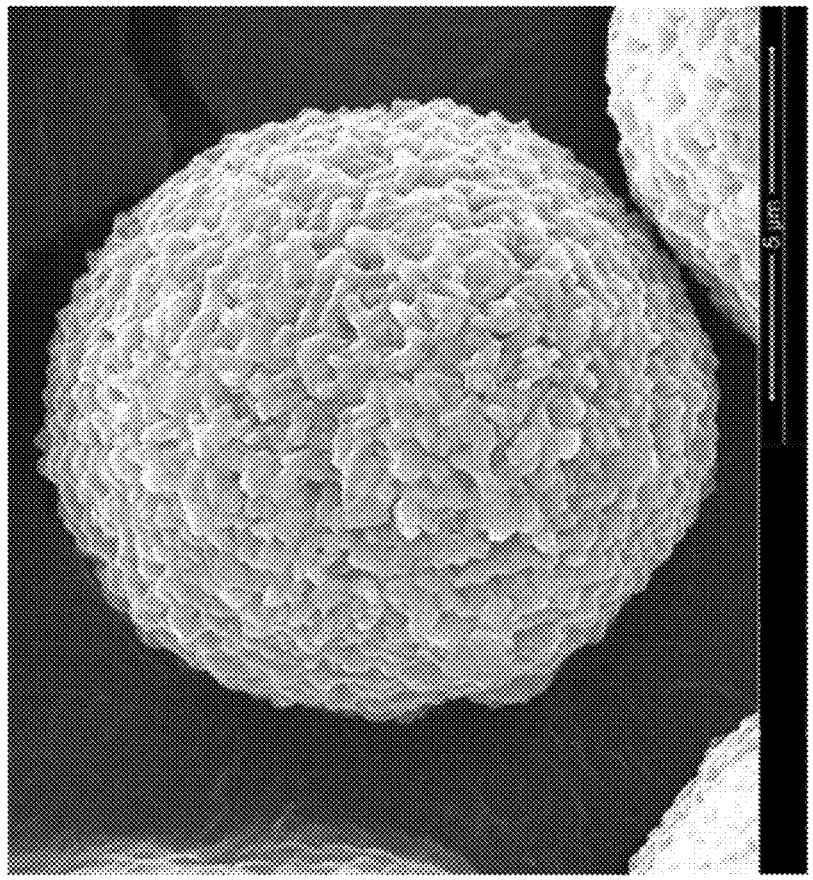
Figure 5:
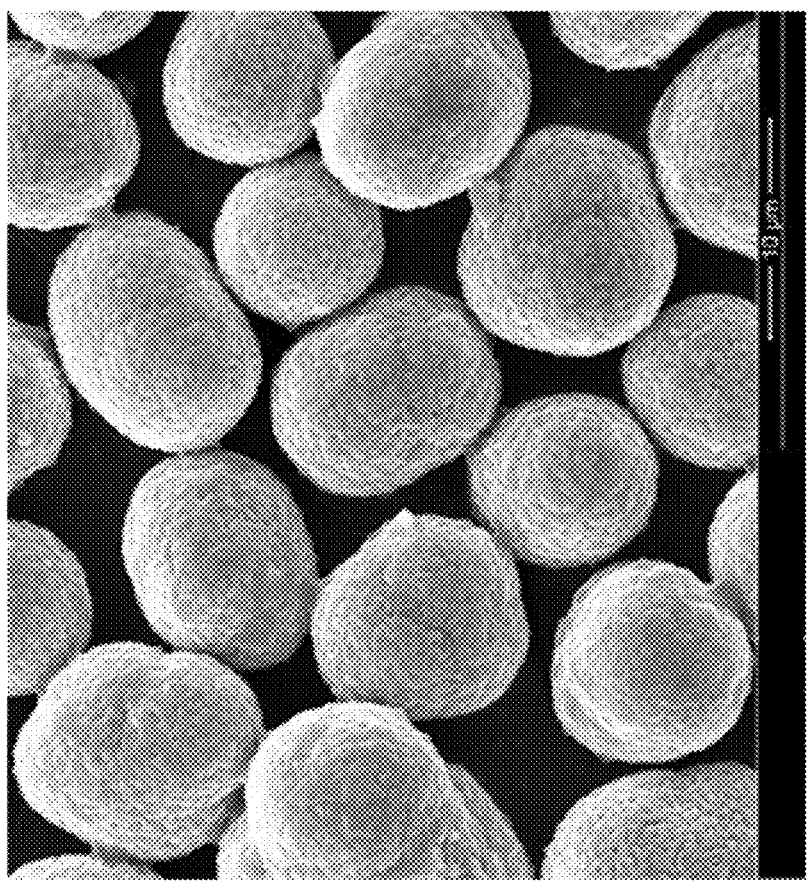
FIG. 5 provides scanning electron microscopy (SEM) images of $LiNi_{0.9}Co_{0.05}Al_{0.05}O_2$.
Figure 5:
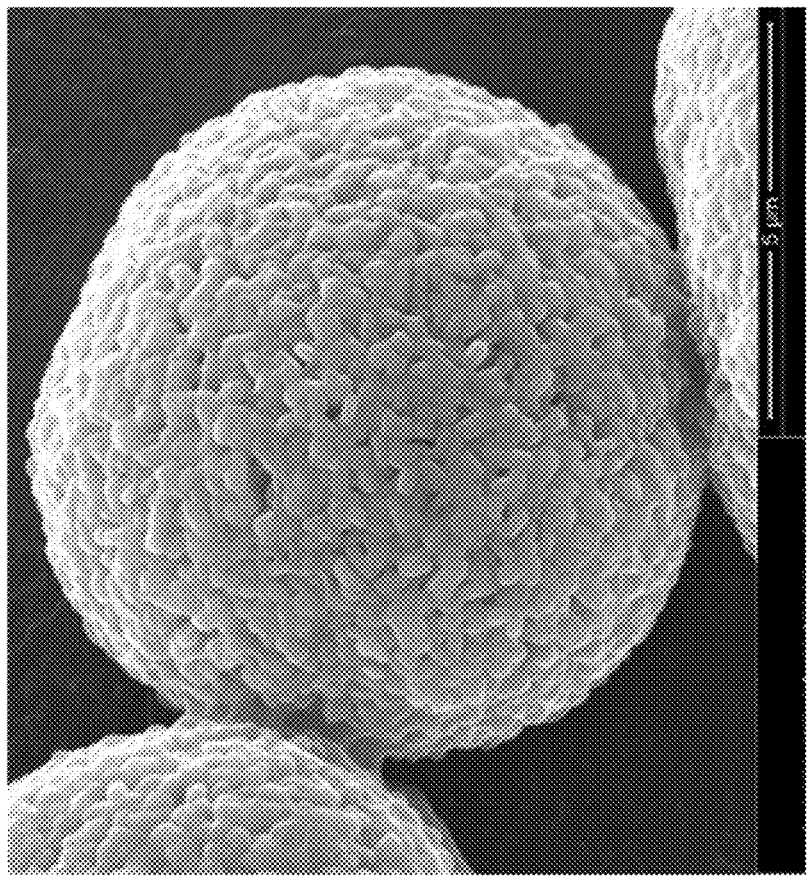
Figure 6:
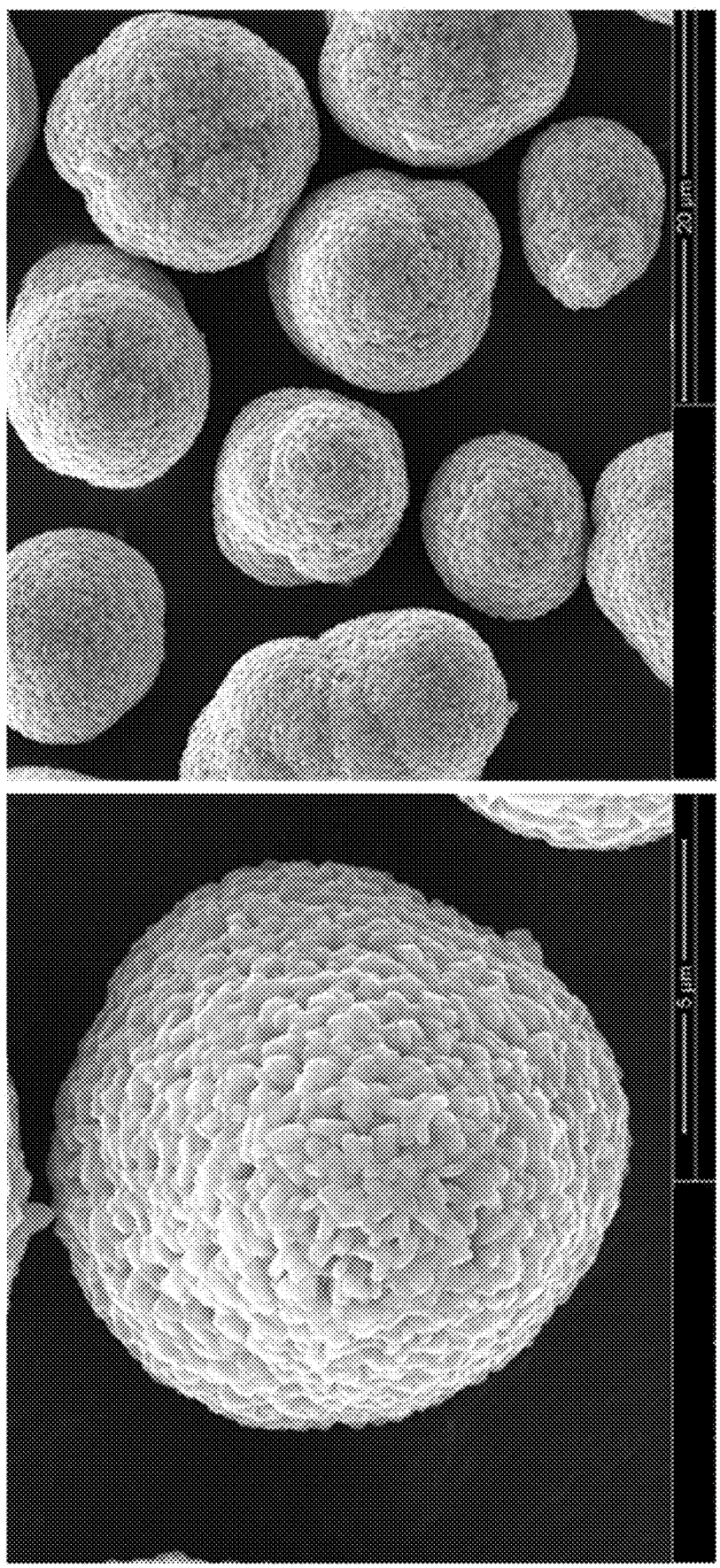
FIG. 6 provides scanning electron microscopy (SEM) images of $LiNi_{0.9}Co_{0.04}Mn_{0.04}Al_{0.01}Mg_{0.01}O_2$.

FIG. 4, FIG. 5, and FIG. 6 show the scanning electron microscopy (SEM) images of $LiNi_{0.9}Co_{0.05}Mn_{0.05}O_2$, $LiNi_{0.9}Co_{0.05}Al_{0.05}O_2$, and $LiNi_{0.9}Co_{0.04}Mn_{0.04}Al_{0.01}Mg_{0.01}O_2$, respectively. All the materials comprised a plurality of particles termed as "secondary particles" of an average particle size of 8 μm to 15 μm. In some examples, the secondary particle size varies from 15 μm to 30 μm. In some examples, the secondary particle size varies from 7.5 μm to 15 μm. In some examples, the secondary particle size varies from 2.5 μm to 7.5 μm. In some examples, the secondary particle size varies from 500 nm to 2.5 μm. In some examples, the plurality of secondary particles are substantially monodisperse. In some examples, the plurality of secondary particles are polydisperse, comprising a fraction of secondary particles of at least an order of magnitude larger size than another fraction of secondary particles. In some examples, the plurality of secondary particles are substantially spherical in shape. In FIG. 4, FIG. 5, and FIG.

6, a secondary particle further comprised a plurality of particles termed as "primary particles" of an average particle size of 100 nm to 500 nm. A secondary particle may comprise 1 to 100,000,000 or more primary particles. In some examples, the primary particle size varies from 10 nm to 100 nm. In some examples, the primary particle size varies from 100 nm to 1000 nm. In some examples, the primary particle size varies from 1 μm to 10 μm. In some examples, the plurality of primary particles are substantially monodisperse. In some examples, a secondary particle comprises one primary particle, and the term "single-crystal" is used to describe this particle morphology.

The cathode active materials exhibited a tapped density of about 2.5 g·cm$^{-3}$ to 2.6 g·cm$^{-3}$. The cathode active material was formed into a composite cathode electrode by depositing a slurry of the cathode active material in N-Methyl-2-Pyrrolidone onto an aluminum foil current collector and allowing the solvent to evaporate. The areal capacity loading of the cathode active material is about 2.0 mAh·cm$^{-2}$. The cathode was assembled into an electrochemical cell with either a lithium metal anode or a graphite anode, a separator comprising a blend of polypropylene and polyethylene soaked with a nonaqueous carbonate-based electrolyte comprising 1.0 molar LiPF$_6$ in a solvent mixture of ethylene carbonate and ethyl methyl carbonate (3:7 by weight) with an additive of vinylene carbonate (2% by weight). Voltage profiles were obtained for charging and discharging the electrochemical cell.

Figure 7:
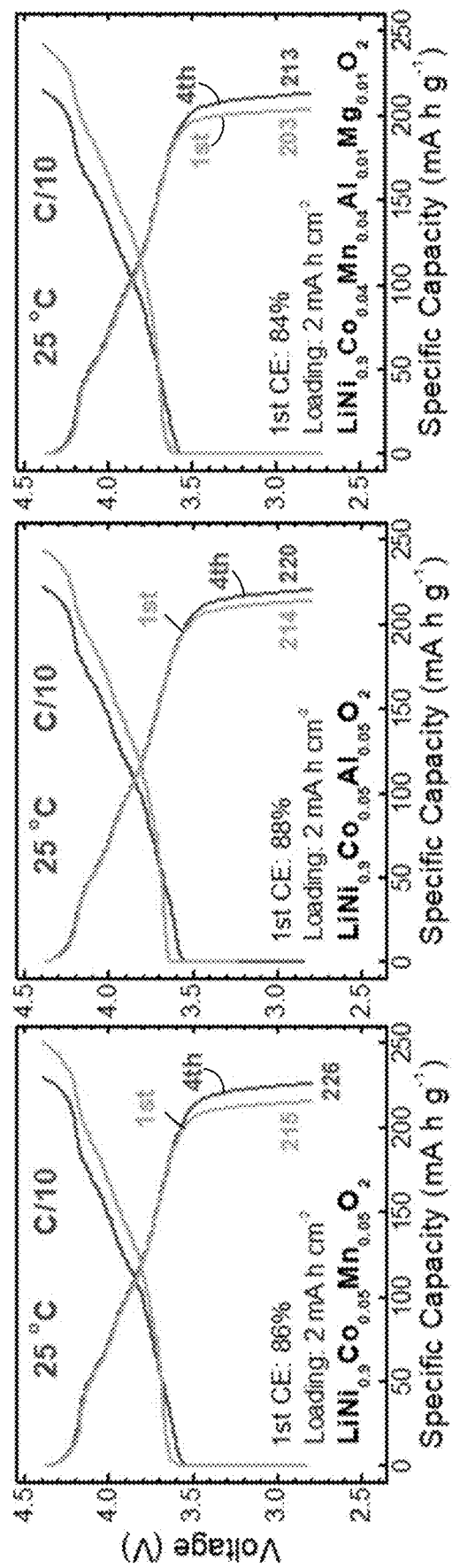
FIG. 7 provides galvanostatic charge-discharge voltage profiles of $LiNi_{0.9}Co_{0.05}Mn_{0.05}O_2$, $LiNi_{0.9}Co_{0.05}Al_{0.05}O_2$ and $LiNi_{0.9}Co_{0.04}Mn_{0.04}Al_{0.01}Mg_{0.01}O_2$ in lithium-ion cells paired with lithium metal.

FIG. 7 shows the galvanostatic charge-discharge voltage profiles of LiNi$_{0.9}$Co$_{0.05}$Mn$_{0.05}$O$_2$, LiNi$_{0.9}$Co$_{0.05}$Al$_{0.05}$O$_2$, and LiNi$_{0.9}$Co$_{0.04}$Mn$_{0.04}$Al$_{0.01}$Mg$_{0.01}$O$_2$ in lithium-ion cells paired with lithium metal. All lithium-ion cells were cycled between 2.8 V and 4.4 V vs. Li$^+$/Li at ambient temperature (25° C.). LiNi$_{0.9}$Co$_{0.05}$Mn$_{0.05}$O$_2$ delivered a specific energy of 830 Wh·kg$^{-1}$ at the first C/10 cycle with a Coulombic efficiency of 86%, and a specific energy of 865 Wh·kg$^{-1}$ at the fourth C/10 cycle. LiNi$_{0.9}$Co$_{0.05}$Al$_{0.05}$O$_2$ delivered a specific energy of 826 Wh·kg$^{-1}$ at the first C/10 cycle with a Coulombic efficiency of 88%, and a specific energy of 850 Wh·kg$^{-1}$ at the fourth C/10 cycle. LiNi$_{0.9}$Co$_{0.04}$Mn$_{0.04}$Al$_{0.01}$Mg$_{0.01}$O$_2$ delivered a specific energy of 789 Wh·kg$^{-1}$ at the first C/10 cycle with a Coulombic efficiency of 84%, and a specific energy of 823 Wh·kg$^{-1}$ at the fourth C/10 cycle.

Figure 8:
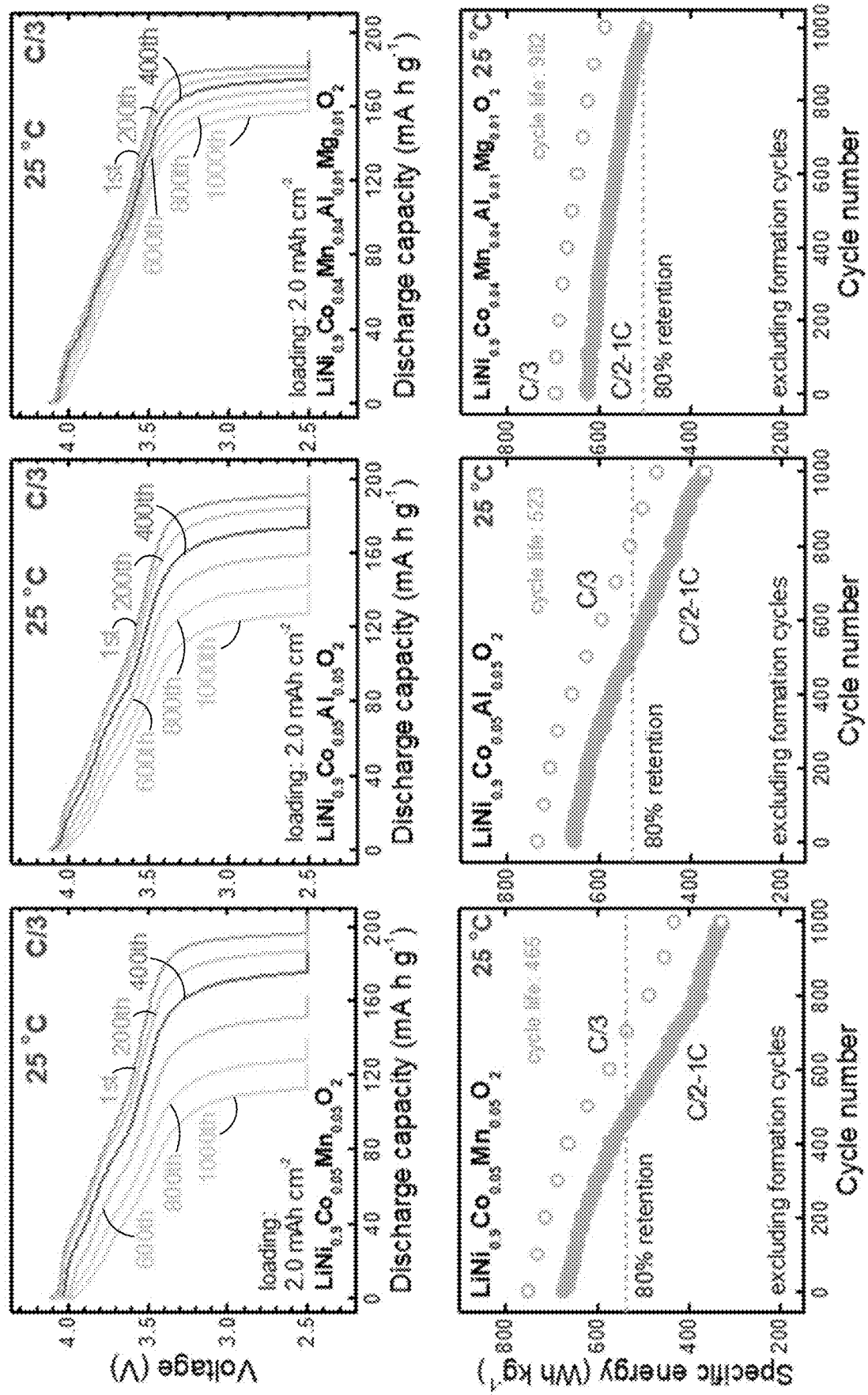
FIG. 8 provides discharge voltage profiles (upper) and evolution of specific energy as a function of cycle number (lower) of $LiNi_{0.9}Co_{0.05}Mn_{0.05}O_2$, $LiNi_{0.9}Co_{0.05}Al_{0.05}O_2$ and $LiNi_{0.9}Co_{0.04}Mn_{0.04}Al_{0.01}Mg_{0.01}O_2$ in lithium-ion cells paired with graphite.

FIG. 8 shows the discharge voltage profiles (upper) and evolution of specific energy as a function of cycle number (lower) of LiNi$_{0.9}$Co$_{0.05}$Mn$_{0.05}$O$_2$, LiNi$_{0.9}$Co$_{0.05}$Al$_{0.05}$O$_2$, and LiNi$_{0.9}$Co$_{0.04}$Mn$_{0.04}$Al$_{0.01}$Mg$_{0.01}$O$_2$ in lithium-ion cells paired with graphite. All lithium-ion cells were cycled between 2.5 V and 4.2 V vs. graphite at ambient temperature (25° C.), and the data shown excluded formation cycles. LiNi$_{0.9}$Co$_{0.05}$Mn$_{0.05}$O$_2$ delivered a specific energy of 752 Wh·kg$^{-1}$ at C/3 rate and retained 80% specific energy after 465 charge-discharge cycles at a C/2 charge rate and a 1C discharge rate. LiNi$_{0.9}$Co$_{0.05}$Al$_{0.05}$O$_2$ delivered a specific energy of 734 Wh·kg$^{-1}$ at C/3 rate and retained 80% specific energy after 523 charge-discharge cycles at a C/2 charge rate and a 1C discharge rate. LiNi$_{0.9}$Co$_{0.04}$Mn$_{0.04}$Al$_{0.01}$Mg$_{0.01}$O$_2$ delivered a specific energy of 694 Wh·kg$^{-1}$ at C/3 rate and retained 80% specific energy after 982 charge-discharge cycles at a C/2 charge rate and a 1C discharge rate.

Example 2

Cobalt-free cathode active materials comprising LiNi$_{0.9}$Mn$_{0.05}$Al$_{0.05}$O$_2$ and LiNi$_{0.9}$Mn$_{0.05}$Mg$_{0.05}$O$_2$ were prepared according to the methods described herein. Dissolvable salts of nickel, manganese, aluminum, and magnesium are used to make aqueous solutions of varying molar ratios at 2.0 mol·L$^{-1}$. The mixed-metal ion aqueous solution was pumped into a tank reactor at a controlled rate under nitrogen atmosphere. An aqueous solution of potassium hydroxide at 6.0 mol·L$^{-1}$ and ammonium hydroxide at 1.0 mol·L$^{-1}$ was separately pumped into the tank reactor to maintain a pH of 11.5±0.5. The co-precipitation reaction took place at 50±5° C. Subsequently, precursors comprising Ni$_{0.9}$Mn$_{0.05}$Al$_{0.05}$(OH)$_2$ and Ni$_{0.9}$Mn$_{0.05}$Mg$_{0.05}$(OH)$_2$ were obtained through washing, filtering, and drying and mixed with lithium hydroxide at a molar ratio of 1:1.03±0.02. The mixed precursor and lithium hydroxide was calcinated at 750±20° C. for 17.5±7.5 h under an oxygen atmosphere of a 2.75±2.25 liter per minute flow rate to obtain LiNi$_{0.9}$Mn$_{0.05}$Al$_{0.05}$O$_2$ and LiNi$_{0.9}$Mn$_{0.05}$Mg$_{0.05}$O$_2$. It will be appreciated that the lithium and oxygen contents in these chemical compositions are based on stoichiometry, but the lithium and oxygen contents may deviate from their stoichiometric values.

Figure 9:
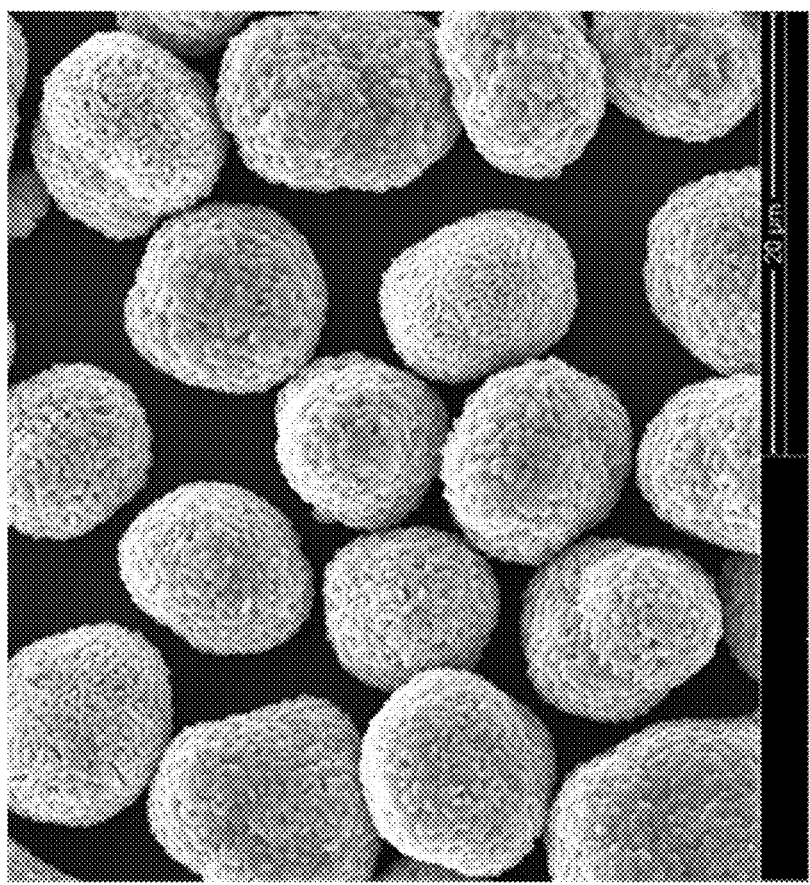
FIG. 9 provides scanning electron microscopy (SEM) images of $LiNi_{0.9}Mn_{0.05}Al_{0.05}O_2$.
Figure 9:
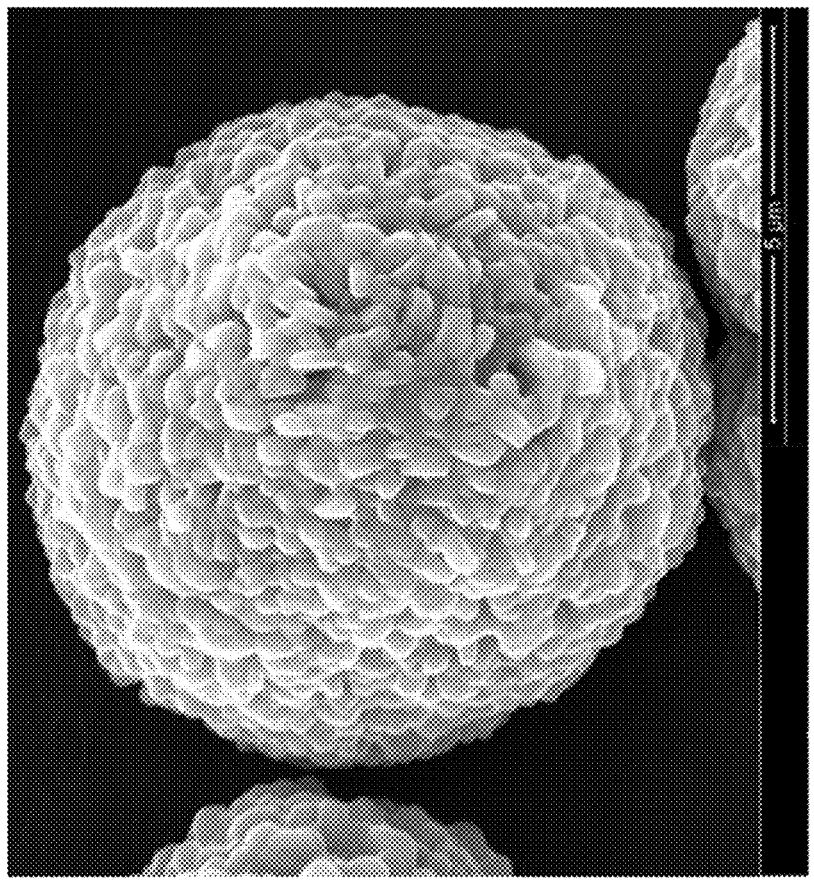

FIG. 3 shows the X-ray diffraction (XRD) patterns of LiNi$_{0.9}$Mn$_{0.05}$Al$_{0.05}$O$_2$ and LiNi$_{0.9}$Mn$_{0.05}$Mg$_{0.05}$O$_2$. At the bulk level, all materials exhibited an R$\bar{3}$m layered structure (rhombohedral structure) with a non-significant amount of secondary (impurity) structures. FIG. 9 shows the scanning electron microscopy (SEM) images of LiNi$_{0.9}$Mn$_{0.05}$Al$_{0.05}$O$_2$. The material comprised a plurality of secondary particles of an average particle size of 8 μm to 15 μm. In FIG. 9, a secondary particle further comprises a plurality of primary particles of an average particle size of 100 nm to 500 nm.

The cathode active materials exhibited a tapped density of about 2.5 g·cm$^{-3}$ to 2.6 g·cm$^{-3}$. The cathode active material was formed into a composite cathode electrode by depositing a slurry of the cathode active material in N-Methyl-2-Pyrrolidone onto an aluminum foil current collector and allowing the solvent to evaporate. The areal capacity loading of the cathode active material was around 2.0 mAh·cm$^{-2}$. The cathode was assembled into an electrochemical cell with either a lithium metal anode or a graphite anode, a separator comprising a blend of polypropylene and polyethylene soaked with a nonaqueous carbonate-based electrolyte comprising 1.0 molar LiPF$_6$ in a solvent mixture of ethylene carbonate and ethyl methyl carbonate (3:7 by weight) with an additive of vinylene carbonate (2% by weight). Voltage profiles were obtained for charging and discharging the electrochemical cell.

Figure 10:
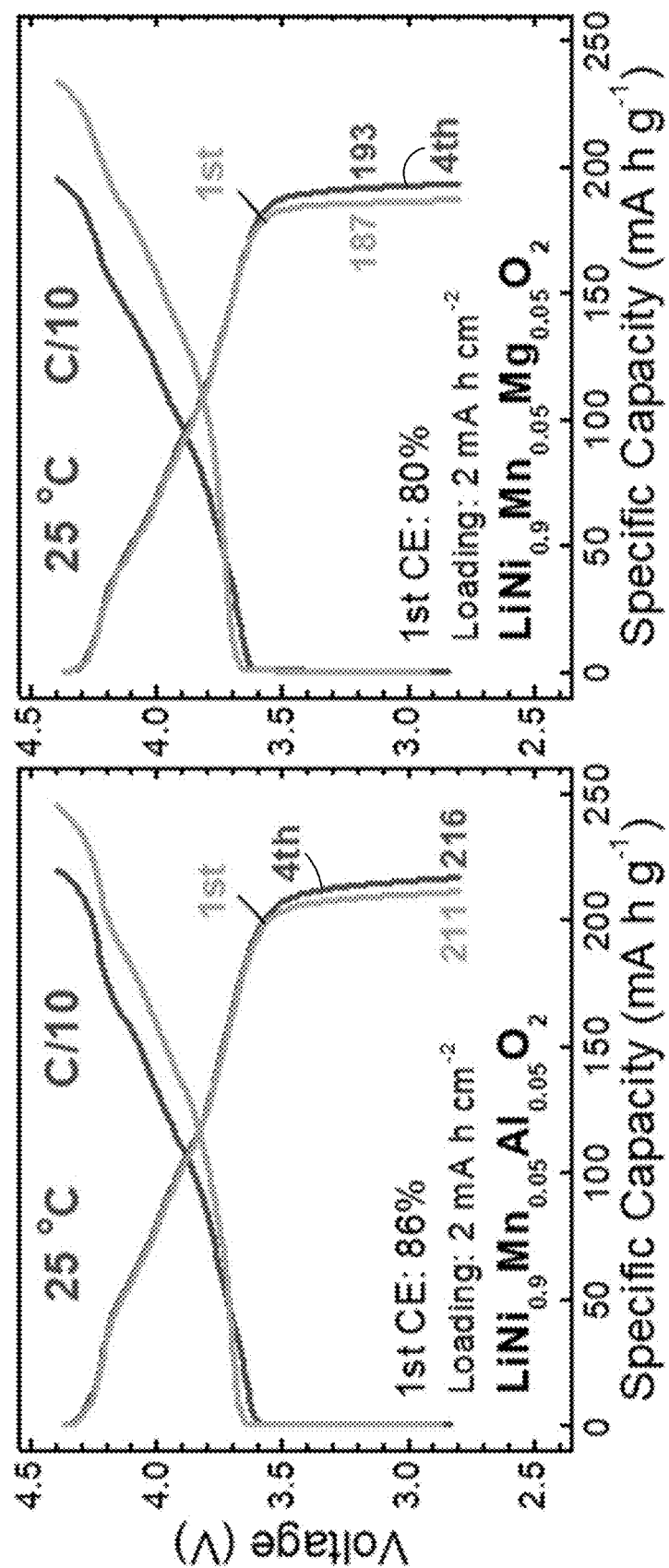
FIG. 10 provides galvanostatic charge-discharge voltage profiles of $LiNi_{0.9}Mn_{0.05}Al_{0.05}O_2$ and $LiNi_{0.9}Mn_{0.05}Mg_{0.05}O_2$ in lithium-ion cells paired with lithium metal.

FIG. 10 shows the galvanostatic charge-discharge voltage profiles of LiNi$_{0.9}$Mn$_{0.05}$Al$_{0.05}$O$_2$ and LiNi$_{0.9}$Mn$_{0.05}$Mg$_{0.05}$O$_2$ in lithium-ion cells paired with lithium metal. All lithium-ion cells were cycled between 2.8 V and 4.4 V vs. Li$^+$/Li at ambient temperature (25° C.). LiNi$_{0.9}$Mn$_{0.05}$Al$_{0.05}$O$_2$ delivered a specific energy of 823 Wh·kg$^{-1}$ at the first C/10 cycle with a Coulombic efficiency of 86%, and a specific energy of 839 Wh·kg$^{-1}$ at the fourth C/10 cycle. LiNi$_{0.9}$Mn$_{0.05}$Mg$_{0.05}$O$_2$ delivered a specific energy of 727 Wh·kg$^{-1}$ at the first C/10 cycle with a Coulombic efficiency of 80%, and a specific energy of 752 Wh·kg$^{-1}$ at the fourth C/10 cycle.

Figure 11:
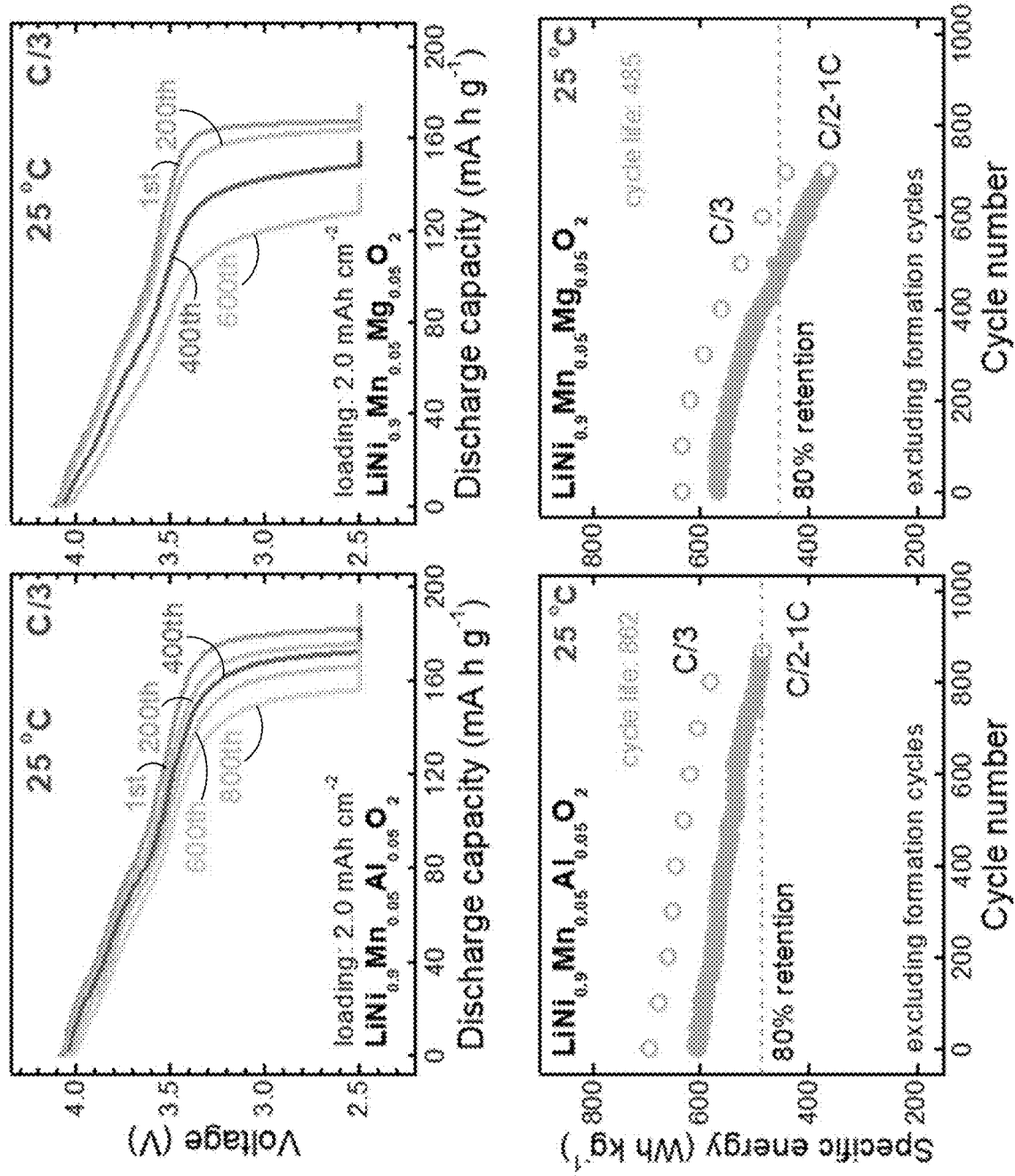
FIG. 11 provides discharge voltage profiles (upper) and evolution of specific energy as a function of cycle number (lower) of $LiNi_{0.9}Mn_{0.05}Al_{0.05}O_2$ and $LiNi_{0.9}Mn_{0.05}Mg_{0.05}O_2$ in lithium-ion cells paired with graphite.

FIG. 11 shows the discharge voltage profiles (upper) and evolution of specific energy as a function of cycle number (lower) of LiNi$_{0.9}$Mn$_{0.05}$Al$_{0.05}$O$_2$ and LiNi$_{0.9}$Mn$_{0.05}$Mg$_{0.05}$O$_2$ in lithium-ion cells paired with graphite. All lithium-ion cells were cycled between 2.5 V and 4.2 V vs. graphite at ambient temperature (25° C.), and the data shown excluded formation cycles. LiNi$_{0.9}$Mn$_{0.05}$Al$_{0.05}$O$_2$ delivered a specific energy of 695

Wh·kg$^{-1}$ at C/3 rate and retained 80% specific energy after 862 charge-discharge cycles at a C/2 charge rate and a 1C discharge rate. LiNi$_{0.9}$Mn$_{0.05}$Mg$_{0.05}$O$_2$ delivered a specific energy of 635 Wh·kg$^{-1}$ at C/3 rate and retained 80% specific energy after 485 charge-discharge cycles at a C/2 charge rate and a 1C discharge rate.

Example 3

The compositions described above in Example 1 and Example 2 were formed into coin half battery cells with lithium metal as the counter electrode for further evaluation.

Figure 12:
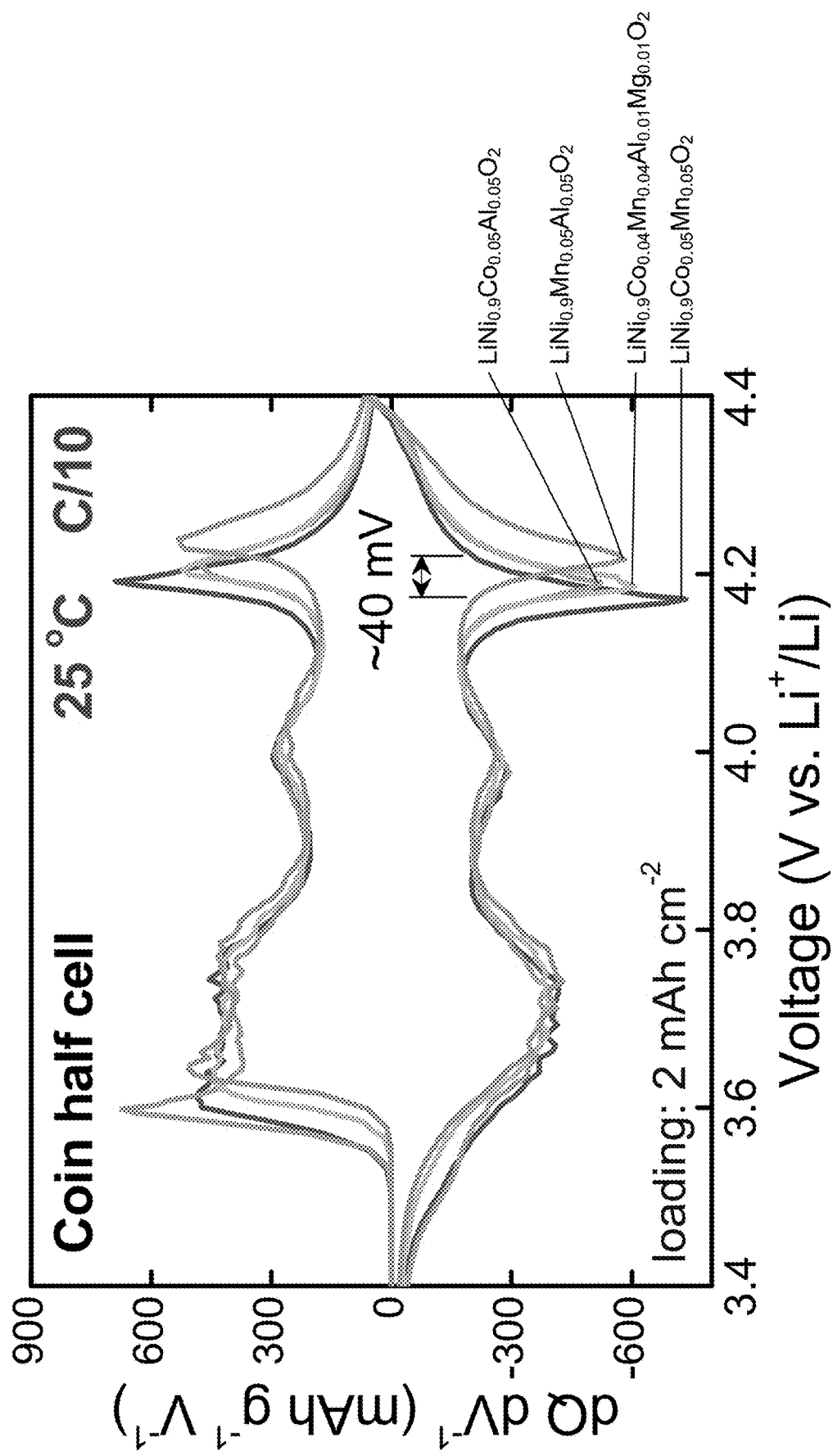
FIG. 12 provides dQ·dV$^{-1}$ curves of $LiNi_{0.90}Co_{0.05}Mn_{0.05}O_2$ (blue), $LiNi_{0.90}Co_{0.05}Al_{0.05}O_2$ (red), $LiNi_{0.90}Co_{0.04}Mn_{0.04}Al_{0.01}Mg_{0.01}O_2$ (green), and $LiNi_{0.90}Mn_{0.05}Al_{0.05}O_2$ (gray) in coin half battery cells (vs. Li metal) at 25° C. during C/10 formation cycles.

FIG. 12 shows dQ·dV$^{-1}$ curves of LiNi$_{0.90}$Co$_{0.05}$Mn$_{0.05}$O$_2$ (blue), LiNi$_{0.90}$Co$_{0.05}$Al$_{0.05}$O$_2$ (red), LiNi$_{0.90}$Co$_{0.04}$Mn$_{0.04}$Al$_{0.01}$Mg$_{0.01}$O$_2$ (green), and LiNi$_{0.90}$Mn$_{0.05}$Al$_{0.05}$O$_2$ (gray) in coin half battery cells (vs. Li metal) at 25° C. during C/10 formation cycles. LiNi$_{0.90}$Mn$_{0.05}$Al$_{0.05}$O$_2$ shows a dQ·dV$^{-1}$ curve minimum (e.g., lowest negative peak or nadir) during discharge at a voltage of above 4.20 V vs. Li$^+$/Li, distinctively higher than cobalt-containing high-nickel layered oxide cathode materials. Specifically, LiNi$_{0.90}$Mn$_{0.05}$Al$_{0.05}$O$_2$ exhibited a minimum of −580 mAh·g$^{-1}$V$^{-1}$ at 4.22 V vs. Li$^+$/Li during discharge at C/10 rate. LiNi$_{0.90}$Co$_{0.05}$Mn$_{0.05}$O$_2$ exhibited a minimum of −740 mAh·g$^{1}$V$^{-1}$ at 4.17 V vs. Li$^+$/Li during discharge at a C/10 rate. LiNi$_{0.90}$Co$_{0.05}$Al$_{0.05}$O$_2$ exhibited a minimum of −420 mAh·g$^{-1}$V$^{-1}$ at 4.19 V vs. Li$^+$/Li during discharge at a C/10 rate. LiNi$_{0.90}$Co$_{0.04}$Mn$_{0.04}$Al$_{0.01}$Mg$_{0.01}$O$_2$ exhibited a minimum of −600 mAh·g$^{1}$V$^{-1}$ at 4.18V vs. Li$^+$/Li during discharge at a C/10 rate.

To calculate the dQ·dV$^1$ plots, lithium metal coin cells were cycled at C/10 rate within 2.8 V and 4.4 V vs. Li$^+$/Li. The cycling data used for calculating the dQ/dV curves are separated by 0.02 V steps. The dQ/dV value at each voltage is calculated by the formula in Eq. 1. The charge, Q$_2$, in Eq. 1 is the total charge at the voltage of interest, V$_2$, with the proceeding data point at voltage V$_1$ and total charge for that charge or discharge cycle at Q$_1$. Since data used for dQ/dV calculation is acquired every 0.02 V, ΔV is always 0.02 V, with the unit mAh·g$^{-1}$V$^{-1}$. The voltage step of 0.02 V between acquired data points prevents noise from impacting the magnitude of the mAh·g$^{-1}$V$^{-1}$, which can increase to very large values when ΔV is set to small values.

$$\frac{dQ}{dV} = \frac{Q_2 - Q_1}{V_2 - V_1} = \frac{\Delta Q}{\Delta V} \quad \text{Eq. 1}$$

Then data points (x, y) can be plotted with $$x = \frac{1}{2}(V_1 + V_2) \text{ and } y = \frac{Q_2 - Q_1}{V_2 - V_1}.$$

Figure 13:
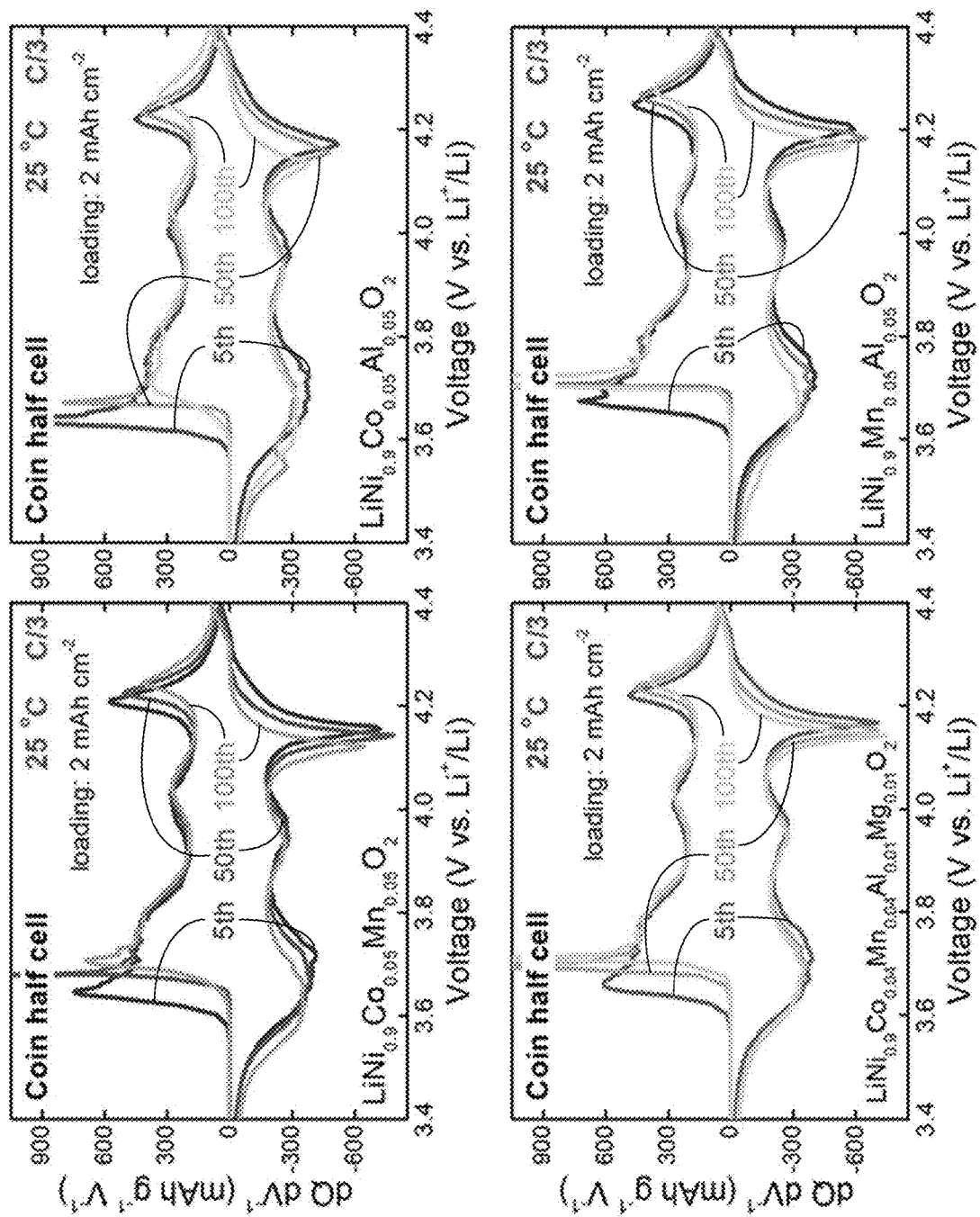
FIG. 13 provides dQ·dV$^{-1}$ curves of $LiNi_{0.90}Co_{0.05}Mn_{0.05}O_2$, $LiNi_{0.90}Co_{0.05}Al_{0.05}O_2$, $LiNi_{0.90}Co_{0.04}Mn_{0.04}Al_{0.01}Mg_{0.01}O_2$, and $LiNi_{0.90}Mn_{0.05}Al_{0.05}O_2$ in coin half battery cells (vs. Li metal) at 25° C. during C/3 cycles.

FIG. 13 shows dQ·dV$^{-1}$ curves of LiNi$_{0.90}$Co$_{0.05}$Mn$_{0.05}$O$_2$, LiNi$_{0.90}$Co$_{0.05}$Al$_{0.05}$O$_2$, LiNi$_{0.90}$Co$_{0.04}$Mn$_{0.04}$Al$_{0.01}$Mg$_{0.01}$O$_2$, and LiNi$_{0.90}$Mn$_{0.05}$Al$_{0.05}$O$_2$ in coin half battery cells (vs. Li metal) at 25° C. during C/3 cycles. It will be appreciated that since these cycles were done at C/3 rate, the dQ·dV$^{-1}$ minimum during discharge was shifted to slightly lower voltages; it also shifts to lower voltages on charge-discharge cycling. Nevertheless, LiNi$_{0.90}$Mn$_{0.05}$Al$_{0.05}$O$_2$ exhibited the dQ·dV$^{-1}$ minimum at consistently higher voltages during discharge at C/3 rate as cycling proceeds, in comparison with those of LiNi$_{0.90}$Co$_{0.05}$Mn$_{0.05}$O$_2$, LiNi$_{0.90}$Co$_{0.05}$Al$_{0.05}$O$_2$, and LiNi$_{0.90}$Co$_{0.04}$Mn$_{0.04}$Al$_{0.01}$Mg$_{0.01}$O$_2$, during discharge at C/3 rate as cycling proceeds.

Figure 14:
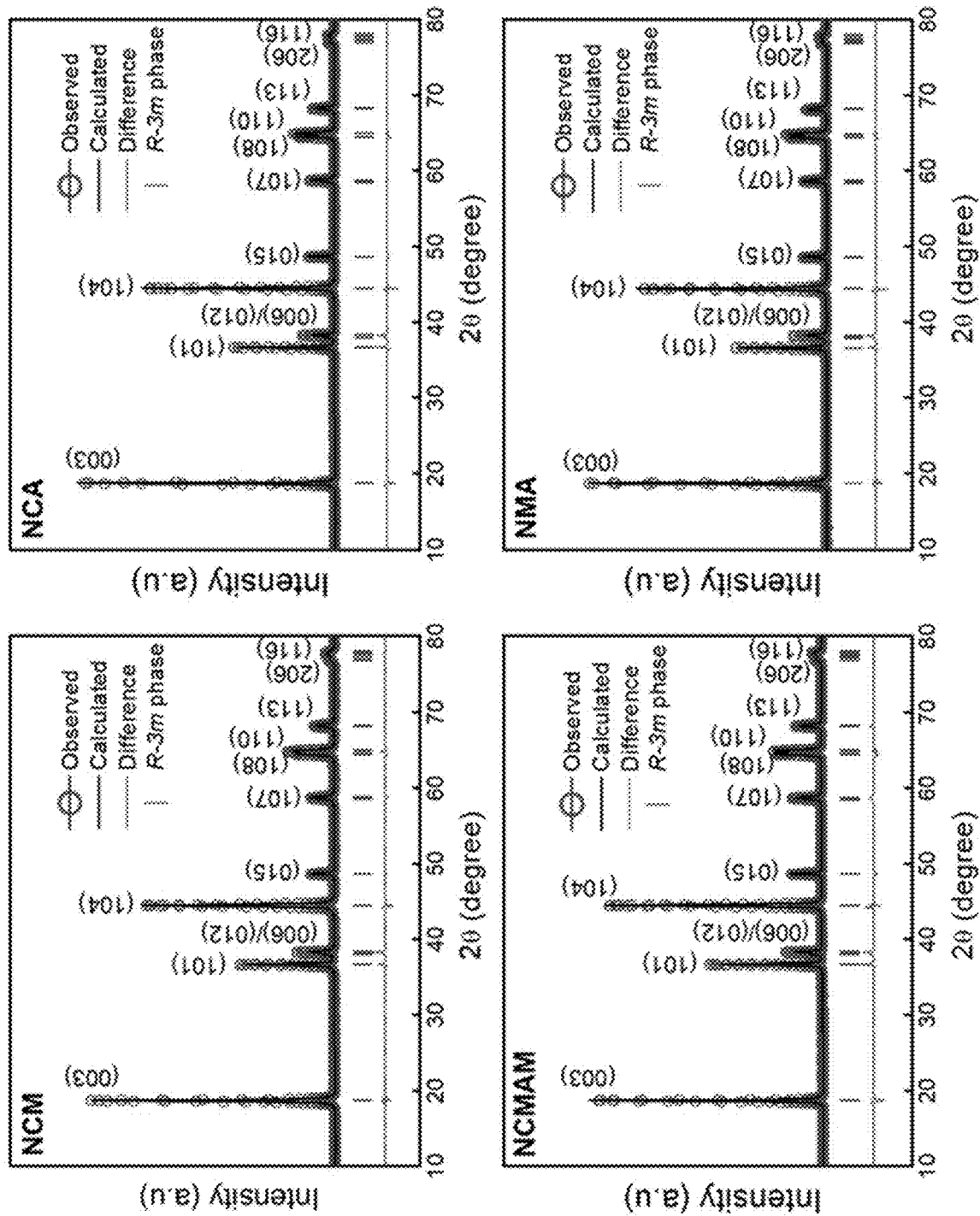
FIG. 14 provides Rietveld refinement of the X-ray diffraction (XRD) patterns of pristine $LiNi_{0.90}Co_{0.05}Mn_{0.05}O_2$ (NCM), $LiNi_{0.90}Co_{0.05}Al_{0.05}O_2$ (NCA), $LiNi_{0.90}Co_{0.04}Mn_{0.04}Al_{0.01}Mg_{0.01}O_2$ (NCMAM), and $LiNi_{0.90}Mn_{0.05}Al_{0.05}O_2$ (NMA).

FIG. 14 shows Rietveld refinement results of the X-ray diffraction (XRD) patterns of pristine LiNi$_{0.90}$Co$_{0.05}$Mn$_{0.05}$O$_2$ (NCM), LiNi$_{0.90}$Co$_{0.05}$Al$_{0.05}$O$_2$ (NCA), LiNi$_{0.90}$Co$_{0.04}$Mn$_{0.04}$Al$_{0.01}$Mg$_{0.01}$O$_2$ (NCMAM), and LiNi$_{0.90}$Mn$_{0.05}$Al$_{0.05}$O$_2$ (NMA). After lithiation calcination, the four cathode materials exhibit a well-defined hexagonal lattice structure with the R$\bar{3}$n space group. Li/Ni mixing in LiNi$_{0.90}$Co$_{0.05}$Mn$_{0.05}$O$_2$, LiNi$_{0.90}$Co$_{0.05}$Al$_{0.05}$O$_2$, LiNi$_{0.90}$Co$_{0.04}$Mn$_{0.04}$Al$_{0.01}$Mg$_{0.01}$O$_2$, and LiNi$_{0.90}$Mn$_{0.05}$Al$_{0.05}$O$_2$ is 3.3%, 1.4%, 2.6%, and 3.0%, respectively. Note that cobalt-free LiNi$_{0.90}$Mn$_{0.05}$Al$_{0.05}$O$_2$ does not show much higher lithium/nickel mixing than the cobalt-bearing cathodes.

Figure 15:
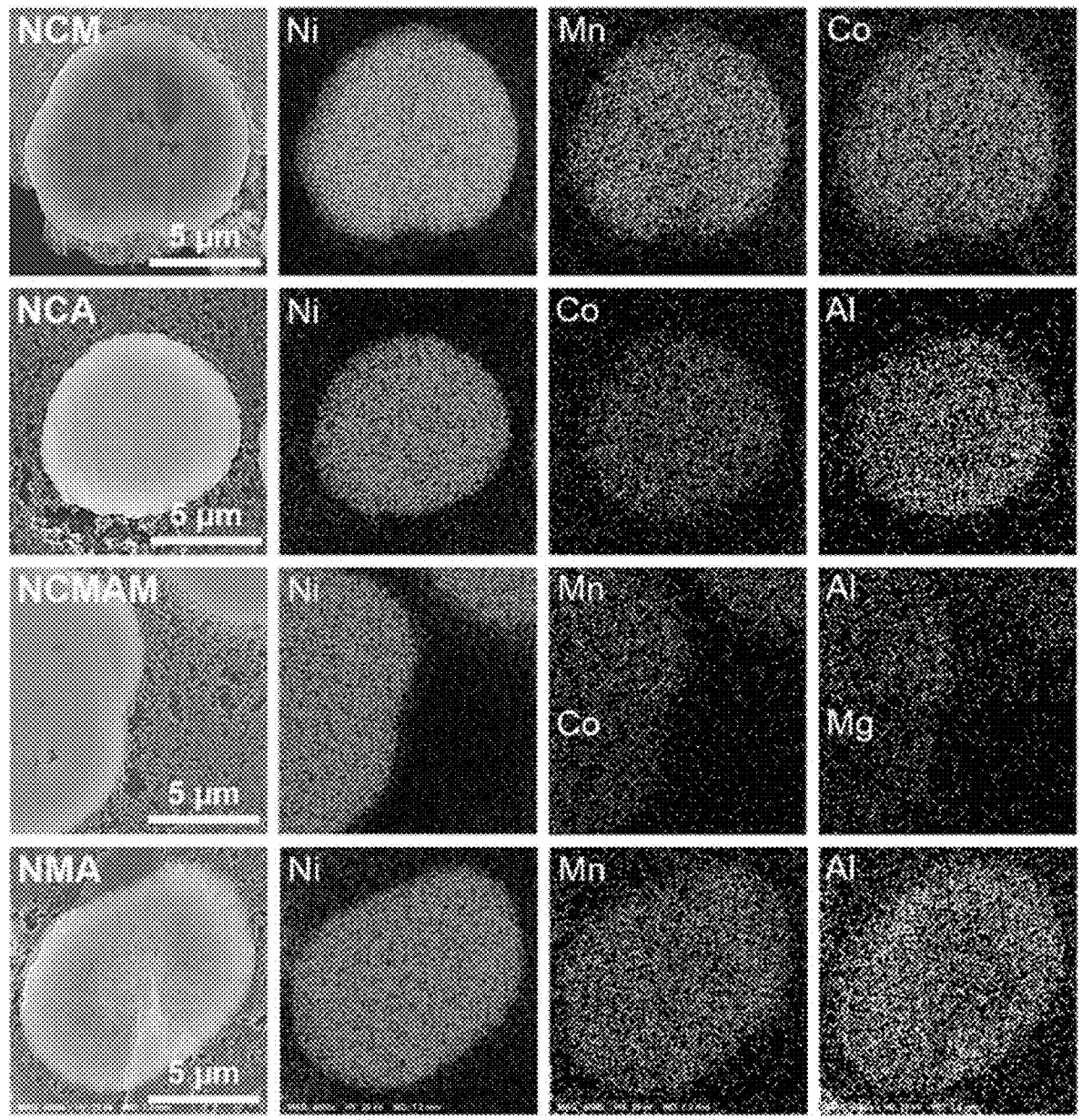
FIG. 15 provides cross-sectional scanning electron microscopy (SEM)/energy-dispersive X-ray spectroscopy (EDX) images of $LiNi_{0.90}Co_{0.05}Mn_{0.05}O_2$ (NCM), $LiNi_{0.90}Co_{0.05}Al_{0.05}O_2$ (NCA), $LiNi_{0.90}Co_{0.04}Mn_{0.04}Al_{0.01}Mg_{0.01}O_2$ (NCMAM), and $LiNi_{0.90}Mn_{0.05}Al_{0.05}O_2$ (NMA), showing elemental distribution of the four cathode materials after calcination.

FIG. 15 shows cross-sectional scanning electron microscopy (SEM)/energy-dispersive X-ray spectroscopy (EDX) images of LiNi$_{0.90}$Co$_{0.05}$Mn$_{0.05}$O$_2$ (NCM), LiNi$_{0.90}$Co$_{0.05}$Al$_{0.05}$O$_2$ (NCA), LiNi$_{0.90}$Co$_{0.04}$Mn$_{0.04}$Al$_{0.01}$Mg$_{0.01}$O$_2$ (NCMAM), and LiNi$_{0.90}$Mn$_{0.05}$Al$_{0.05}$O$_2$ (NMA), showing elemental distribution of the four cathode materials after calcination. This is particularly important for aluminum, since aluminum substitution via calcination can lead to substantial uncontrolled compositional heterogeneity and phase segregation at large concentrations (5 mol % here). An example is given below in Comparative Example 3.

Figure 16:
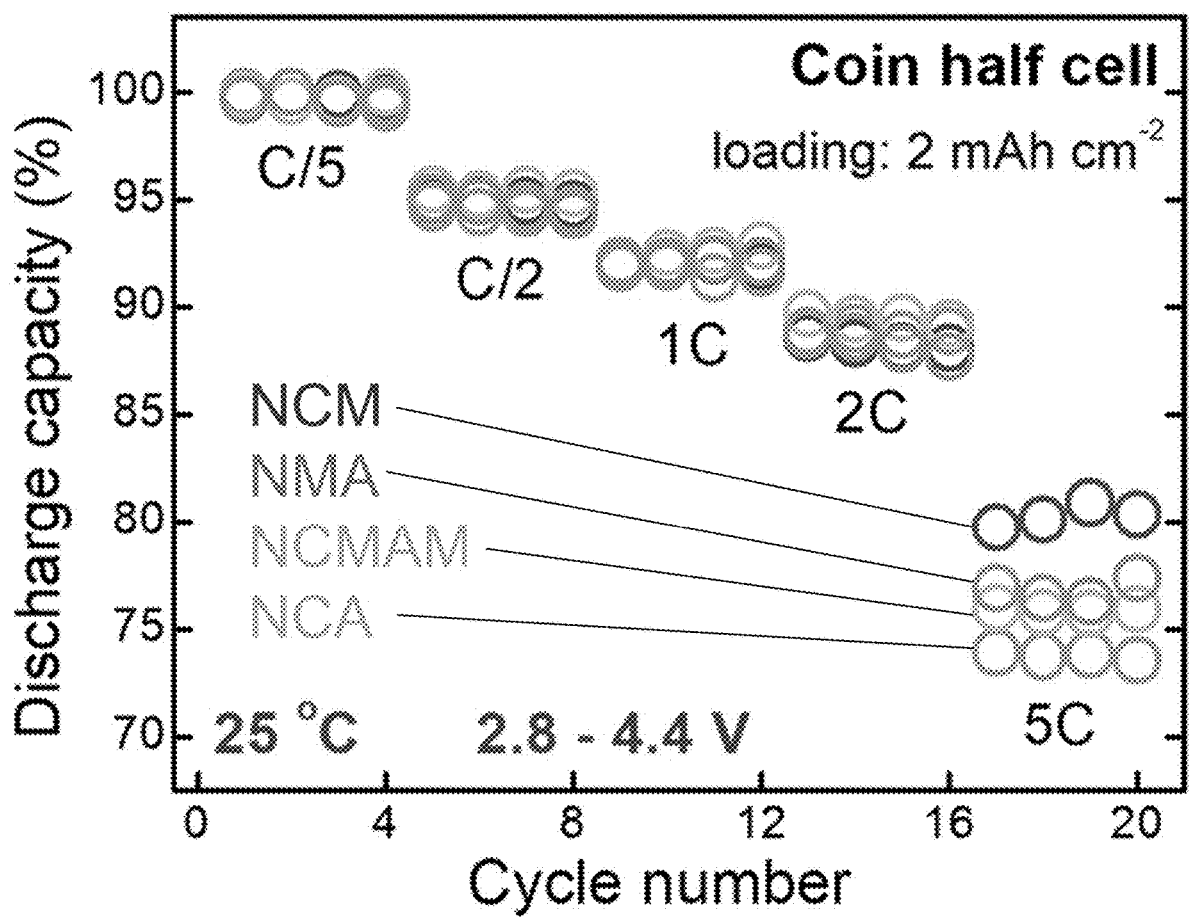
FIG. 16 provides data showing a rate capability comparison of $LiNi_{0.90}Co_{0.05}Mn_{0.05}O_2$ (NCM), $LiNi_{0.90}Co_{0.05}Al_{0.05}O_2$ (NCA), $LiNi_{0.90}Co_{0.04}Mn_{0.04}Al_{0.01}Mg_{0.01}O_2$ (NCMAM), and $LiNi_{0.90}Mn_{0.05}Al_{0.05}O_2$ (NMA) in coin half battery cells (vs. Li metal) at 25° C. up to a 5C discharge rate at a constant C/10 charge rate, normalized to their respective specific capacity at C/10 rate.

FIG. 16 compares the rate capability of LiNi$_{0.90}$Co$_{0.05}$Mn$_{0.05}$O$_2$ (NCM), LiNi$_{0.90}$Co$_{0.05}$Al$_{0.05}$O$_2$ (NCA), LiNi$_{0.90}$Co$_{0.04}$Mn$_{0.04}$Al$_{0.01}$Mg$_{0.01}$O$_2$ (NCMAM), and LiNi$_{0.90}$Mn$_{0.05}$Al$_{0.05}$O$_2$ (NMA) in coin half battery cells (vs. Li metal) at 25° C. up to a 5C discharge rate at a constant C/10 charge rate, normalized to their respective specific capacity at C/10 rate. Notably, the fast-discharging performance of LiNi$_{0.90}$Mn$_{0.05}$Al$_{0.05}$O$_2$ is very similar to that of LiNi$_{0.90}$Co$_{0.05}$Mn$_{0.05}$O$_2$ and LiNi$_{0.90}$Co$_{0.05}$Al$_{0.05}$O$_2$, in stark contrast to LiNi$_{0.9}$Mn$_{0.1}$O$_2$, which suffers from poor rate capability according to previous published studies. The presence of aluminum as a counterbalancing cation to manganese suppressing lithium/nickel mixing is believed to be critical for high-nickel LiNi$_{1-c1-c2}$Mn$_{c1}$Al$_{c2}$O$_2$-based materials in the absence of cobalt. Here, c1 and c2 total to c and may be from 0 to 0.67, for example.

Figure 17:
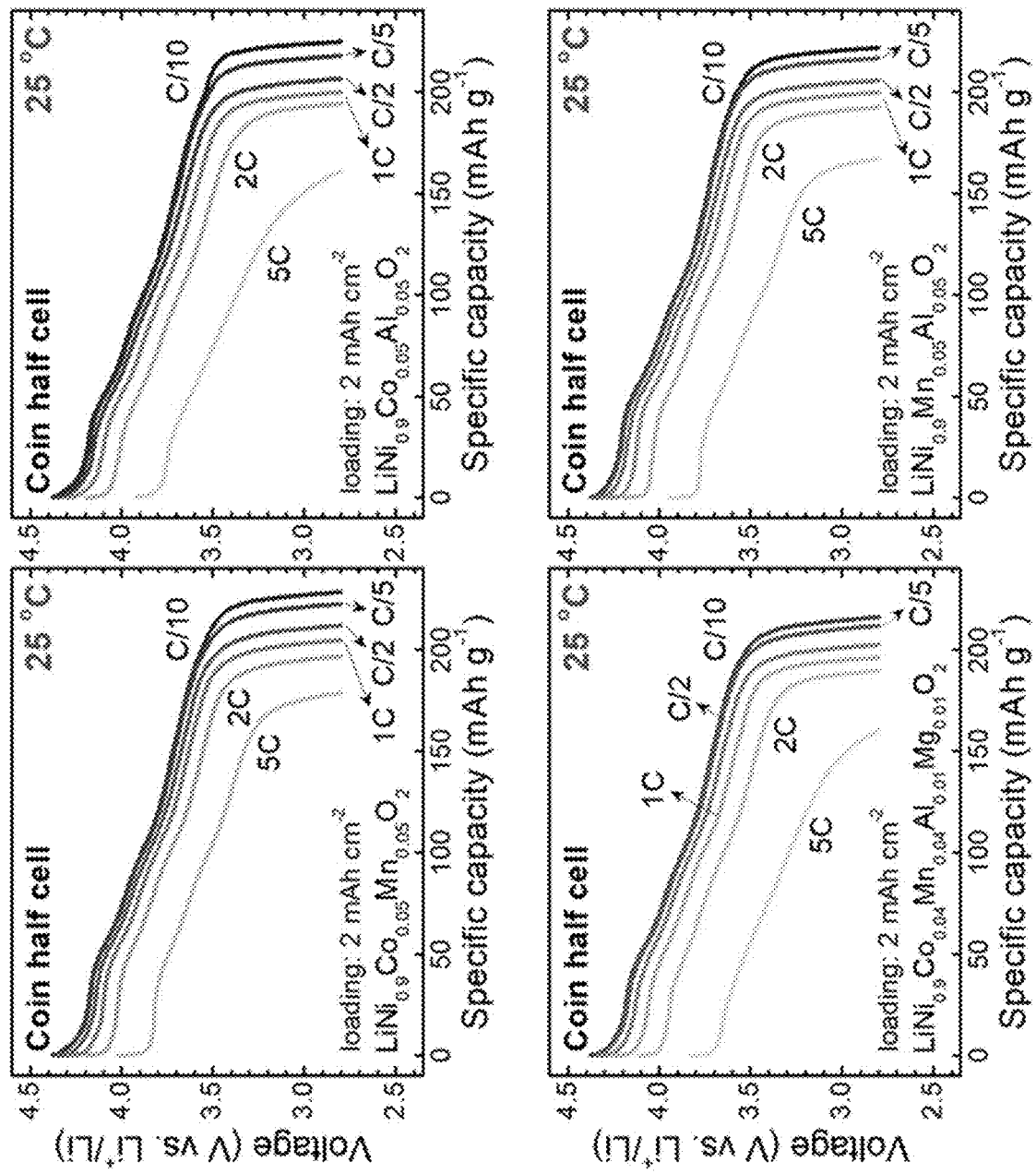
FIG. 17 provides discharge curves of $LiNi_{0.90}Co_{0.05}Mn_{0.05}O_2$, $LiNi_{0.90}Co_{0.05}Al_{0.05}O_2$, $LiNi_{0.90}Co_{0.04}Mn_{0.04}Al_{0.01}Mg_{0.01}O_2$, and $LiNi_{0.90}Mn_{0.05}Al_{0.05}O_2$ in coin half battery cells (vs. Li metal) at 25° C. up to a 5C discharge rate at a constant C/10 charge rate.

FIG. 17 shows discharge curves of LiNi$_{0.90}$Co$_{0.05}$Mn$_{0.05}$O$_2$, LiNi$_{0.90}$Co$_{0.05}$Al$_{0.05}$O$_2$, LiNi$_{0.90}$Co$_{0.04}$Mn$_{0.04}$Al$_{0.01}$Mg$_{0.01}$O$_2$, and LiNi$_{0.90}$Mn$_{0.05}$Al$_{0.05}$O$_2$ in coin half battery cells (vs. Li metal) at 25° C. up to a 5C discharge rate at a constant C/10 charge rate.

Figure 18:
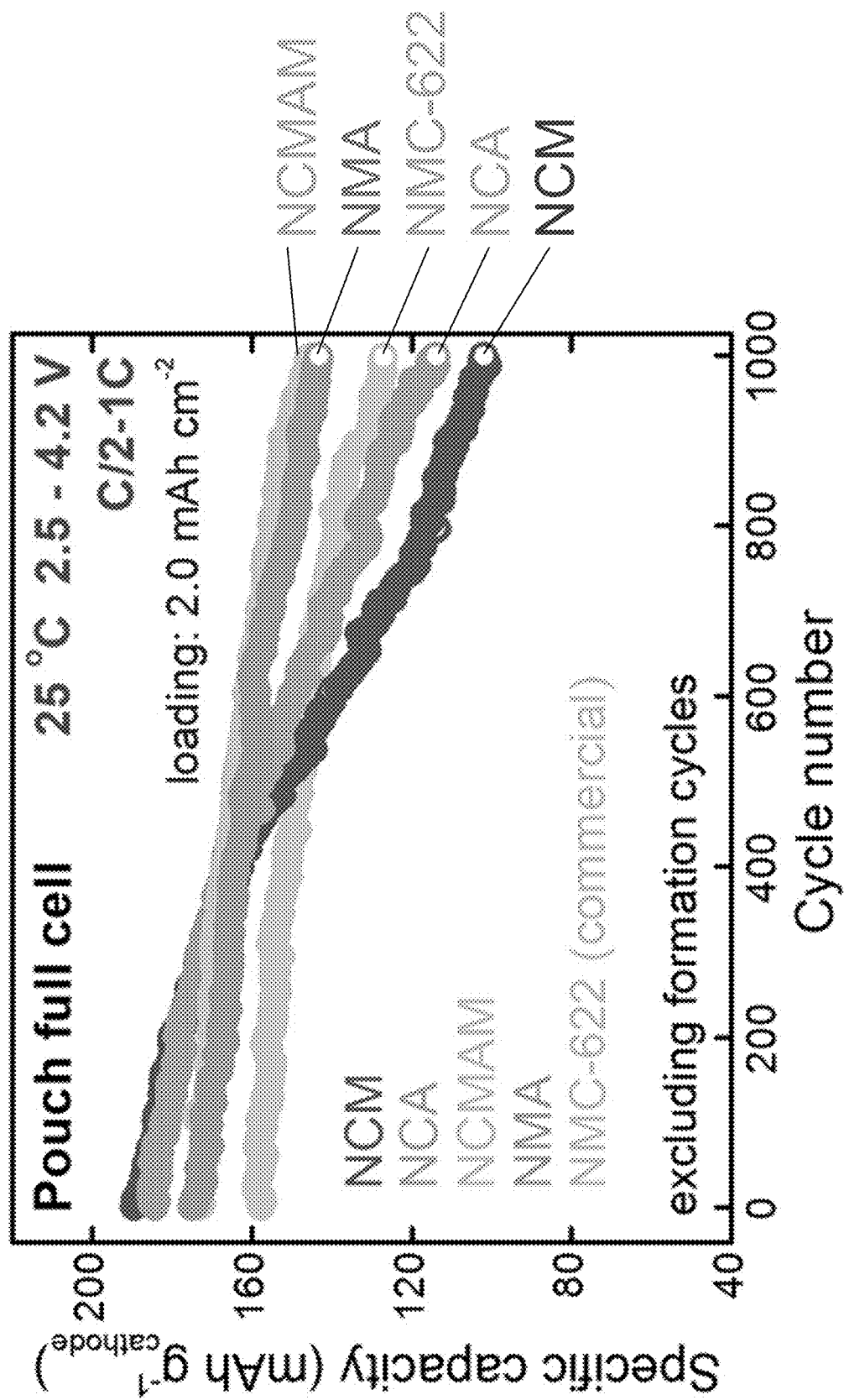
FIG. 18 provides data showing long-term cycling of $LiNi_{0.90}Co_{0.05}Mn_{0.05}O_2$ (NCM), $LiNi_{0.90}Co_{0.05}Al_{0.05}O_2$ (NCA), $LiNi_{0.90}Co_{0.04}Mn_{0.04}Al_{0.01}Mg_{0.01}O_2$ (NCMAM), and $LiNi_{0.90}Mn_{0.05}Al_{0.05}O_2$ (NMA) in pouch full battery cells (vs. graphite) at 25° C. over 1000 cycles at a C/2-1C charge-discharge rate.

Long-term cycling of LiNi$_{0.90}$Co$_{0.05}$Mn$_{0.05}$O$_2$, LiNi$_{0.90}$Co$_{0.05}$Al$_{0.05}$O$_2$, LiNi$_{0.90}$Co$_{0.04}$Mn$_{0.04}$Al$_{0.01}$Mg$_{0.01}$O$_2$, and LiNi$_{0.90}$Mn$_{0.05}$Al$_{0.05}$O$_2$ in pouch full battery cells paired with graphite anodes is shown in FIG. 18. It will be appreciated that FIG. 18 compares the retention of specific capacity, not specific energy, of four cathode materials. Data of specific energy retention during long-term cycling is described above. After 1000 deep cycles between 2.5 and 4.2 V at a C/2-1C charge-discharge rate and 25° C., LiNi$_{0.90}$Co$_{0.04}$Mn$_{0.04}$Al$_{0.01}$Mg$_{0.01}$O$_2$ and LiNi$_{0.90}$Mn$_{0.05}$Al$_{0.05}$O$_2$, with 84% and 82% capacity retention, respectively, notably outperform LiNi$_{0.90}$Co$_{0.05}$Mn$_{0.05}$O$_2$(54%) and LiNi$_{0.90}$Co$_{0.05}$Al$_{0.05}$O$_2$(62%) and are similar to a commercial LiNi$_{0.6}$Co$_{0.2}$Mn$_{0.2}$O$_2$(NMC-622) cathode (80%). Note that LiNi$_{0.90}$Co$_{0.05}$Mn$_{0.05}$O$_2$ performs reasonably well in half battery cells but becomes the worst in full battery cells.

Figure 19:
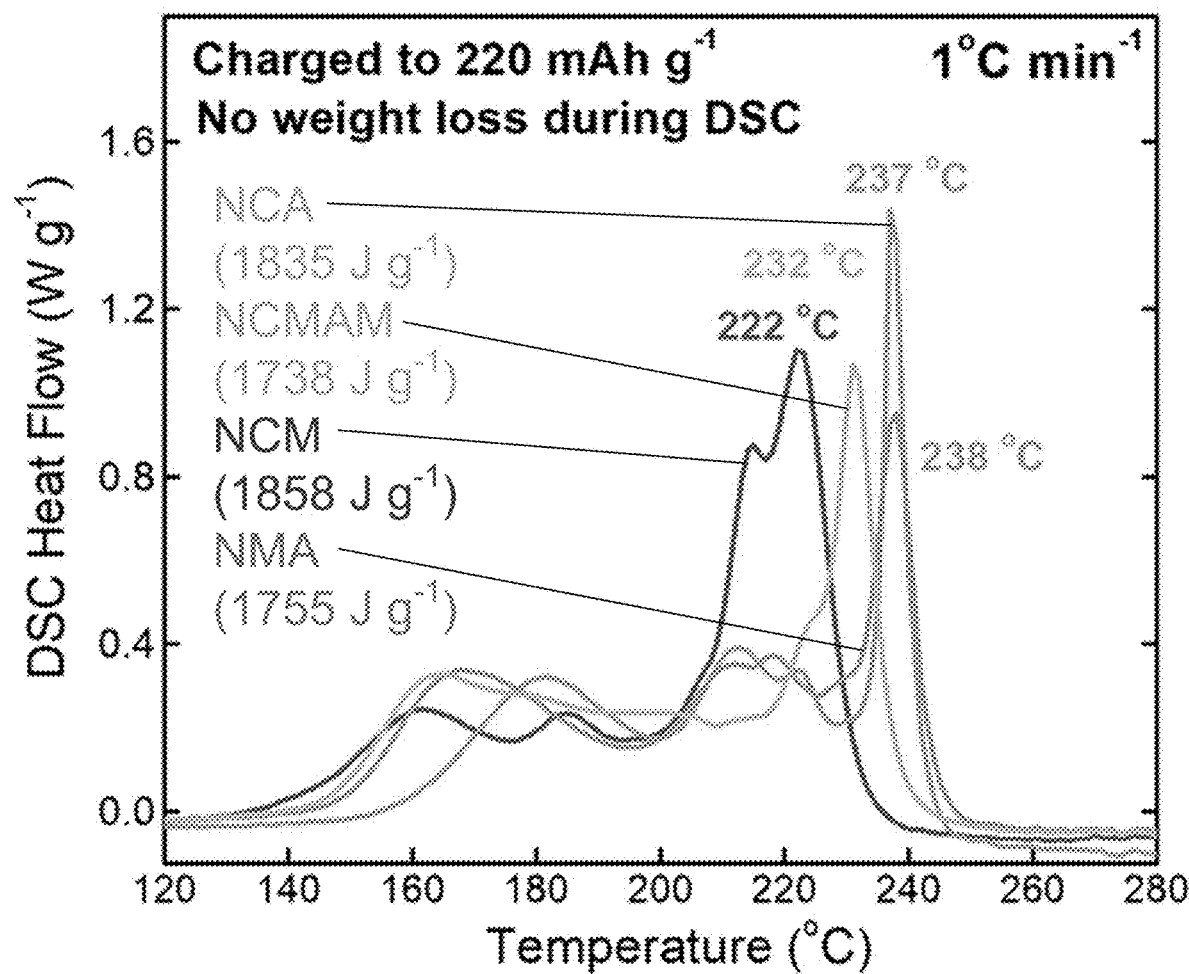
FIG. 19 provides differential scanning calorimetry (DSC) profiles of $LiNi_{0.90}Co_{0.05}Mn_{0.05}O_2$, $LiNi_{0.90}Co_{0.05}Al_{0.05}O_2$, $LiNi_{0.90}Co_{0.04}Mn_{0.04}Al_{0.01}Mg_{0.01}O_2$, and $LiNi_{0.90}Mn_{0.05}Al_{0.05}O_2$ charged to 220 mAh·g$^{-1}$ mixed with 1.0 M LiPF$_6$/EC-EMC(3:7)+2% VC at a weight ratio of 6:4.

FIG. 19 shows differential scanning calorimetry (DSC) profiles of LiNi$_{0.90}$Co$_{0.05}$Mn$_{0.05}$O$_2$, LiNi$_{0.90}$Co$_{0.05}$Al$_{0.05}$O$_2$, LiNi$_{0.90}$Co$_{0.04}$Mn$_{0.04}$Al$_{0.01}$Mg$_{0.01}$O$_2$, and LiNi$_{0.90}$Mn$_{0.05}$Al$_{0.05}$O$_2$. It will be appreciated that DSC can provide a measure of the thermal-abuse tolerance of cathode active materials at highly charged states. During experiment preparation, the cathode samples were charged to 220 mAh·g$^{-1}$ in coin half battery cells under C/10 rate after formation cycles, and then 20 mg to 30 mg of cathode powders were harvested and rinsed with dimethyl carbonate (DMC) inside an argon-filled glovebox. The cathode powder was then dried and mixed with the aforementioned electrolyte (cathode:electrolyte 6:4 by weight) and sealed tightly in a 100 μL high-pressure stainless steel crucible with a gold-plated copper seal. The test was conducted from 30° C. to 350° C. with a 1° C.·min$^{-1}$ heating rate under argon atmosphere without any weight loss. The calculated heat release was based on the active cathode mass. To ensure repeatability of the DSC results, at least three parallel tests were run for each cathode sample. The temperatures of the main exothermic event are 222° C., 237° C., 232° C., and 238° C., while the normalized heat generations are 1858 J·g$^{-1}$, 1835 J·g$^{-1}$, 1738 J·g$^{-1}$, and 1755 J·g$^{-1}$ for $LiNi_{0.90}Co_{0.05}Mn_{0.05}O_2$, $LiNi_{0.90}Co_{0.05}Al_{0.05}O_2$, $LiNi_{0.90}Co_{0.04}Mn_{0.04}Al_{0.01}Mg_{0.01}O_2$, and $LiNi_{0.90}Mn_{0.05}Al_{0.05}O_2$, respectively. These results show the thermal-abuse tolerance of cobalt-free $LiNi_{0.90}Mn_{0.05}Al_{0.05}O_2$ is superior to that of $LiNi_{0.90}Co_{0.05}Mn_{0.05}O_2$, $LiNi_{0.90}Co_{0.05}Al_{0.05}O_2$, and $LiNi_{0.90}Co_{0.04}Mn_{0.04}Al_{0.01}Mg_{0.01}O_2$ at the same degree of deep charge.

Example 4

Cobalt-free cathode active materials comprising $LiNiO_2$ and $LiNi_{0.9}Mn_{0.05}Al_{0.05}O_2$ were prepared according to the methods described herein. Dissolvable salts of nickel, manganese, and aluminum were used to make aqueous solutions of varying molar ratios at 2.0 mol·L$^{-1}$. The mixed-metal ion aqueous solution was pumped into a tank reactor at a controlled rate under nitrogen atmosphere. An aqueous solution of potassium hydroxide at 6.0 mol·L$^{-1}$ and ammonium hydroxide at 1.0 mol·L$^{-1}$ was separately pumped into the tank reactor to maintain a pH of 11.5±0.5. The co-precipitation reaction took place at 50±5° C. Subsequently, precursors comprising $Ni(OH)_2$ and $Ni_{0.9}Mn_{0.05}Al_{0.05}(OH)_2$ were obtained through washing, filtering, and drying and mixed with lithium hydroxide at a molar ratio of 1:1.03±0.02. The mixed precursor and lithium hydroxide was calcinated at 720±50° C. for 17.5±7.5 h under an oxygen atmosphere of a 2.75±2.25 liter per minute flow rate to obtain $LiNiO_2$ and $LiNi_{0.9}Mn_{0.05}Al_{0.05}O_2$. It will be appreciated that the lithium and oxygen contents in these chemical compositions are based on stoichiometry, but the lithium and oxygen contents may deviate from their stoichiometric values.

Figure 20:
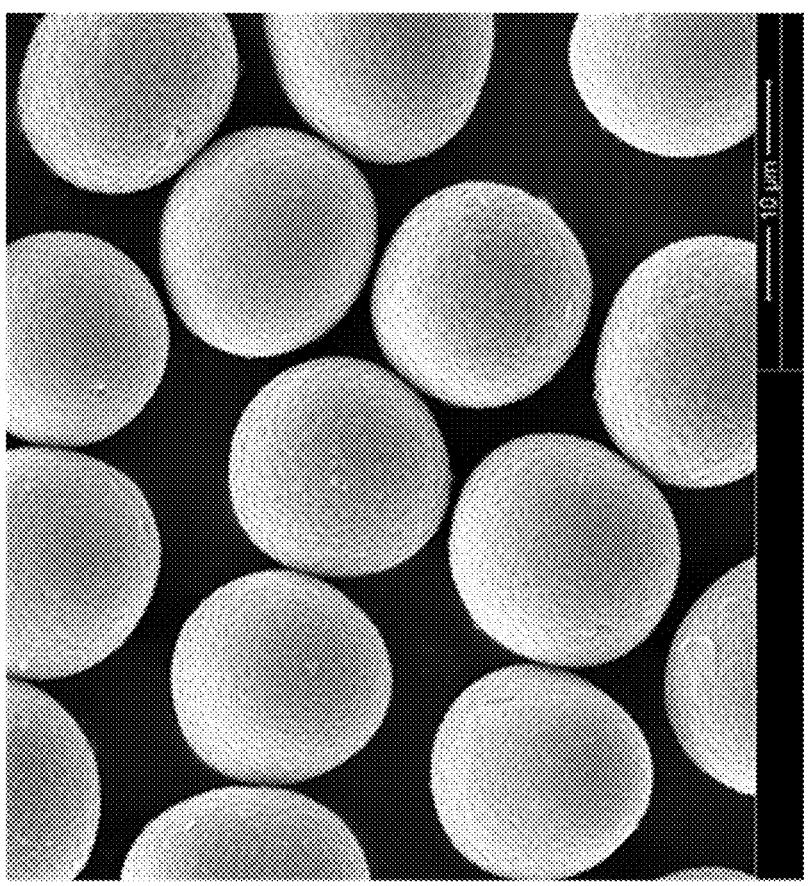
FIG. 20 provides scanning electron microscopy (SEM) images of $LiNiO_2$.
Figure 20:
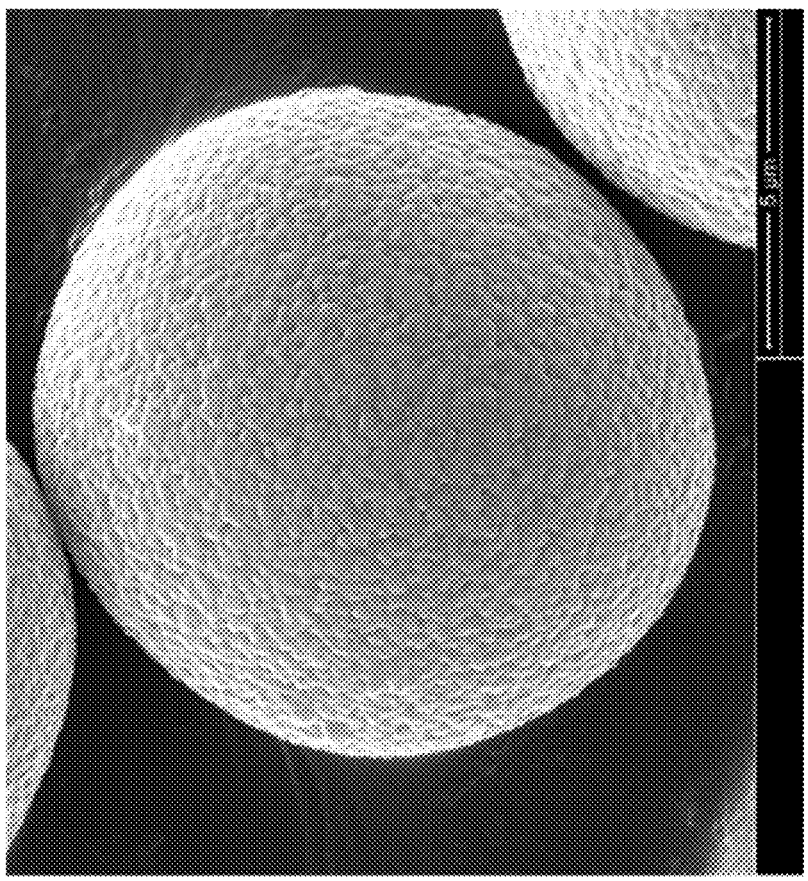

FIG. 20 shows the scanning electron microscopy (SEM) images of $LiNiO_2$. The material comprised a plurality of secondary particles of an average particle size of 8 μm to 15 μm. In FIG. 20, a secondary particle further comprises a plurality of primary particles of an average particle size of 50 nm to 200 nm.

The cathode active material exhibited a tapped density of about 2.5 g·cm$^{-3}$ to 2.7 g·cm$^{-3}$. The cathode active material was formed into a composite cathode electrode by depositing a slurry of the cathode active material in N-Methyl-2-Pyrrolidone onto an aluminum foil current collector and allowing the solvent to evaporate. The areal capacity loading of the cathode active material was 2.4 mAh·cm$^{-2}$ to 2.6 mAh·cm$^{-2}$. The cathode was assembled into an electrochemical cell with a lithium metal anode, a separator comprising a blend of polypropylene and polyethylene soaked with a nonaqueous carbonate-based electrolyte comprising 1.0 molar $LiPF_6$ in a solvent mixture of ethylene carbonate and ethyl methyl carbonate (3:7 by weight) with an additive of vinylene carbonate (2% by weight). Galvanostatic voltage profiles were obtained for charging and discharging the electrochemical cell.

Figure 21:
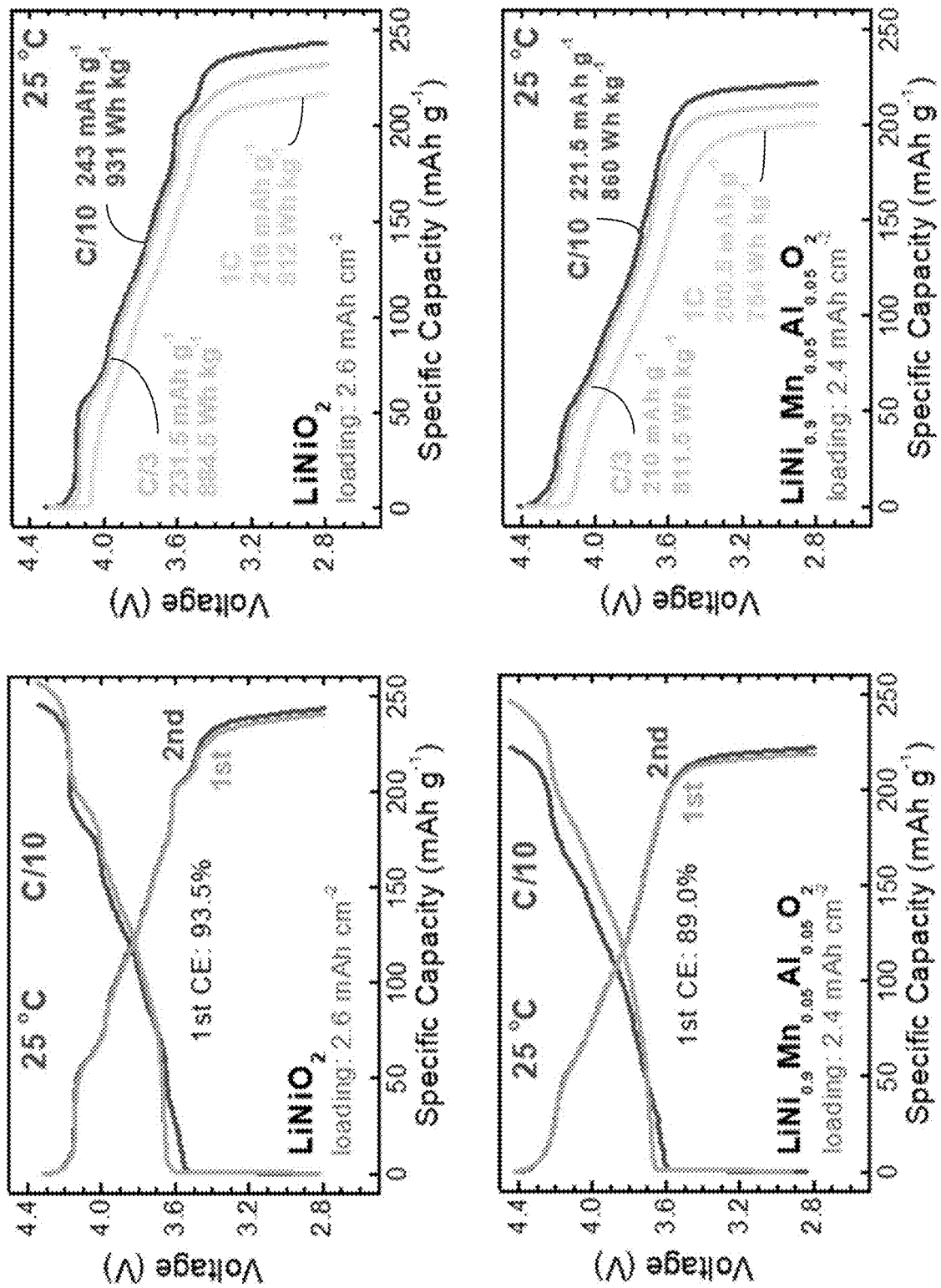
FIG. 21 provides galvanostatic charge-discharge voltage profiles of $LiNiO_2$ and $LiNi_{0.9}Mn_{0.05}Al_{0.05}O_2$ in lithium-ion cells paired with lithium metal.
Figure 22:
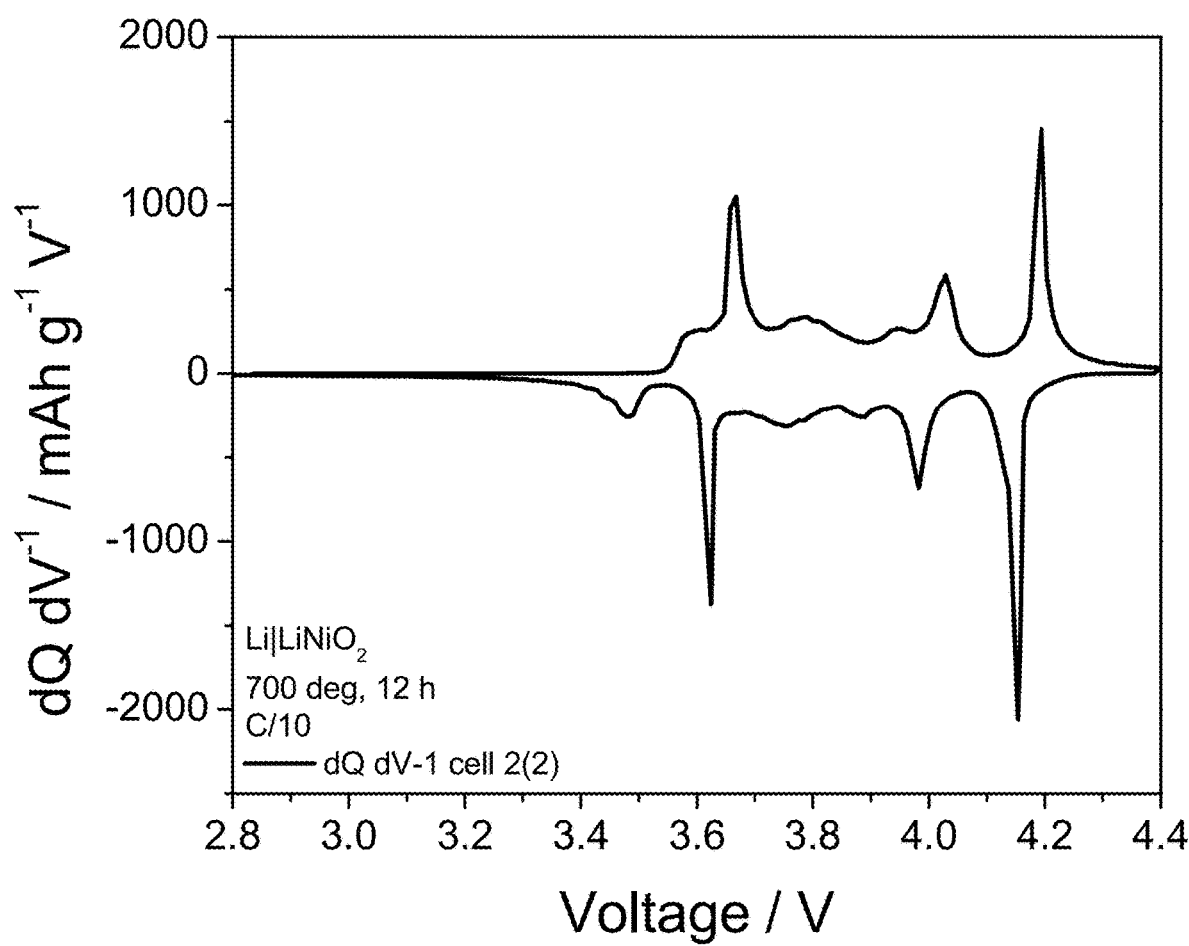
FIG. 22 provides dQ·dV$^{-1}$ curves of $LiNiO_2$ in coin half battery cells (vs. Li metal) at 25° C. during C/10 formation cycles.
Figure 23:
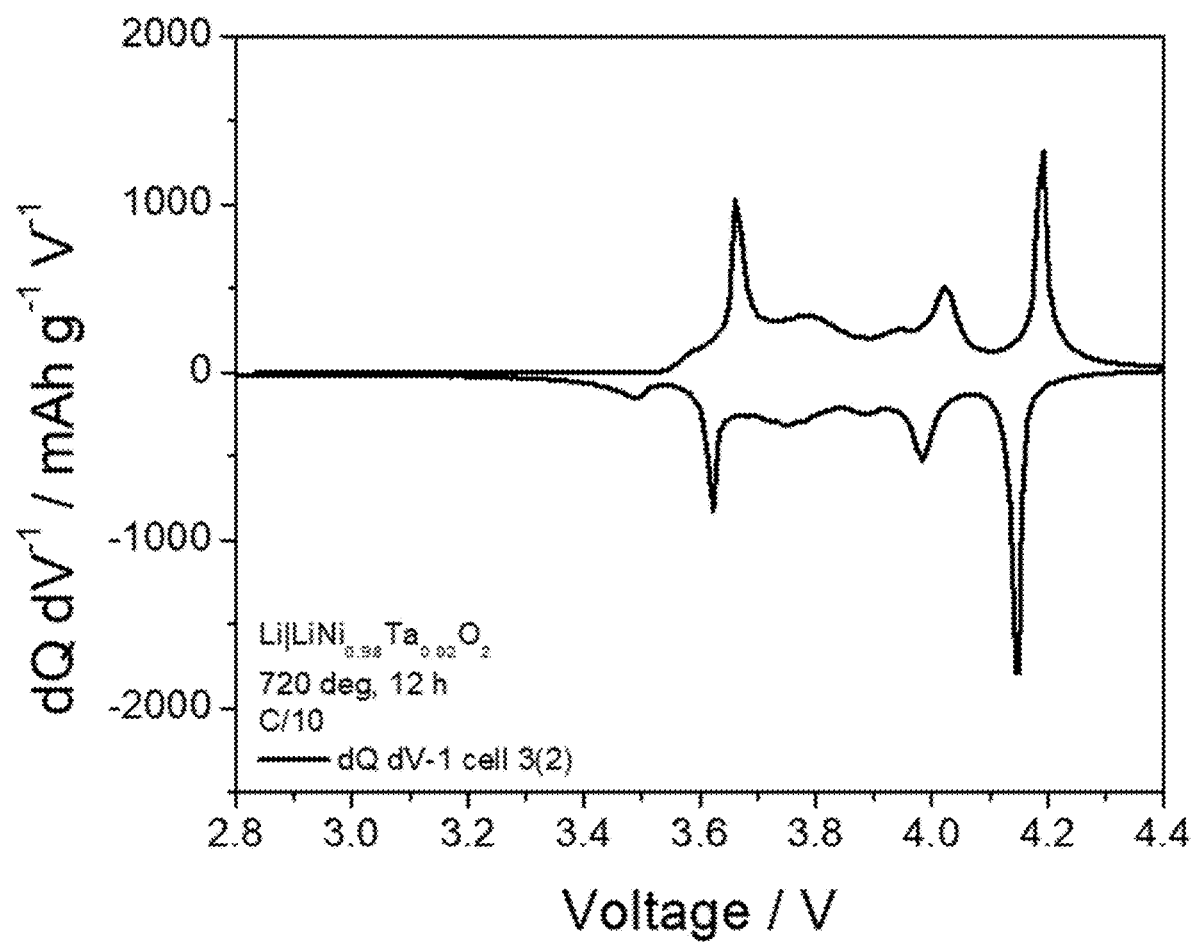
FIG. 23 provides dQ·dV$^{-1}$ curves of $LiNi_{0.98}Ta_{0.02}O_2$ in coin half battery cells (vs. Li metal) at 25° C. during C/10 formation cycles.
Figure 24:
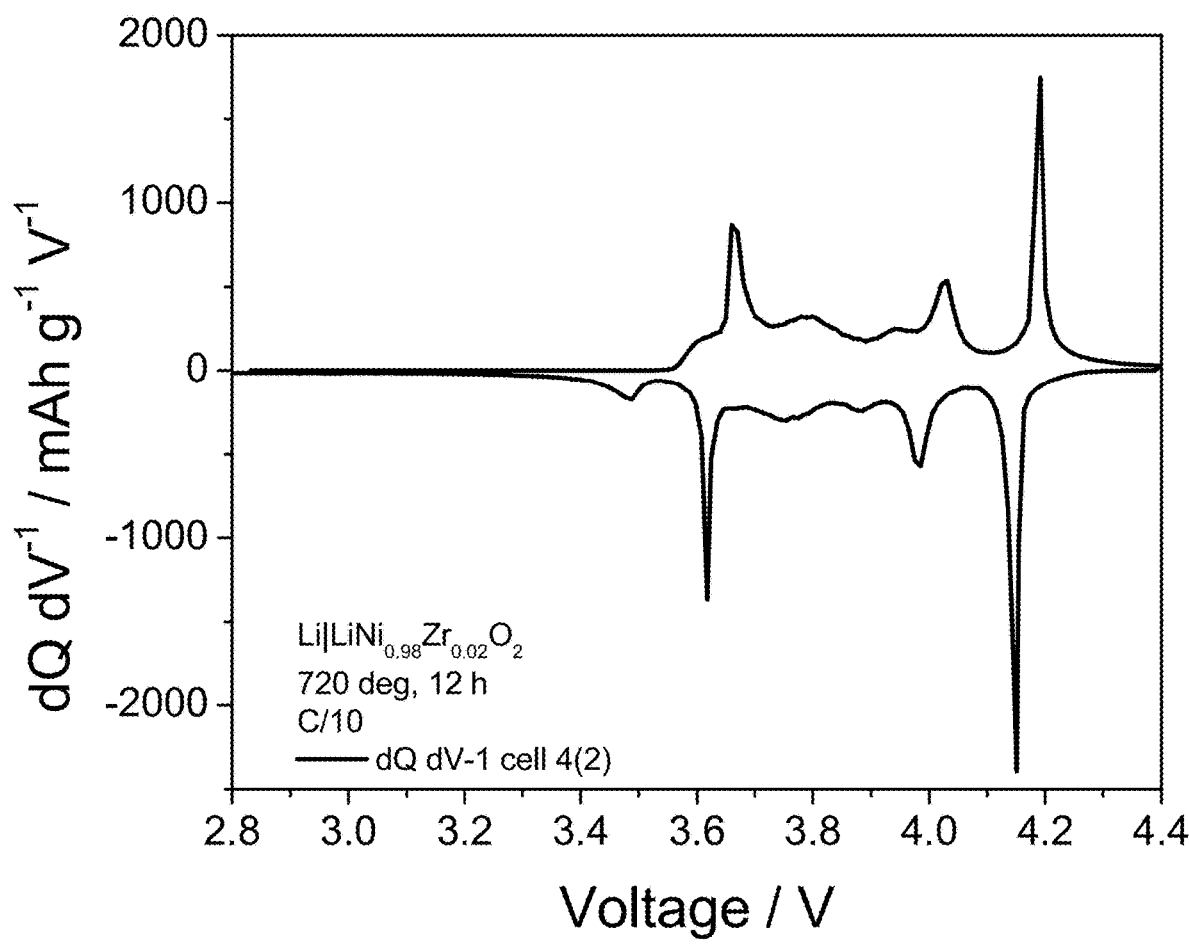
FIG. 24 provides dQ·dV$^{-1}$ curves of $LiNi_{0.98}Zr_{0.02}O_2$-in coin half battery cells (vs. Li metal) at 25° C. during C/10 formation cycles.
Figure 25:
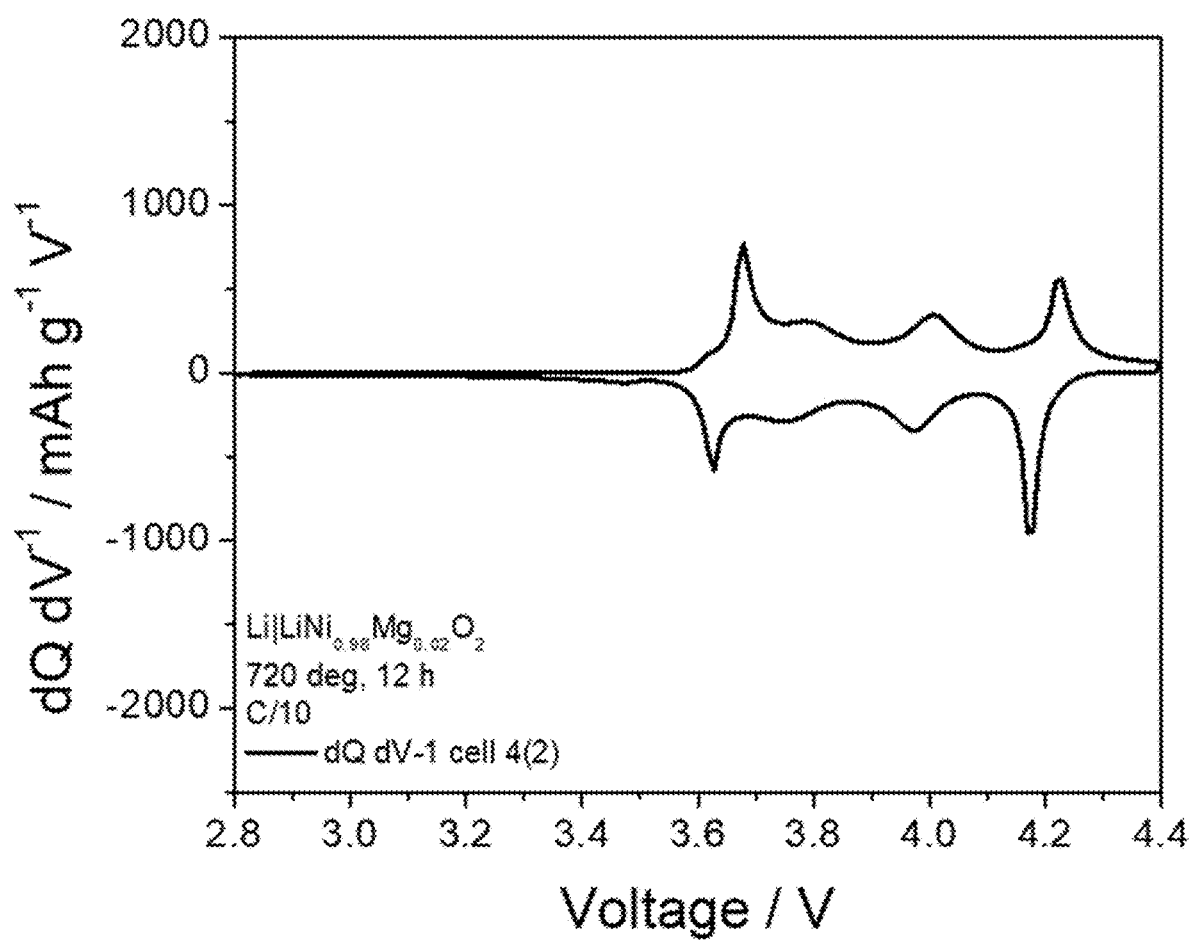
FIG. 25 provides dQ·dV$^{-1}$ curves of $LiNi_{0.98}Mg_{0.02}O_2$-in coin half battery cells (vs. Li metal) at 25° C. during C/10 formation cycles.

FIG. 21 shows the galvanostatic charge-discharge voltage profiles of $LiNiO_2$ and $LiNi_{0.9}Mn_{0.05}Al_{0.05}O_2$ in lithium-ion cells paired with lithium metal. The $LiNiO_2$ lithium-ion cells were cycled between 2.8 V and 4.35 V vs. Li$^+$/Li at ambient temperature (25° C.). The $LiNi_{0.9}Mn_{0.05}Al_{0.05}O_2$ lithium-ion cells were cycled between 2.8 V and 4.45 V vs. Li$^+$/Li at ambient temperature (25° C.). $LiNiO_2$ delivered a specific energy of 919 Wh·kg$^{-1}$ at the first C/10 cycle with a Coulombic efficiency of 93.5%, and a specific energy of 931 Wh·kg$^{-1}$ at the second C/10 cycle. $LiNiO_2$ delivered a specific energy of 884.5 Wh·kg$^{-1}$ at C/3 rate and 812 Wh·kg$^{-1}$ at 1C rate, respectively. The specific energy at 1C rate of $LiNO_2$ was 87% of the specific energy at C/10 rate. $LiNi_{0.9}Mn_{0.05}Al_{0.05}O_2$ delivered a specific energy of 853 Wh·kg$^{-1}$ at the first C/10 cycle with a Coulombic efficiency of 89.0%, and a specific energy of 860 Wh·kg$^{-1}$ at the second C/10 cycle. $LiNi_{0.9}Mn_{0.05}Al_{0.05}O_2$ delivered a specific energy of 811.5 Wh·kg$^{-1}$ at C/3 rate and 754 Wh·kg$^{-1}$ at 1C rate, respectively. The specific energy at 1C rate of $LiNi_{0.9}Mn_{0.05}Al_{0.05}O_2$ was 87.5% of the specific energy at C/10 rate.

Example 5

Cobalt-free cathode active materials comprising $LiNiO_2$, $LiNi_{0.98}Ta_{0.02}O_2$, $LiNi_{0.98}Zr_{0.02}O_2$, and $LiNi_{0.98}Mg_{0.02}O_2$ were prepared according to the methods described herein. First, cathode active material precursor comprising $Ni(OH)_2$ was prepared using dissolvable salts of nickel in aqueous solutions at 2.0 mol·L$^{-1}$. The aqueous solution was pumped into a tank reactor at a controlled rate. An aqueous solution of potassium hydroxide at 6.0 mol·L$^{-1}$ and ammonium hydroxide at 1.0 mol·L$^{-1}$ was separately pumped into the tank reactor to maintain a pH of 11.75±0.25. The co-precipitation reaction took place at 50±5° C. Subsequently, precursor comprising $Ni(OH)_2$ was obtained through washing, filtering, and drying. To obtain $LiNiO_2$, the precursor comprising $Ni(OH)_2$ was mixed with lithium hydroxide at a molar ratio of 1:1.02±0.03. The mixed precursor and lithium hydroxide was calcinated at 690±20° C. for 17.5±7.5 h under an oxygen atmosphere of a 2.75±2.25 liter per minute flow rate. To obtain $LiNi_{0.98}Ta_{0.02}O_2$, $LiNi_{0.98}Zr_{0.02}O_2$, or $LiNi_{0.98}Mg_{0.02}O_2$, precursor comprising $Ni(OH)_2$ was mixed with either tantalum oxide, zirconium oxide, or magnesium oxide, and additionally lithium hydroxide at a molar ratio of 0.98:0.02:1.02±0.03. The mixed precursor, either tantalum oxide, zirconium oxide, or magnesium oxide, and lithium hydroxide was calcinated at 720±30° C. for 17.5±7.5 h under an oxygen atmosphere of a 2.75±2.25 liter per minute flow rate. It will be appreciated that the lithium and oxygen contents in these chemical compositions are based on stoichiometry, but the lithium and oxygen contents may deviate from their stoichiometric values.

The cathode active material exhibited a tapped density of about 2.5 g·cm$^{-3}$ to 2.7 g·cm$^{-3}$. The cathode active material was formed into a composite cathode electrode by depositing a slurry of the cathode active material in N-Methyl-2-Pyrrolidone onto an aluminum foil current collector and allowing the solvent to evaporate. The areal capacity loading of the cathode active material was around 2.0 mAh·cm$^{-2}$.

The cathode was assembled into an electrochemical cell with a lithium metal anode, a separator comprising a blend of polypropylene and polyethylene soaked with a nonaqueous carbonate-based electrolyte comprising 1.0 molar $LiPF_6$ in a solvent mixture of ethylene carbonate and ethyl methyl carbonate (3:7 by weight) with an additive of vinylene carbonate (2% by weight). Galvanostatic voltage profiles were obtained for charging and discharging the electrochemical cell.

FIG. 22, FIG. 23, FIG. 24, and FIG. 25 show $dQ \cdot dV^{-1}$ curves of $LiNiO_2$, $LiNi_{0.98}Ta_{0.02}O_2$, $LiNi_{0.98}Zr_{0.02}O_2$, and $LiNi_{0.98}Mg_{0.02}O_2$, respectively, in coin half battery cells (vs. lithium metal) at 25° C. during C/10 formation cycles. All lithium-ion cells were cycled between 2.8 V and 4.4 V vs. $Li^+/Li$ at ambient temperature (25° C.). All samples show a minimum (e.g., lowest negative peak or nadir) of at least $-900$ $mAh \cdot g^{-1}V^{-1}$ or lower during discharge at a voltage vs. $Li^+/Li$ of 4.15 V or higher. With a current rate of C/10, $LiNiO_2$ shows a minimum of $-2060$ $mAh \cdot g^{-1}V^{-1}$ in the $dQ \cdot dV^{-1}$ curve during discharge at a voltage of 4.154 V vs. $Li^+/Li$. With a current rate of C/10, $LiNi_{0.98}Ta_{0.02}O_2$ shows a minimum of $-1780$ $mAh \cdot g^{-1}V^{-1}$ in the $dQ \cdot dV^{-1}$ curve during discharge at a voltage of 4.150 V vs. $Li^+/Li$. With a current rate of C/10, $LiNi_{0.98}Zr_{0.02}O$ shows a minimum of $-2420$ $mAh \cdot g^{-1}V^{-1}$ in the $dQ \cdot dV^{-1}$ curve during discharge at a voltage of 4.152 V vs. $Li^+/Li$. With a current rate of C/10, $LiNi_{0.98}Mg_{0.02}O_2$ shows a minimum of $-900$ $mAh \cdot g^{-1}V^{-1}$ in the $dQ \cdot dV^{-1}$ curve during discharge at a voltage of 4.162 V vs. $Li^+/Li$.

To calculate the $dQ \cdot dV^{-1}$ plots, lithium metal coin cells were cycled at C/10 rate within 2.8 and 4.4 V vs. $Li^+/Li$. The cycling data used for calculating the dQ/dV curves are separated by 0.02 V steps. The dQ/dV value at each voltage is calculated by the formula in Eq. 1, described above. The charge, $Q_2$, in Eq. 1 is the total charge at the voltage of interest, $V_2$, with the proceeding data point at voltage $V_1$ and total charge for that charge or discharge cycle at $Q_1$. Since data used for dQ/dV calculation is acquired every 0.02 V, $\Delta V$ is always 0.02 V, with the unit $mAh \cdot g^{-1}V^{-1}$. The voltage step of 0.02 V between acquired data points prevents noise from impacting the magnitude of the $mAh \cdot g^{-1}V^{-1}$, which can increase to very large values when $\Delta V$ is set to small values. The data points (x, y) can be plotted with $$x = \frac{1}{2}(V_1 + V_2) \text{ and } y = \frac{Q_2 - Q_1}{V_2 - V_1}.$$

Comparative Example 1

A cobalt-free cathode active material comprising $LiNi_{0.9}Mn_{0.05}Al_{0.05}O_2$ was prepared according to the methods described herein. Dissolvable salts of nickel, manganese, and aluminum were used to make aqueous solutions of varying molar ratios at 2.0 $mol \cdot L^{-1}$. The mixed-metal ion aqueous solution was pumped into a tank reactor at a controlled rate under nitrogen atmosphere. An aqueous solution of potassium hydroxide at 6.0 $mol \cdot L^{-1}$ and ammonium hydroxide at 1.0 $mol \cdot L^{-1}$ was separately pumped into the tank reactor to maintain a pH of 11.5±0.5. The co-precipitation reaction took place at 50±5° C. Subsequently, precursor comprising $Ni_{0.9}Mn_{0.05}Al_{0.05}(OH)_2$ was obtained through washing, filtering, and drying and mixed with lithium hydroxide at a molar ratio of 1:1.03±0.07. The mixed precursor and lithium hydroxide was calcinated at 750±20° C. for 17.5±7.5 h under an oxygen atmosphere of a 2.75±2.25 liter per minute flow rate to obtain $LiNi_{0.9}Mn_{0.05}Al_{0.05}O_2$. It will be appreciated that the lithium and oxygen contents in these chemical compositions are based on stoichiometry, but the lithium and oxygen contents may deviate from their stoichiometric values.

The cathode active material exhibited a tapped density of about 2.5 $g \cdot cm^{-3}$. The cathode active material was formed into a composite cathode electrode by depositing a slurry of the cathode active material in N-Methyl-2-Pyrrolidone onto an aluminum foil current collector and allowing the solvent to evaporate. The areal capacity loading of the cathode active material was around 2.0 $mAh \cdot cm^{-2}$. The cathode was assembled into an electrochemical cell with a lithium metal anode, a separator comprising a blend of polypropylene and polyethylene soaked with a nonaqueous carbonate-based electrolyte comprising 1.0 molar $LiPF_6$ in a solvent mixture of ethylene carbonate and ethyl methyl carbonate (3:7 by weight) with an additive of vinylene carbonate (2% by weight). Galvanostatic voltage profiles were obtained for charging and discharging the electrochemical cell.

Figure 26:
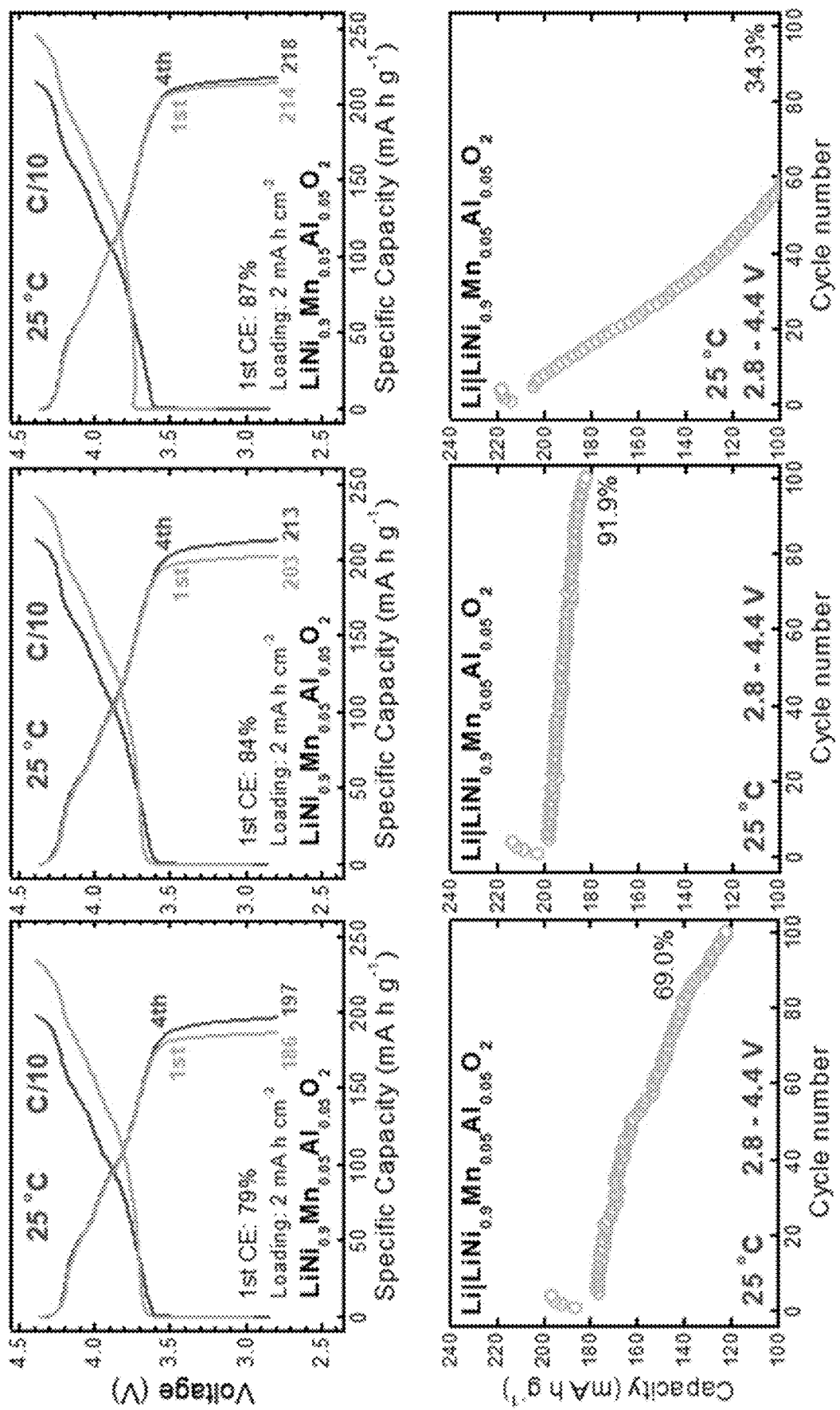
FIG. 26 provides galvanostatic charge-discharge voltage profiles (upper) and evolution of specific capacity as a function of cycle number (lower) of $LiNi_{0.9}Mn_{0.05}Al_{0.05}O_2$ with varying calcination conditions in lithium-ion cells paired with lithium metal.

FIG. 26 shows the galvanostatic charge-discharge voltage profiles (upper) and evolution of specific capacity as a function of cycle number (lower) of $LiNi_{0.9}Mn_{0.05}Al_{0.05}O_2$ with varying calcination conditions in lithium-ion cells paired with lithium metal. All lithium-ion cells were cycled between 2.8 V and 4.4 V vs. $Li^+/Li$ at ambient temperature (25° C.). The different $LiNi_{0.9}Mn_{0.05}Al_{0.05}O_2$ were calcined using the same $Ni_{0.9}Mn_{0.05}Al_{0.05}(OH)_2$ precursor. $LiNi_{0.9}Mn_{0.05}Al_{0.05}O_2$ calcined at 750° C. with a 0.98 lithium/(nickel+manganese+aluminum) ratio for 10 h (left) delivered a specific capacity of 186 $mAh \cdot g^{-1}$ at the first cycle at C/10 rate with a Coulombic efficiency of 79%, a specific capacity of 197 $mAh \cdot g^{-1}$ at the fourth cycle at C/10 rate, and a cycling stability of 69.0% after 100 charge-discharge cycles at C/3 rate. $LiNi_{0.9}Mn_{0.05}Al_{0.05}O_2$ calcined at 750° C. with a 1.03 lithium/(nickel+manganese+aluminum) ratio for 15 h (middle) delivered a specific capacity of 203 $mAh \cdot g^{-1}$ at the first cycle at C/10 rate with a Coulombic efficiency of 84%, a specific capacity of 213 $mAh \cdot g^{-1}$ at the fourth cycle at C/10 rate, and a cycling stability of 91.9% after 100 charge-discharge cycles at C/3 rate. $LiNi_{0.9}Mn_{0.05}Al_{0.05}O_2$ calcined at 760° C. with a 1.10 lithium/(nickel+manganese+aluminum) ratio for 12 h (right) delivered a specific capacity of 214 $mAh \cdot g^{-1}$ at the first cycle at C/10 rate with a Coulombic efficiency of 87%, a specific capacity of 218 $mAh \cdot g^{-1}$ at the fourth cycle at C/10 rate, and a cycling stability of 34.3% after 100 charge-discharge cycles at C/3 rate.

Figure 27:
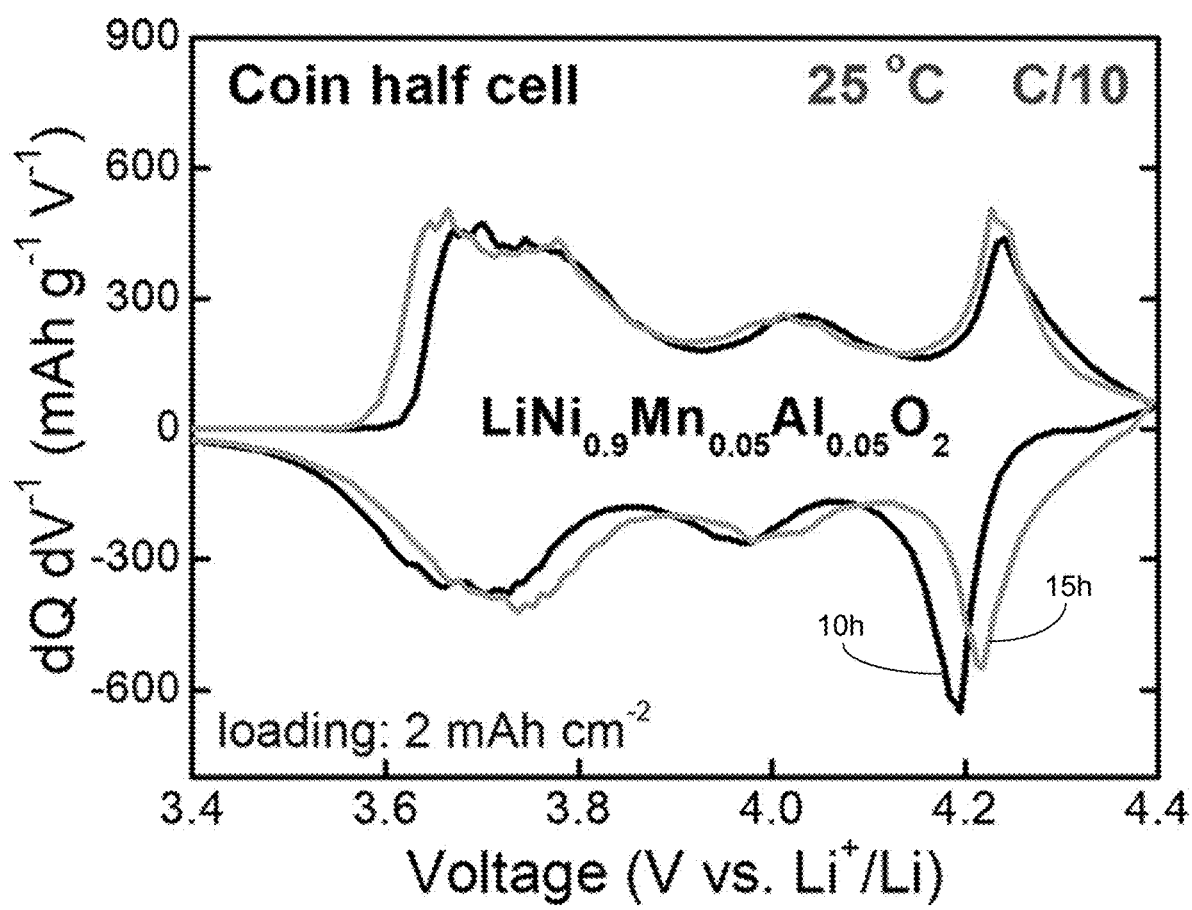
FIG. 27 provides $dQ \cdot dV^{-1}$ curves of $LiNi_{0.90}Mn_{0.05}Al_{0.05}O_2$ synthesized by two calcination conditions in coin half battery cells (vs. Li metal) at 25° C. during C/10 formation cycles.

In FIG. 27, $LiNi_{0.9}Mn_{0.05}Al_{0.05}O_2$ calcined at 750° C. with a 0.98 lithium/(nickel+manganese+aluminum) ratio for 10 h (black) exhibited a minimum of $-650$ $mAh \cdot g^{-1}V^{-1}$ at 4.19 V vs. $Li^+/Li$ during discharge at C/10 rate. $LiNi_{0.9}Mn_{0.05}Al_{0.05}O_2$ calcined at 750° C. with a 1.03 lithium/(nickel+manganese+aluminum) ratio for 15 h (gray) exhibited a minimum of $-550$ $mAh \cdot g^{-1}V^{-1}$ at 4.22 V vs. $Li^+/Li$ during discharge at C/10 rate. It will be appreciated that the $Li_aNi_{1-b-c}Co_bM_cO_d$ materials show substantially different electrochemical properties, including but not limited to, specific energy, first-cycle Coulombic efficiency, voltage, rate capability, operational lifetime, and safety, synthesized by different calcination conditions, as demonstrated in this comparative example.

Comparative Example 2

A low-cobalt cathode active material precursor comprising $Ni_{0.9}Co_{0.05}Mn_{0.05}(OH)_2$ or $Ni_{0.9}Co_{0.05}Mn_{0.05}CO_3$ was prepared according to the methods described herein. Dissolvable salts of nickel, cobalt, and manganese were used to make aqueous solutions of varying molar ratios at 0.5 mol·L$^{-1}$ to 2.0 mol·L$^{-1}$. The mixed-metal ion aqueous solution was pumped into a tank reactor at a controlled rate under nitrogen atmosphere. An aqueous solution of potassium hydroxide or sodium carbonate at 1.0 mol·L$^{-1}$ to 6.0 mol·L$^{-1}$ and ammonium hydroxide at 0.5 mol·L$^{-1}$ to 2.0 mol·L$^{-1}$ was separately pumped into the tank reactor to maintain a pH of 8.0 to 12.5. The co-precipitation reaction took place at 50±10° C. and the total reactor time varied from 4 h to 48 h. Subsequently, precursor comprising LiNi$_{0.9}$Mn$_{0.05}$Al$_{0.05}$(OH)$_2$ or Ni$_{0.9}$Co$_{0.05}$Mn$_{0.05}$CO$_3$ was obtained through washing, filtering, and drying of the material from the tank reactor. The precursor would then be used to make the LiNi$_{0.9}$Co$_{0.05}$Mn$_{0.05}$O$_2$ cathode material.

Figure 28:
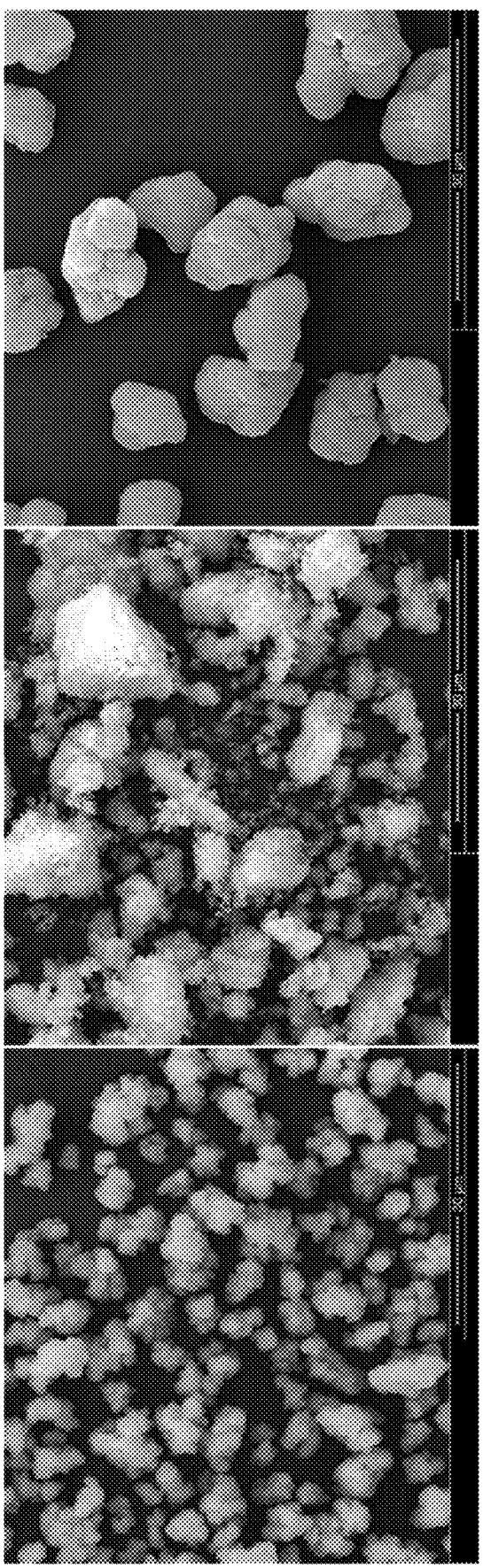
FIG. 28 provides scanning electron microscopy (SEM) images of $Ni_{0.9}Co_{0.05}Mn_{0.05}(OH)_2$ or $Ni_{0.9}Co_{0.05}Mn_{0.05}CO_3$ with varying co-precipitation conditions.
Figure 28:
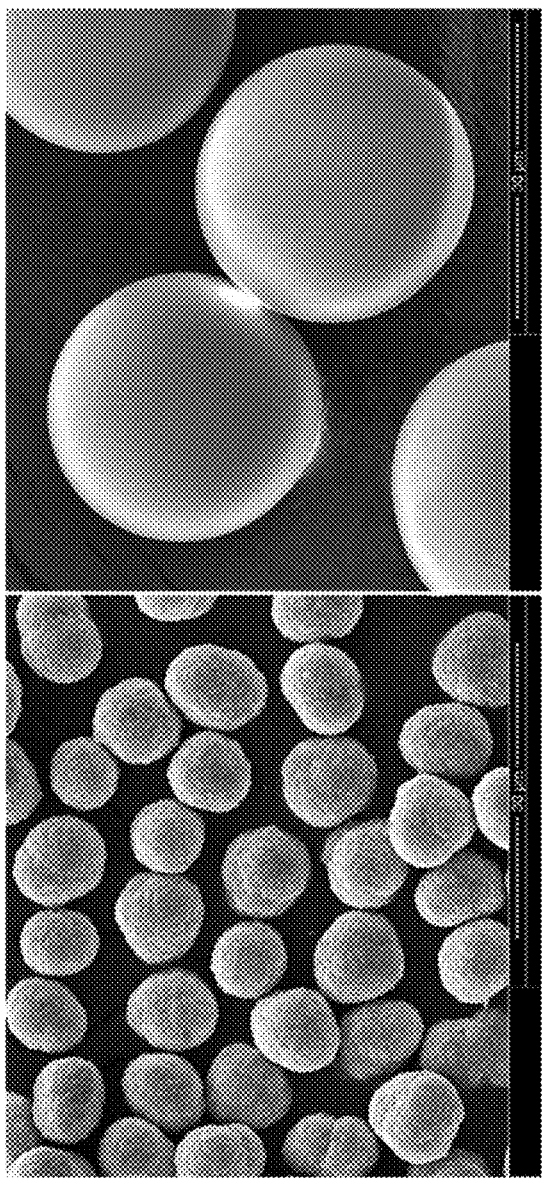

FIG. 28 shows the scanning electron microscopy (SEM) images of Ni$_{0.9}$Co$_{0.05}$Mn$_{0.05}$(OH)$_2$ or Ni$_{0.9}$Co$_{0.05}$Mn$_{0.05}$CO$_3$ with varying co-precipitation conditions. Ni$_{0.9}$Co$_{0.05}$Mn$_{0.05}$(OH)$_2$ precipitated with potassium hydroxide at a pH of 10.75, a temperature of 50° C., and a reaction time of 6 h (upper left) exhibited an average particle size of 4 nm to 6 nm and a tapped density of 1.4 g·cm$^{-3}$. Ni$_{0.9}$Co$_{0.05}$Mn$_{0.05}$(OH)$_2$ precipitated with potassium hydroxide at a pH of 10.50, a temperature of 50° C., and a reaction time of 4 h (upper middle) exhibited an average particle size of 1 nm to 10 nm and a tapped density of 1.5 g·cm$^{-3}$. Ni$_{0.9}$Co$_{0.05}$Mn$_{0.05}$CO$_3$ precipitated with sodium carbonate at a pH of 8.30, a temperature of 60° C., and a reaction time of 6 h (upper right) exhibited an average particle size of 6 nm to 10 nm and a tapped density of 1.8 g·cm$^{-3}$. Ni$_{0.9}$Co$_{0.05}$Mn$_{0.05}$(OH)$_2$ precipitated with potassium hydroxide at a pH of 11.25, a temperature of 50° C., and a reaction time of 12 h (lower left) exhibited an average particle size of 8 nm to 10 nm and a tapped density of 2.3 g·cm$^{-3}$. Ni$_{0.9}$Co$_{0.05}$Mn$_{0.05}$(OH)$_2$ precipitated with potassium hydroxide at a pH of 11.25, a temperature of 50° C., and a reaction time of 36 h (lower right) exhibited an average particle size of 25 nm and a tapped density of 2.5 g·cm$^{-3}$. It will be appreciated that the morphology and microstructure of precipitated precursors are largely preserved after lithiation calcination, thereby significantly affecting the physical and electrochemical properties of Li$_a$Ni$_{1-b-c}$Co$_b$M$_c$O$_d$. In this comparative example, the average particle size, particle size distribution, and tapped density varied greatly among precursors precipitated at different conditions, and considerably affected the gravimetric and volumetric energy density, rate capability, and operational lifetime of LiNi$_{0.9}$Co$_{0.05}$Mn$_{0.05}$O$_2$-in lithium-ion cells.

Comparative Example 3

Cobalt-free cathode active materials comprising LiNi$_{0.95}$Mn$_{0.05}$O$_2$ and LiNi$_{0.9}$Mn$_{0.05}$Al$_{0.05}$O$_2$ were prepared according to the methods described herein. First, cathode active material precursor comprising Ni$_{0.95}$Mn$_{0.05}$(OH)$_2$ was prepared using dissolvable salts of nickel and manganese in aqueous solutions of varying molar ratios at 2.0 mol·L$^{-1}$. The mixed-metal ion aqueous solution was pumped into a tank reactor at a controlled rate under nitrogen atmosphere. An aqueous solution of potassium hydroxide at 6.0 mol·L$^{-1}$ and ammonium hydroxide at 1.0 mol·L$^{-1}$ was separately pumped into the tank reactor to maintain a pH of 11.65±0.25. The co-precipitation reaction took place at 50±5° C. Subsequently, precursor comprising Ni$_{0.95}$Mn$_{0.05}$(OH)$_2$ was obtained through washing, filtering, and drying. To obtain LiNi$_{0.95}$Mn$_{0.05}$O$_2$, the precursor comprising Ni$_{0.95}$Mn$_{0.05}$(OH)$_2$ was mixed with lithium hydroxide at a molar ratio of 1:1.02±0.03. The mixed precursor and lithium hydroxide was calcinated at 700±20° C. for 17.5±7.5 h under an oxygen atmosphere of a 2.75±2.25 liter per minute flow rate. To obtain LiNi$_{0.9}$Mn$_{0.05}$Al$_{0.05}$O$_2$, precursor comprising Ni$_{0.95}$Mn$_{0.05}$(OH)$_2$ was first dry-mixed with aluminum isopropoxide at a molar ratio of 0.95:0.05 via ball milling at 120 rpm for 24 h, then the precursor mixed with aluminum isopropoxide was further mixed with lithium hydroxide at a molar ratio of 1:1.02±0.03. The mixed precursor, aluminum isopropoxide, and lithium hydroxide was calcinated at 750±20° C. for 17.5±7.5 h under an oxygen atmosphere of a 2.75±2.25 liter per minute flow rate. It will be appreciated that the lithium and oxygen contents in these chemical compositions are based on stoichiometry, but the lithium and oxygen contents may deviate from their stoichiometric values.

The cathode active material exhibited a tapped density of about 2.5 g·cm$^{-3}$. The cathode active material was formed into a composite cathode electrode by depositing a slurry of the cathode active material in N-Methyl-2-Pyrrolidone onto an aluminum foil current collector and allowing the solvent to evaporate. The areal capacity loading of the cathode active material was around 2.0 mAh·cm$^{-2}$. The cathode was assembled into an electrochemical cell with a lithium metal anode, a separator comprising a blend of polypropylene and polyethylene soaked with a nonaqueous carbonate-based electrolyte comprising 1.0 molar LiPF$_6$ in a solvent mixture of ethylene carbonate and ethyl methyl carbonate (3:7 by weight) with an additive of vinylene carbonate (2% by weight). Galvanostatic voltage profiles were obtained for charging and discharging the electrochemical cell.

Figure 29:
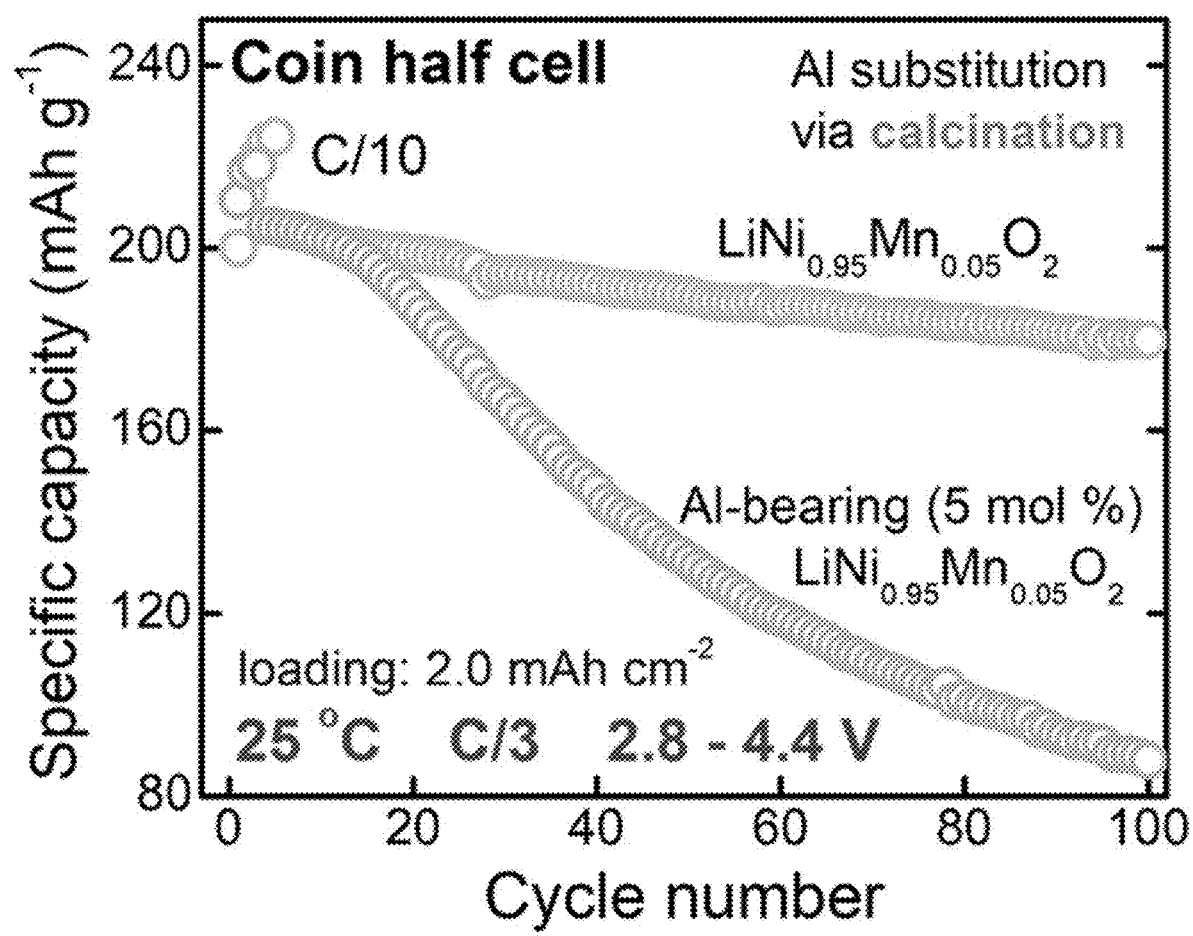
FIG. 29 provides cycling data of co-precipitated $LiNi_{0.95}Mn_{0.05}O_2$ and $LiNi_{0.9}Mn_{0.05}Al_{0.05}O_2$ (Al-bearing $LiNi_{0.95}Mn_{0.05}O_2$; 5 mol %) via calcination, evaluated in coin half battery cells paired with Li metal at a C/3 rate and 25° C.

FIG. 29 shows the evolution of specific capacity as a function of cycle number of LiNi$_{0.95}$Mn$_{0.05}$O$_2$ and LiNi$_{0.9}$Mn$_{0.05}$Al$_{0.05}$O$_2$-in lithium-ion cells paired with lithium metal. All lithium-ion cells were cycled between 2.8 V and 4.4 V vs. Li$^+$/Li at ambient temperature (25° C.). LiNi$_{0.95}$Mn$_{0.05}$O$_2$ delivered a specific capacity of 200 mAh·g$^{-1}$ at the first cycle at C/10 rate, a specific capacity of 202 mAh·g$^{-1}$ at the fourth cycle at C/3 rate, and a cycling stability of 88.2% after 100 charge-discharge cycles at C/3 rate. LiNi$_{0.9}$Mn$_{0.05}$Al$_{0.05}$O$_2$ prepared using precursor comprising Ni$_{0.95}$Mn$_{0.05}$(OH)$_2$ and dry mixing with aluminum isopropoxide delivered a specific capacity of 208 mAh·g$^{-1}$ at the first cycle at C/10 rate, a specific capacity of 202 mAh·g$^{-1}$ at the fifth cycle at C/3 rate, and a cycling stability of 42.9% after 100 charge-discharge cycles at C/3 rate. It will be appreciated that the Li$_a$Ni$_{1-b-c}$Co$_b$M$_c$O$_d$ materials show substantially different electrochemical properties, and may not be stable at all during electrochemical cycling synthesized by different material precursors from co-precipitation, as demonstrated in this comparative example.

REFERENCES

Kim, J., Lee, H., Cha, H., Yoon, M., Park, M. & Cho, J. Prospect and Reality of Ni-Rich Cathode for Commercialization. Advanced Energy Materials, 8, 1702028 (2018).

Bianchini, M., Roca-Ayats, M., Hartmann, P., Brezesinski, T. & Janek, J. There and Back Again—The Journey of LiNiO2 as A Cathode Active Material. Angewandte Chemie-International Edition, 58, 2-27 (2019).

Neigel, T., Schipper, F., Erickson, E. M., Susai, F. A., Markovsky, B. & Aurbach, D. Structural and Electrochemical Aspects of LiNi$_{0.8}$Co$_{0.1}$Mn$_{0.1}$O$_2$ Cathode Materials Doped by Various Cations. ACS Energy Letters, 4, 508-516 (2019).

Li, H., Cormier, M., Zhang, N., Inglis, J., Li, J. & Dahn, J. R. Is Cobalt Needed in Ni-Rich Positive Electrode Materials for Lithium Ion Batteries? Journal of the Electrochemical Society, 166, A429-A439 (2019).

Ryu, H. H., Park, K. J., Yoon, D. R., Aishova, A., Yoon, C. S. & Sun, Y. K., Li[Ni$_{0.9}$Co$_{0.09}$W$_{0.01}$]O$_2$: A New Type of Layered Oxide Cathode with High Cycling Stability. Advanced Energy Materials, 9, 1902698 (2019).

Aishova et al., 2019, "Cobalt-Free High-Capacity Ni-Rich Layered Li[Ni$_{0.9}$Mn$_{0.1}$]O$_2$ Cathode," Advanced Energy Materials, 1903179.

Zhang et al., 2019, "Cobalt-Free Nickel-Rich Positive Electrode Materials with a Core-Shell Structure," Chem. Mater, 31, 10150-10160.

Mu et al., 2019, "Dopant Distribution in Co-Free High-Energy Layered Cathode Materials," Chem. Mater., 31, 9769-9776.

U.S. Pat. Nos. 5,264,201, 6,677,082, 6,680,143, 6,964,828, 7,078,128, 758,543, 7,648,693, 7,985,503, 8,241,791, 8,377,412, 8,426,066, 8,685,565, 8,784,770, 9,412,996.

U.S. Patent Application Publication Nos. US 2001/0010807, US 2003/0027048, US 2006/0105239, US 2006/0147798, US 2009/0207246, US 2009/0224212, US 2011/0260099, US 2012/0301786, US 2015/0050522, US 2015/0132651, US 2015/0188136, US 2016/0372748, US 2017/0054147, US 2017/0338471, US 2017/0358796, US 2018/0019464, US 2019/0140276, US 2019/0221843.

PCT International Application Publication No. WO/2018/200631.

Chinese Patent or Publication Nos. CN101139108A, CN102437323B, CN103456946B, CN103715409A, CN103943844A, CN104319391A, CN106257718B, CN108199027A, CN109686970A, CN109904447A, CN109962223A, CN109970106A.

Korean Patent or Publication Nos. KR2016023496A, KR1702572B1, KR102021151B1.

ILLUSTRATIVE ASPECTS

As used below, any reference to a series of aspects (e.g., "Aspects 1-4") or non-enumerated group of aspects (e.g., "any previous or subsequent aspect") is to be understood as a reference to each of those aspects disjunctively (e.g., "Aspects 1-4" is to be understood as "Aspects 1, 2, 3, or 4").

Aspect 1 is an electrode active material comprising: Li$_a$Ni$_{1-b-c}$Co$_b$M$_c$O$_d$, wherein: a is from 0.9 to 1.1, b is from 0 to 0.05, c is from 0 to 0.67, d is from 1.9 to 2.1, and M is Mn, Al, Mg, Fe, Cr, B, Ti, Zr, Ga, Zn, V, Cu, Yb, Li, Na, K, F, Ba, Ca, Lu, Y, Nb, Mo, Ru, Rh, Ta, Pr, W, Ir, In, Tl, Sn, Sr, S, P, Cl, Ge, Sb, Er, Te, La, Ce, Nd, Dy, Eu, Sc, Se, Si, Tc, Pd, Pm, Sm, Gd, Tb, Ho, Tm, or any combination of these.

Aspect 2 is an electrode active material comprising: Li$_a$Ni$_{1-b-c}$Co$_b$M$_c$O$_d$, wherein: a is from 0.9 to 1.1, b is from 0 to 0.1, c is from 0 to 0.67, d is from 1.9 to 2.1, and M is Mn, Al, Mg, Fe, Cr, B, Ti, Zr, Ga, Zn, V, Cu, Yb, Li, Na, K, F, Ba, Ca, Lu, Y, Nb, Mo, Ru, Rh, Ta, Pr, W, Ir, In, Tl, Sn, Sr, S, P, Cl, Ge, Sb, Er, Te, La, Ce, Nd, Dy, Eu, Sc, Se, Si, Tc, Pd, Pm, Sm, Gd, Tb, Ho, Tm, or any combination of these; and wherein the electrode active material exhibits or is characterized by a specific energy for a single discharge between 5 V and 3 V vs. Li$^+$/Li of from 600 Wh·kg$^{-1}$ to 1000 Wh·kg$^{-1}$, and exhibits or is characterized by a specific energy for a 1C discharge rate between 5 V and 3 V vs. Li$^+$/Li that is from 80% to 100% of a specific energy for a C/10 discharge rate between 5 V and 3 V vs. Li$^+$/Li at 25° C.

Aspect 3 is an electrode active material comprising: Li$_a$Ni$_{1-b-c}$Co$_b$M$_c$O$_d$, wherein a is from 0.9 to 1.1, b is from 0 to 0.05, c is from 0 to 0.67, d is from 1.9 to 2.1, and M is at least one element selected from the group consisting of Mn, Al, Mg, Fe, Cr, B, Ti, Zr, Ga, Zn, V, Cu, Yb, Li, Na, K, F, Ba, Ca, Lu, Y, Nb, Mo, Ru, Rh, Ta, Pr, W, Ir, In, Tl, Sn, Sr, S, P, Cl, Ge, Sb, Er, Te, La, Ce, Nd, Dy, Eu, Sc, Se, Si, Tc, Pd, Pm, Sm, Gd, Tb, Ho, and Tm; and wherein the electrode active material exhibits a dQ·dV$^{-1}$ curve at the second charge-discharge formation cycle for a current rate of C/10 having a minimum during discharge at a voltage of from 4.15 V to 4.30 V vs. Li$^+$/Li.

Aspect 4 is the electrode active material of any previous or subsequent aspect, wherein M is a combination of Mn and Al; a combination of Mn, Mg, and Al; a combination of Mn and Mg; a combination of Al and Mg; or a combination of Ti, Mg, and Al.

Aspect 5 is the electrode active material of any previous or subsequent aspect, wherein M comprises Fe or Zn or both Fe and Zn.

Aspect 6 is the electrode active material of any previous or subsequent aspect, wherein the active material is free or substantially free of Co.

Aspect 7 is the electrode active material of any previous or subsequent aspect, wherein b is 0 or wherein b is less than 0.01.

Aspect 8 is the electrode active material of any previous or subsequent aspect, wherein a is from 0.9 to 1.

Aspect 9 is the electrode active material of any previous or subsequent aspect, wherein a is from 1 to 1.1.

Aspect 10 is the electrode active material of any previous or subsequent aspect, wherein b is from 0 to 0.01 and wherein c is from 0 to 0.01.

Aspect 11 is the electrode active material of any previous or subsequent aspect, wherein c is from 0.1 to 0.5, from 0.1 to 0.2, or from 0.2 to 0.4.

Aspect 12 is the electrode active material of any previous or subsequent aspect, wherein d is from 1.95 to 2.05.

Aspect 13 is the electrode active material of any previous or subsequent aspect, exhibiting or characterized by a tapped density of from 2.0 g·cm$^{-3}$ to 3.5 g·cm$^{-3}$.

Aspect 14 is the electrode active material of any previous or subsequent aspect, exhibiting or characterized by a tapped density of from 2.3 g·cm$^{-3}$ to 3.0 g·cm$^{-3}$.

Aspect 15 is the electrode active material of any previous or subsequent aspect, exhibiting or characterized by a tapped density of from 2.5 g·cm$^{-3}$ to 2.8 g·cm$^{-3}$.

Aspect 16 is the electrode active material of any previous or subsequent aspect, exhibiting or characterized by a specific energy for a single discharge between 5 V and 3 V vs. Li$^+$/Li of from 600 Wh·kg$^{-1}$ to 1000 Wh·kg$^{-1}$.

Aspect 17 is the electrode active material of any previous or subsequent aspect, exhibiting or characterized by a specific energy for a single discharge between 5 V and 3 V vs. Li$^+$/Li of from 600 Wh·kg$^{-1}$ to 1000 Wh·kg$^{-1}$ at 25° C.

Aspect 18 is the electrode active material of any previous or subsequent aspect, exhibiting or characterized by a specific energy for a single discharge between 5 V and 3 V vs. Li$^+$/Li of from 700 Wh·kg$^{-1}$ to 1000 Wh·kg$^{-1}$, from 800 Wh·kg$^{-1}$ to 1000 Wh·kg$^{-1}$, or 900 Wh·kg$^{-1}$ to 1000 Wh·kg$^{-1}$.

Aspect 19 is the electrode active material of any previous or subsequent aspect, exhibiting or characterized by a dQ·dV$^{-1}$ curve at the second charge-discharge formation cycle, for a current rate of C/10, which has a minimum of −300 mAh·g$^{-1}$V$^{-1}$ or lower during discharge at a voltage of from 4.15 V to 4.30 V vs. Li$^+$/Li.

Aspect 20 is the electrode active material of any previous or subsequent aspect, exhibiting or characterized by a dQ·dV$^{-1}$ curve at the second charge-discharge formation cycle for a current rate of C/10 having a minimum during discharge at a voltage of from 4.15 V to 4.30 V vs. Li$^+$/Li.

Aspect 21 is the electrode active material of any previous or subsequent aspect, exhibiting or characterized by a dQ·dV$^{-1}$ curve at the second charge-discharge formation cycle for a current rate of C/10 having a minimum during discharge at a voltage of from 4.16 V to 4.30 V vs. Li$^+$/Li.

Aspect 22 is the electrode active material of any previous or subsequent aspect, exhibiting or characterized by a dQ·dV$^{-1}$ curve at the second charge-discharge formation cycle for a current rate of C/10 having a minimum during discharge at a voltage of from 4.17 V to 4.30 V vs. Li$^+$/Li.

Aspect 23 is the electrode active material of any previous or subsequent aspect, exhibiting or characterized by a dQ·dV$^{-1}$ curve at the second charge-discharge formation cycle for a current rate of C/10 having a minimum during discharge at a voltage of from 4.18 V to 4.30 V vs. Li$^+$/Li.

Aspect 24 is the electrode active material of any previous or subsequent aspect, exhibiting or characterized by a dQ·dV$^{-1}$ curve at the second charge-discharge formation cycle for a current rate of C/10 having a minimum during discharge at a voltage of from 4.19 V to 4.30 V vs. Li$^+$/Li.

Aspect 25 is the electrode active material of any previous or subsequent aspect, exhibiting or characterized by a dQ·dV$^{-1}$ curve at the second charge-discharge formation cycle for a current rate of C/10 having a minimum during discharge at a voltage of from 4.20 V to 4.30 V vs. Li$^+$/Li.

Aspect 26 is the electrode active material of any previous or subsequent aspect, exhibiting or characterized by a dQ·dV$^{-1}$ curve at the second charge-discharge formation cycle for a current rate of C/10 having a minimum during discharge at a voltage of from 4.21 V to 4.30 V vs. Li$^+$/Li.

Aspect 27 is the electrode active material of any previous or subsequent aspect, exhibiting or characterized by a dQ·dV$^{-1}$ curve at the second charge-discharge formation cycle for a current rate of C/10 having a minimum during discharge at a voltage of from 4.22 V to 4.30 V vs. Li$^+$/Li.

Aspect 28 is the electrode active material of any previous or subsequent aspect, exhibiting or characterized by a dQ·dV$^{-1}$ curve at the second charge-discharge formation cycle for a current rate of C/10 having a minimum during discharge with a magnitude of −300 mAh·g$^{-1}$V$^{-1}$ or lower, such as from −300 mAh·g$^{-1}$V$^{-1}$ to −3000 mAh·g$^{-1}$V$^{-1}$.

Aspect 29 is the electrode active material of any previous or subsequent aspect, exhibiting or characterized by a dQ·dV$^{-1}$ curve at the second charge-discharge formation cycle for a current rate of C/10 having a minimum during discharge with a magnitude of −400 mAh·g$^{-1}$V$^{-1}$ or lower.

Aspect 30 is the electrode active material of any previous or subsequent aspect, exhibiting or characterized by a dQ·dV$^{-1}$ curve at the second charge-discharge formation cycle for a current rate of C/10 having a minimum during discharge with a magnitude of −500 mAh·g$^{-1}$V$^{-1}$ or lower.

Aspect 31 is the electrode active material of any previous or subsequent aspect, exhibiting or characterized by a dQ·dV$^{-1}$ curve at the second charge-discharge formation cycle for a current rate of C/10 having a minimum during discharge with a magnitude of −600 mAh·g$^{-1}$V$^{-1}$ or lower.

Aspect 32 is the electrode active material of any previous or subsequent aspect, exhibiting or characterized by a dQ·dV$^{-1}$ curve at the second charge-discharge formation cycle for a current rate of C/10 having a minimum during discharge with a magnitude of −800 mAh·g$^{-1}$V$^{-1}$ or lower.

Aspect 33 is the electrode active material of any previous or subsequent aspect, exhibiting or characterized by a dQ·dV$^{-1}$ curve at the second charge-discharge formation cycle for a current rate of C/10 having a minimum during discharge with a magnitude of −1000 mAh·g$^{-1}$V$^{-1}$ or lower.

Aspect 34 is the electrode active material of any previous or subsequent aspect, exhibiting or characterized by a dQ·dV$^{-1}$ curve at the second charge-discharge formation cycle for a current rate of C/10 having a minimum during discharge with a magnitude of −1500 mAh·g$^{-1}$V$^{-1}$ or lower.

Aspect 35 is the electrode active material of any previous or subsequent aspect, exhibiting or characterized by a dQ·dV$^{-1}$ curve at the second charge-discharge formation cycle for a current rate of C/10 having a minimum during discharge with a magnitude of −2000 mAh·g$^{-1}$V$^{-1}$ or lower.

Aspect 36 is the electrode active material of any previous or subsequent aspect, exhibiting or characterized by a dQ·dV$^{-1}$ curve at the second charge-discharge formation cycle for a current rate of C/10 having a minimum during discharge with a magnitude of −2500 mAh·g$^{-1}$V$^{-1}$ or lower.

Aspect 37 is the electrode active material of any previous or subsequent aspect, exhibiting or characterized by a specific energy for a single discharge between 5 V and 3 V vs. Li$^+$/Li at a 1C discharge rate of from 600 Wh·kg$^{-1}$ to 1000 Wh·kg$^{-1}$.

Aspect 38 is the electrode active material of any previous or subsequent aspect, exhibiting or characterized by a specific energy for a single discharge between 5 V and 3 V vs. Li$^+$/Li at a C/10 discharge rate of from 600 Wh·kg$^{-1}$ to 1000 Wh·kg$^{-1}$.

Aspect 39 is the electrode active material of any previous or subsequent aspect, exhibiting or characterized by a specific energy after 500 charge-discharge cycles of more than 80% of an original specific energy of from 600 Wh·kg$^{-1}$ to 1000 Wh·kg$^{-1}$.

Aspect 40 is the electrode active material of any previous or subsequent aspect, exhibiting or characterized by a specific energy after 1000 charge-discharge cycles of more than 85% of an original specific energy of from 600 Wh·kg$^{-1}$ to 1000 Wh·kg$^{-1}$.

Aspect 41 is the electrode active material of any previous or subsequent aspect, exhibiting or characterized by a specific energy after 500 charge-discharge cycles of more than 90% of an original specific energy of from 600 Wh·kg$^{-1}$ to 1000 Wh·kg$^{-1}$.

Aspect 42 is the electrode active material of any previous or subsequent aspect, exhibiting or characterized by a specific energy after 100 charge-discharge cycles of more than 95% of an original specific energy of from 600 Wh·kg$^{-1}$ to 1000 Wh·kg$^{-1}$.

Aspect 43 is the electrode active material of any previous or subsequent aspect, wherein only a portion comprises or is characterized by a rhombohedral crystal structure or a rhombohedral R$\bar{3}$m crystal structure.

Aspect 44 is the electrode active material of any previous or subsequent aspect, wherein 99 volume percent or less of the electrode active material comprises or is characterized by a rhombohedral crystal structure or a rhombohedral R$\bar{3}$m crystal structure.

Aspect 45 is the electrode active material of any previous or subsequent aspect, having or characterized by a surface region and a bulk region, wherein the surface region corresponds to a first portion of the active material or particles thereof within 20% of a cross-sectional dimension from a surface of the active material or particles thereof, and wherein the bulk region corresponds to a second portion of the active material or particles thereof deeper than the surface region.

Aspect 46 is the electrode active material of any previous or subsequent aspect, wherein the bulk region is free or substantially free of or does not exhibit a spinel, $P4_332$ or $Fd\bar{3}m$ crystal structure, a lithium-excess or $C2/m$ crystal structure, or a rock salt or $Fm\bar{3}m$ crystal structure.

Aspect 47 is the electrode active material of any previous or subsequent aspect, wherein at least a portion of the surface region comprises or is characterized by a spinel, $P4_332$ or $Fd\bar{3}m$ crystal structure, a lithium-excess or $C2/m$ crystal structure, or a rock salt or $Fm\bar{3}m$ crystal structure.

Aspect 48 is the electrode active material of any previous or subsequent aspect, wherein the bulk region is free or substantially free of or does not exhibit $LiFePO_4$(Pmnb/Pnma) or another polyanionic structure.

Aspect 49 is the electrode active material of any previous or subsequent aspect, wherein at least a portion of the surface region comprises or is characterized by $LiFePO_4$ (Pmnb/Pnma) or another polyanionic structure.

Aspect 50 is the electrode active material of any previous or subsequent aspect, comprising particles of $Li_aN_{1-b-c}Co_bM_cO_d$ having cross-sectional dimensions of from 500 nm to 30 µm.

Aspect 51 is the electrode active material of any previous or subsequent aspect, comprising a plurality of secondary particles.

Aspect 52 is the electrode active material of any previous or subsequent aspect, wherein the plurality of secondary particles have cross-sectional dimensions of from 500 nm to 30 µm.

Aspect 53 is the electrode active material of any previous or subsequent aspect, wherein the plurality of secondary particles have cross-sectional dimensions of from 500 nm to 2.5 µm.

Aspect 54 is the electrode active material of any previous or subsequent aspect, wherein the plurality of secondary particles have cross-sectional dimensions of from 2.5 µm to 7.5 µm.

Aspect 55 is the electrode active material of any previous or subsequent aspect, wherein the plurality of secondary particles have cross-sectional dimensions of from 7.5 µm to 15 µm.

Aspect 56 is the electrode active material of any previous or subsequent aspect, wherein the plurality of secondary particles have cross-sectional dimensions of from 15 µm to 30 µm.

Aspect 57 is the electrode active material of any previous or subsequent aspect, wherein the plurality of secondary particles are substantially monodisperse.

Aspect 58 is the electrode active material of any previous or subsequent aspect, wherein the plurality of secondary particles are polydisperse and comprise a first portion having a first cross-sectional dimension distribution and a second portion having a second cross-sectional dimension distribution that is at least a factor of 10 larger than the first cross-sectional dimension distribution.

Aspect 59 is the electrode active material of any previous or subsequent aspect, wherein the plurality of secondary particles are substantially spherical in shape.

Aspect 60 is the electrode active material of any previous or subsequent aspect, wherein at least some of the secondary particles each comprise a plurality of primary particles.

Aspect 61 is the electrode active material of any previous or subsequent aspect, wherein the plurality of primary particles have cross-sectional dimensions of from 10 nm to 10 µm.

Aspect 62 is the electrode active material of any previous or subsequent aspect, wherein the plurality of primary particles have cross-sectional dimensions of from 10 nm to 100 nm.

Aspect 63 is the electrode active material of any previous or subsequent aspect, wherein the plurality of primary particles have cross-sectional dimensions of from 100 nm to 1000 nm.

Aspect 64 is the electrode active material of any previous or subsequent aspect, wherein the plurality of primary particles have cross-sectional dimensions of from 1 µm to 10 µm.

Aspect 65 is the electrode active material of any previous or subsequent aspect, wherein the plurality of primary particles are substantially monodisperse.

Aspect 66 is the electrode active material of any previous or subsequent aspect, wherein at least some of the secondary particles each independently consist of one primary particle.

Aspect 67 is the electrode active material of any previous or subsequent aspect, exhibiting or characterized by a specific energy for a 1C discharge rate between 5 V and 3 V vs. $Li^+/Li$ of from 80% to 100% of a specific energy for a C/10 discharge rate between 5 V and 3 V vs. $Li^+/Li$ at 25° C.

Aspect 68 is the electrode active material of any previous or subsequent aspect, exhibiting or characterized by a specific energy for a 1C discharge rate between 5 V and 3 V vs. $Li^+/Li$ of from 85% to 100% of the specific energy for a C/10 discharge rate between 5 V and 3 V vs. $Li^+/Li$ at 25° C.

Aspect 69 is the electrode active material of any previous or subsequent aspect, exhibiting or characterized by a specific energy for a 1C discharge rate between 5 V and 3 V vs. $Li^+/Li$ of from 90% to 100% of the specific energy for a C/10 discharge rate between 5 V and 3 V vs. $Li^+/Li$ at 25° C.

Aspect 70 is the electrode active material of any previous or subsequent aspect, exhibiting or characterized by a specific energy for a 1C discharge rate between 5 V and 3 V vs. $Li^+/Li$ of from 750 $Wh \cdot kg^{-1}$ to 1000 $Wh \cdot kg^{-1}$ at 25° C.

Aspect 71 is an electrode comprising the electrode active material of any previous aspect.

Aspect 72 is the electrode of any previous aspect, further comprising a current collector.

Aspect 73 is an electrochemical cell, comprising: a cathode comprising the electrode of any previous aspect; an anode; and an electrolyte between the cathode and the anode.

Aspect 74 is the electrochemical cell of any previous or subsequent aspect, wherein the anode comprises graphite, carbon, silicon, lithium titanate ($Li_4Ti_5O_{12}$), tin, antimony, zinc, phosphorous, lithium, or a combination thereof.

Aspect 75 is the electrochemical cell of any previous or subsequent aspect, wherein the cathode or the anode or both independently comprise one or more of an active material, a current collector, a solid electrolyte, a binder, or a conductive additive.

Aspect 76 is the electrochemical cell of any previous or subsequent aspect, wherein the electrolyte is a liquid electrolyte.

Aspect 77 is the electrochemical cell of any previous or subsequent aspect, wherein the electrolyte is a semi-solid electrolyte.

Aspect 78 is the electrochemical cell of any previous or subsequent aspect, wherein the electrolyte is a solid electrolyte.

Aspect 79 is the electrochemical cell of any previous or subsequent aspect, wherein the electrolyte is a non-aqueous electrolyte.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. It will be appreciated that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. An electrode active material comprising: $Li_aNi_{1-b-c}Co_bM_cO_d$, wherein:
    a is from 0.9 to 1.1,
    b is from 0 to 0.03,
    c is from 0 to 0.67,
    d is from 1.9 to 2.1, and
    M is Mn, Al, Mg, Fe, Cr, B, Ti, Zr, Ga, Zn, V, Cu, Yb, Li, Na, K, F, Ba, Ca, Lu, Y, Nb, Mo, Ru, Rh, Ta, Pr, W, Ir, In, Tl, Sn, Sr, S, P, Cl, Ge, Sb, Er, Te, La, Ce, Nd, Dy, Eu, Sc, Se, Si, Tc, Pd, Pm, Sm, Gd, Tb, Ho, Tm, or any combination of these, and wherein the electrode active material exhibits or is characterized by a $dQ \cdot dV^{-1}$ curve at the second charge-discharge formation cycle for a current rate of C/10 having a minimum during discharge at a voltage of from 4.19 V to 4.30 V vs. $Li^+/Li$.

2. The electrode active material of claim 1, wherein M comprises at least Al.

3. The electrode active material of claim 1, wherein b is 0 or wherein b is less than 0.01.

4. The electrode active material of claim 1, wherein a is from 0.9 to 1.

5. The electrode active material of claim 1, wherein a is from 1 to 1.1.

6. The electrode active material of claim 1, wherein b is from 0 to 0.01 and wherein c is from 0 to 0.01.

7. The electrode active material of claim 1, wherein d is from 1.95 to 2.05.

8. The electrode active material of claim 1, exhibiting or characterized by a tapped density of from 2.0 $g \cdot cm^{-3}$ to 3.5 $g \cdot cm^{-3}$.

9. The electrode active material of claim 1, exhibiting or characterized by a specific energy for a single discharge between 4.4 V and 3 V vs. $Li^+/Li$ of from 600 $Wh \cdot kg^{-1}$ to 1000 $Wh \cdot kg^{-1}$.

10. The electrode active material of claim 1, exhibiting or characterized by a specific energy for a single discharge between 4.4 V and 3 V vs. $Li^+/Li$ at a 1C discharge rate of from 600 $Wh \cdot kg^{-1}$ to 1000 $Wh \cdot kg^{-1}$ at 25° C.

11. The electrode active material of claim 1, wherein the minimum is at a voltage of from 4.20 V to 4.30 V vs. $Li^+/Li$.

12. The electrode active material of claim 1, wherein the minimum has a magnitude of from −3000 $mAh \cdot g^{-1} V^{-1}$ to −300 $mAh \cdot g^{-1} V^{-1}$.

13. The electrode active material of claim 1, exhibiting or characterized by a specific energy after 500 charge-discharge cycles of more than 80% of an original specific energy of from 600 $Wh \cdot kg^{-1}$ to 1000 $Wh \cdot kg^{-1}$.

14. The electrode active material of claim 1, exhibiting or characterized by a specific energy after 1000 charge-discharge cycles of more than 80% of an original specific energy of from 600 $Wh \cdot kg^{-1}$ to 1000 $Wh \cdot kg^{-1}$.

15. The electrode active material of claim 1, wherein only a portion comprises or is characterized by a rhombohedral crystal structure or a rhombohedral R$\bar{3}$m crystal structure.

16. The electrode active material of claim 1, having or characterized by a surface region and a bulk region, wherein the surface region corresponds to a first portion of the active material or particles thereof within 20% of a cross-sectional dimension from a surface of the active material or particles thereof, and wherein the bulk region corresponds to a second portion of the active material or particles thereof deeper than the surface region.

17. The electrode active material of claim 16, wherein the bulk region is free or substantially free of or does not exhibit a spinel, P4$_3$32 or Fd$\bar{3}$m crystal structure, a lithium-excess or C2/m crystal structure, a rock salt or Fm$\bar{3}$m crystal structure, or LiFePO$_4$ (Pmnb/Pnma) or another polyanionic crystal structure.

18. The electrode active material of claim 16, wherein at least a portion of the surface region comprises or is characterized by a spinel, P4$_3$32 or Fd$\bar{3}$m crystal structure, a lithium-excess or C2/m crystal structure, a rock salt or Fm$\bar{3}$m crystal structure, or LiFePO$_4$ (Pmnb/Pnma) or another polyanionic crystal structure.

19. The electrode active material of claim 1, comprising particles of Li$_a$N$_{1-b-c}$Co$_b$M$_c$O$_d$ having cross-sectional dimensions of from 500 nm to 30 μm.

20. The electrode active material of claim 1, comprising a plurality of particles, which are substantially monodisperse and substantially spherical in shape.

21. An electrode active material comprising:
Li$_a$Ni$_{1-b-c}$Co$_b$M$_c$O$_d$, wherein:
a is from 0.9 to 1.1,
b is from 0 to 0.03,
c is from 0 to 0.67,
d is from 1.9 to 2.1, and
M is Mn, Al, Mg, Fe, Cr, B, Ti, Zr, Ga, Zn, V, Cu, Yb, Li, Na, K, F, Ba, Ca, Lu, Y, Nb, Mo, Ru, Rh, Ta, Pr, W, Ir, In, Tl, Sn, Sr, S, P, Cl, Ge, Sb, Er, Te, La, Ce, Nd, Dy, Eu, Sc, Se, Si, Tc, Pd, Pm, Sm, Gd, Tb, Ho, Tm, or any combination of these; and wherein the electrode active material exhibits or is characterized by a specific energy for a single discharge for a current rate of C/10 between 4.4 V and 3 V vs. Li$^+$/Li of from 850 Wh·kg$^{-1}$ to 1000 Wh·kg$^{-1}$ at 25° C.

22. The electrode active material of claim 21, wherein the electrode active material further exhibits or is further characterized by a specific energy for a 1C discharge rate between 4.4 V and 3 V vs. Li$^+$/Li at 25° C. that is from 85% to 100% of the specific energy for a C/10 discharge rate between 4.4 V and 3 V vs. Li$^+$/Li at 25° C.

23. The electrode active material of claim 21, wherein the electrode active material further exhibits or is further characterized by a specific energy for a 1C discharge rate between 4.4 V and 3 V vs. Li$^+$/Li at 25° C. that is from 90% to 100% of the specific energy for a C/10 discharge rate between 4.4 V and 3 V vs. Li$^+$/Li at 25° C.

24. The electrode active material of claim 21, exhibiting a dQ·dV$^{-1}$ curve at the second charge-discharge formation cycle, for a current rate of C/10, which has a minimum with a magnitude of from −3000 mAh·g$^{-1}$V$^{-1}$ to −300 mAh·g$^{-1}$V$^{-1}$ during discharge at a voltage of from 4.15 V to 4.30 V vs. Li$^+$/Li.

25. An electrode comprising the electrode active material of claim 1.

26. An electrochemical cell, comprising:
a cathode, the cathode comprising the electrode of claim 25;
an anode; and
an electrolyte between the cathode and the anode.

27. The electrochemical cell of claim 26, wherein the anode comprises graphite, carbon, silicon, lithium titanate (Li$_4$Ti$_5$O$_{12}$), tin, antimony, zinc, phosphorous, lithium, or a combination thereof.

28. The electrochemical cell of claim 26, wherein the electrolyte is a liquid electrolyte, a semi-solid electrolyte, or a solid electrolyte.

29. The electrode active material of claim 21, wherein M comprises at least Al.

* * * * *

UNITED STATES PATENT AND TRADEMARK OFFICE
CERTIFICATE OF CORRECTION

PATENT NO. : 11,233,239 B2
APPLICATION NO. : 17/213975
DATED : January 25, 2022
INVENTOR(S) : Arumugam Manthiram, Wangda Li and Steven Lee It is certified that error appears in the above-identified patent and that said Letters Patent is hereby corrected as shown below:

In the Specification

Column 1, Line 16: replace "DE-EE0008845" with -DE-EE0008445-.

Signed and Sealed this
Fourth Day of June, 2024

Katherine Kelly Vidal
*Director of the United States Patent and Trademark Office*